(12) United States Patent
Freier

(10) Patent No.: US 7,898,520 B2
(45) Date of Patent: Mar. 1, 2011

(54) METHOD AND APPARATUS FOR BACKLIGHT SIMULATION

(75) Inventor: David G. Freier, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1095 days.

(21) Appl. No.: 11/565,421

(22) Filed: Nov. 30, 2006

(65) Prior Publication Data

US 2007/0124122 A1 May 31, 2007

Related U.S. Application Data

(60) Provisional application No. 60/740,964, filed on Nov. 30, 2005.

(51) Int. Cl.
G09G 3/36 (2006.01)
(52) U.S. Cl. .......................................... 345/102; 703/2
(58) Field of Classification Search .................. 345/102; 703/2, 5, 13; 702/85
See application file for complete search history.

(56) References Cited

U.S. PATENT DOCUMENTS

| | | | |
|---|---|---|---|
| 5,313,542 A | 5/1994 | Castonguay | |
| 6,111,696 A | 8/2000 | Allen et al. | |
| 6,750,968 B2 | 6/2004 | Sandusky | |
| 6,788,398 B1 | 9/2004 | Guttman | |
| 2003/0086624 A1 | 5/2003 | Garcia | |
| 2004/0108971 A1 | 6/2004 | Waldern et al. | |
| 2004/0125103 A1 | 7/2004 | Kaufman et al. | |
| 2004/0243364 A1 | 12/2004 | Wendelin et al. | |
| 2005/0024735 A1 | 2/2005 | Uehara | |
| 2006/0091411 A1 | 5/2006 | Ouderkirk et al. | |
| 2006/0091784 A1 | 5/2006 | Conner et al. | |
| 2006/0103951 A1* | 5/2006 | Bell et al. | 359/737 |
| 2006/0181700 A1 | 8/2006 | Andrews et al. | |
| 2007/0124122 A1 | 5/2007 | Freier | |
| 2008/0306719 A1 | 12/2008 | Freier | |

OTHER PUBLICATIONS

Berreman, Dwight W., "Optics in Stratified and Ansiotropic Media; 4 X 4—Matrix Formulation", Journal of the Optical Society of America, vol. 62, No. 4, pp. 502-510, Apr. 1972.

(Continued)

Primary Examiner—Kevin M Nguyen
Assistant Examiner—Kenneth B Lee, Jr.
(74) Attorney, Agent, or Firm—Jay R. Pralle

(57) ABSTRACT

Computer-implemented methods of simulating backlights, and machine-readable media for carrying out such methods, are disclosed. The backlight may include a plurality of components, each component having at least one element. Some methods can include: tracing rays to an output plane of the backlight; collecting information from the traced rays to produce a first database containing spatial and directional information of the rays incident on the output plane; associating a probability function with the output plane; and calculating a second database containing spatial and directional information for rays exiting the output plane as a function of the probability function and the database. The output plane can if desired correspond to a stack of optical films, e.g., diffusing films, prismatic films, reflective polarizing films, turning films, and the like. Preferably, the probability function is a bi-directional scattering distribution function (BSDF) of the output plane.

7 Claims, 18 Drawing Sheets

OTHER PUBLICATIONS

Breault Research Organization, Inc., "Stray Light Analysis with ASAP", ASAP Procedural Note, Oct. 2001, BRO-PN-1157, pp. 1-18.
Frasch et al., "Modelling Surface and Volume Scattering with Raytracing Software", Proceedings of SPIE, 59620D-1, 2005.
Harris et al., "Real-Time Cloud Rendering", Eurographics, vol. 20, (2001), No. 3.
Product announcement: "Photon Engineering, LLC Announces FRED™ 5.20", Tucson, AZ., Jan. 5, 2005.
Hansen, J.E., "Multiple Scattering of Polarized Light in Planetary Atmospheres. Part I. The Doubling Method," Journal of the Atmospheric Sciences, vol. 28, (1971), pp. 120-125.
Lambda Research Release Notes—TracePro Version 1.3, May 12, 1998.
Lambda Research Corp's Illuminations, vol. 2, Issue 1, Jan. 2000.
TracePro Revision History, Version 3.3, May 16, 2006.
TracePro Software for Opto-Mechanical Modeling, Lambda Research Corporation.
U.S. Patent Application entitled "Method and Apparatus for Backlight Simulation", filed Nov. 30, 2006, having U.S. Appl. No. 11/565,421.
U.S. Patent Application entitled "Computerized Modeling for Design and Evaluation of Organic Light Emitting Diodes", filed Nov. 30, 2005, having U.S. Appl. No. 11/290,767.
U.S. Patent Application entitled "LED Package with Converging Optical Element", filed May 2, 2006, having U.S. Appl. No. 11/381,324.
U.S. Patent Application entitled "LED Extractor Composed of High Index Glass", filed May 3, 2006, having U.S. Appl. No. 11/381,518.
van de Hulst, H. C., "A New Look at Multiple Scattering", NASA Institute for Space Studies, Goddard Space Flight Center New York, New York, Jan. 1963.
Waterman, P. C., "Matrix-exponential description of radiative transfer", Journal of the Optical Society of America, vol. 71, No. 4, pp. 410-422, Apr. 1981.

\* cited by examiner

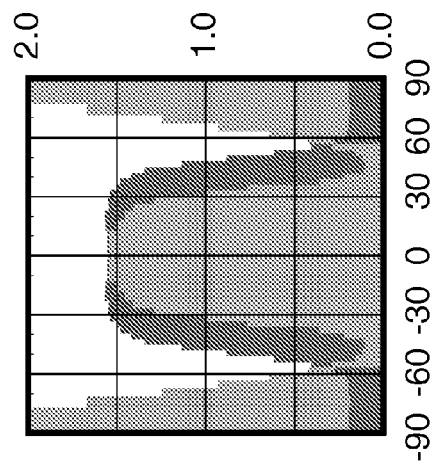
*Fig. 11B*
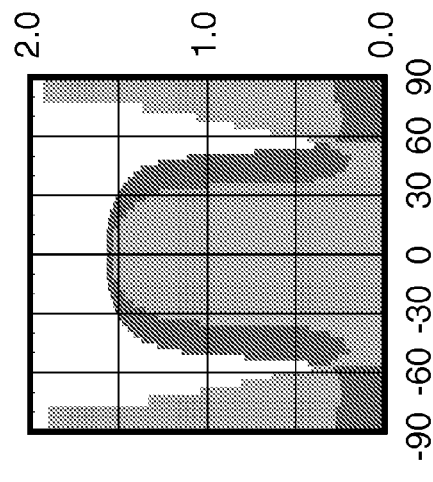
*Fig. 11D*
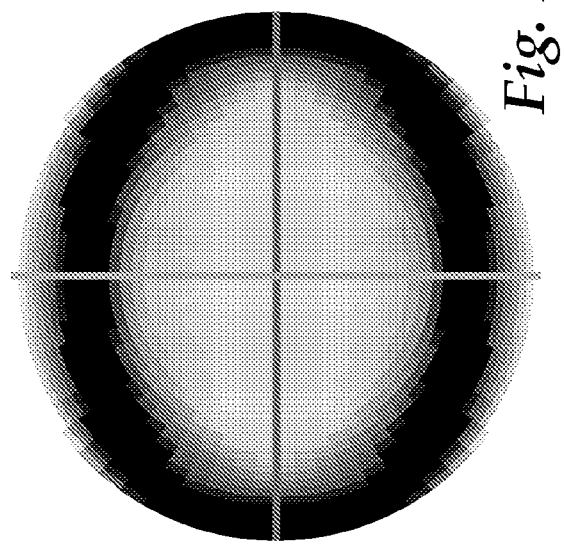
*Fig. 11A*
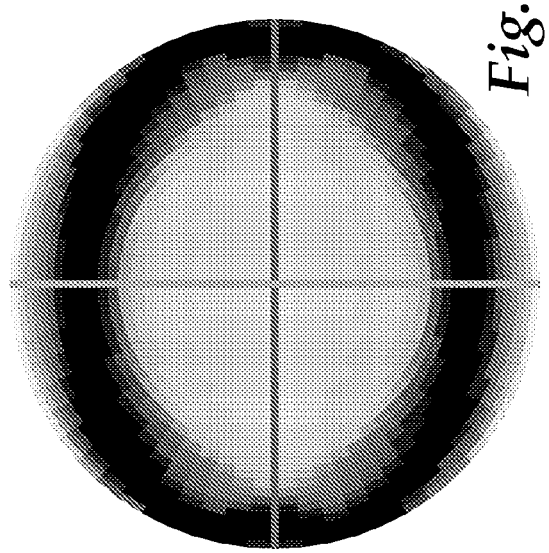
*Fig. 11C*
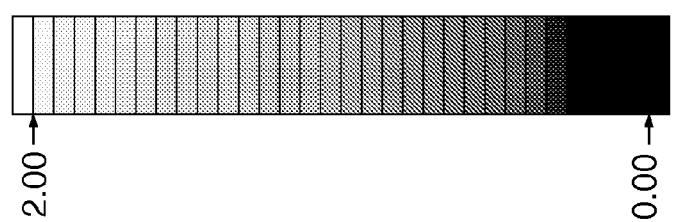

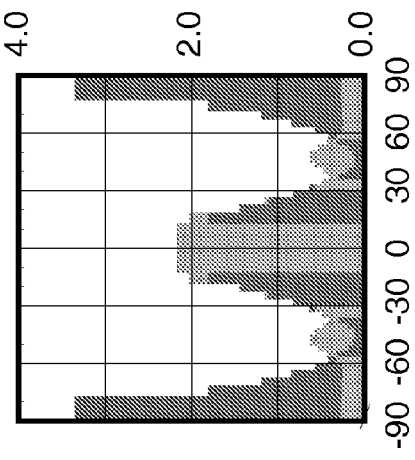
Fig. 12B
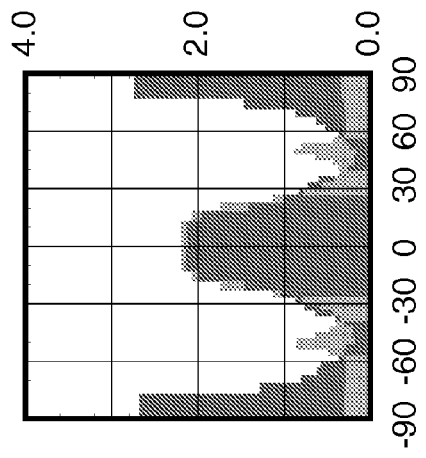
Fig. 12D
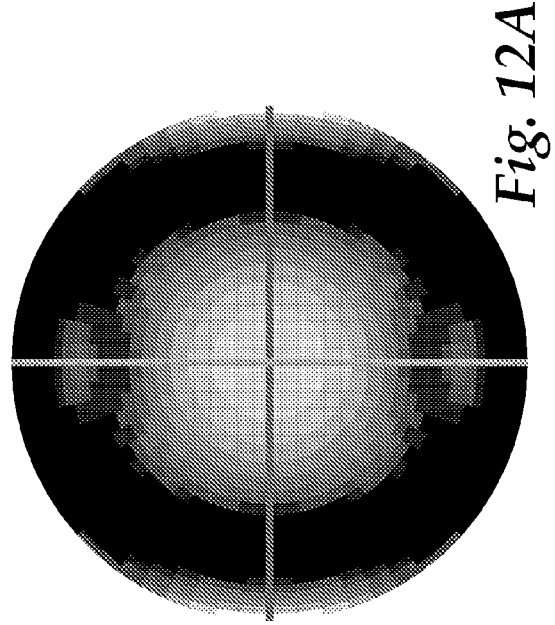
Fig. 12A
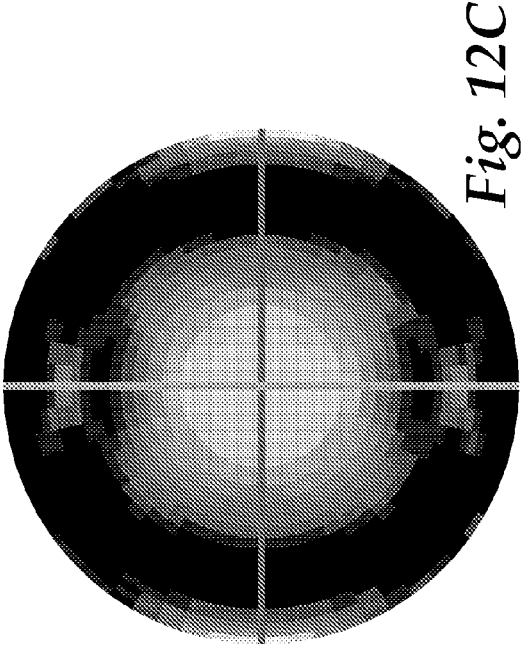
Fig. 12C
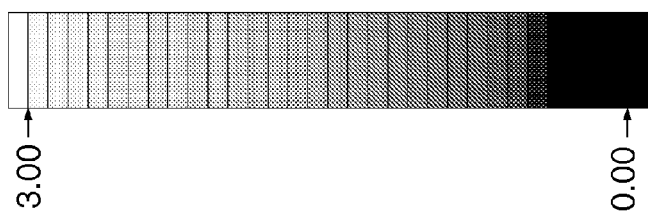

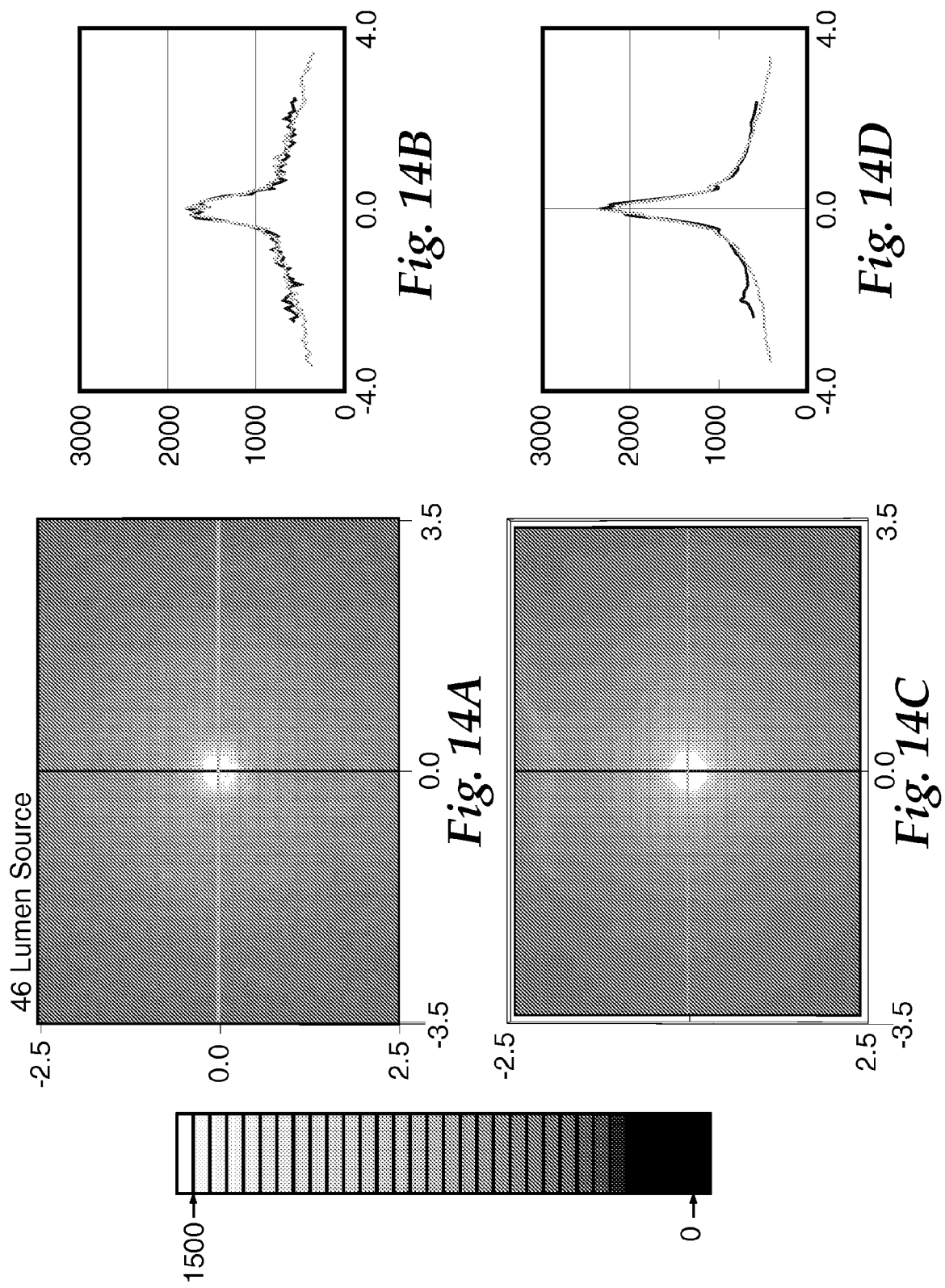

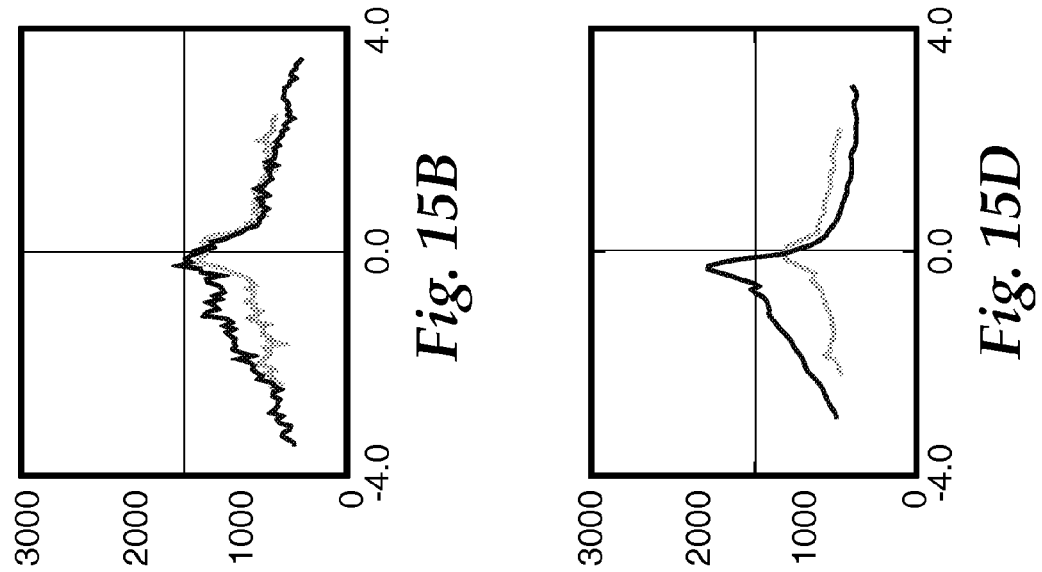
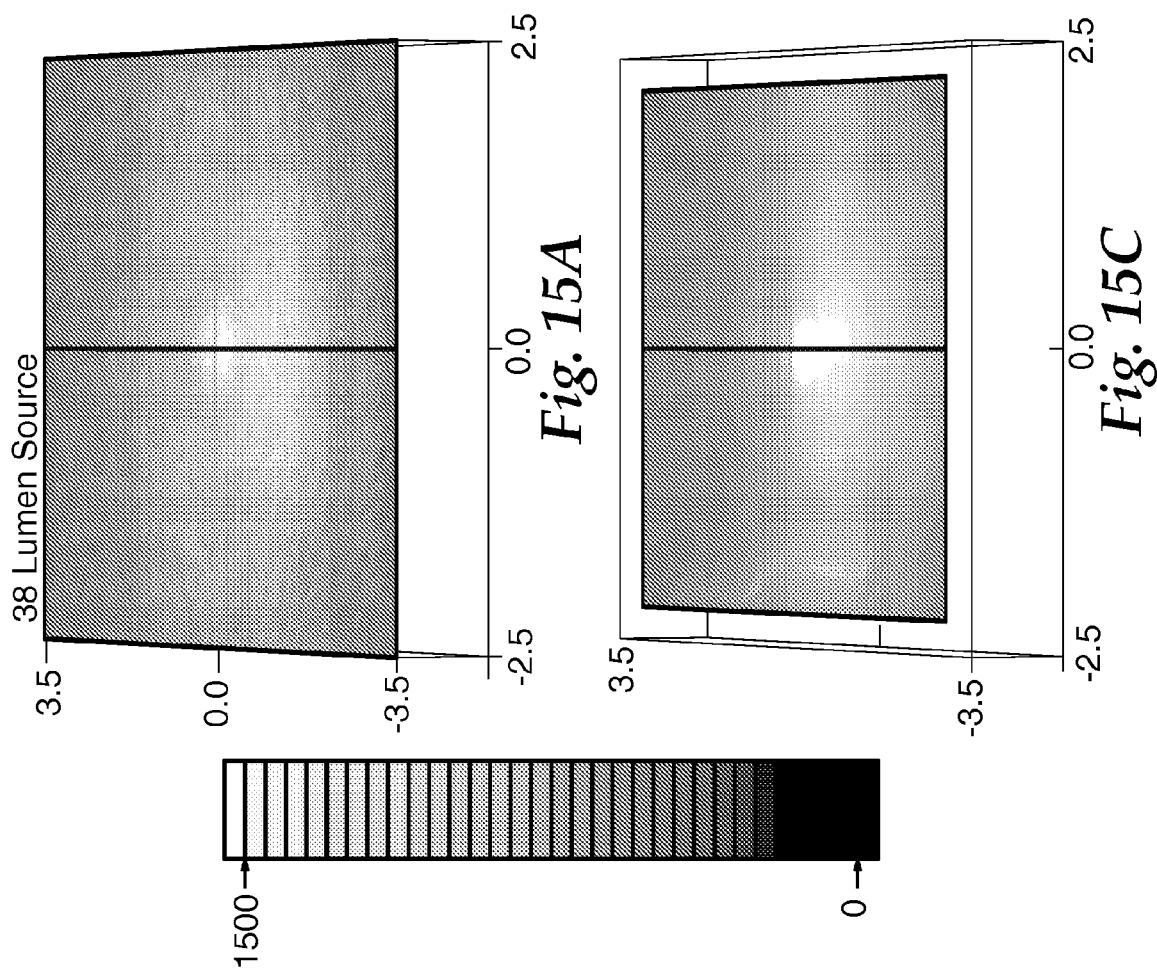
Fig. 15A  Fig. 15B  Fig. 15C  Fig. 15D

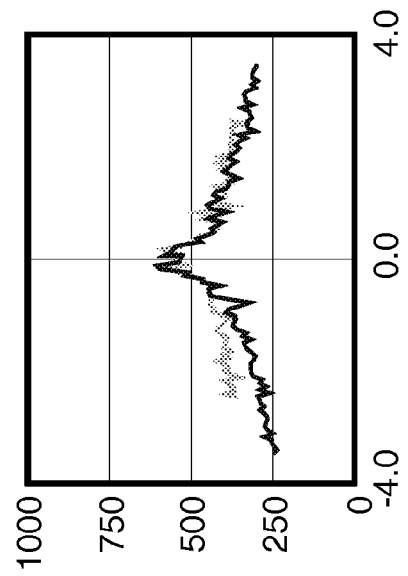
Fig. 19B
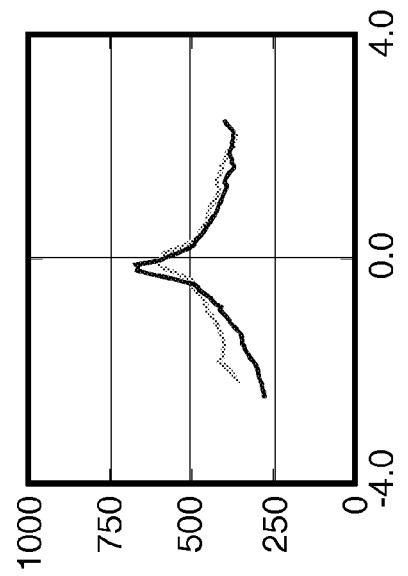
Fig. 19D
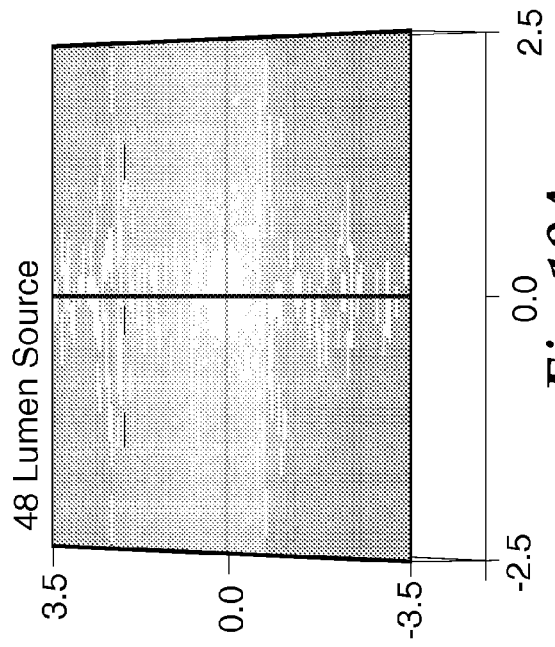
Fig. 19A
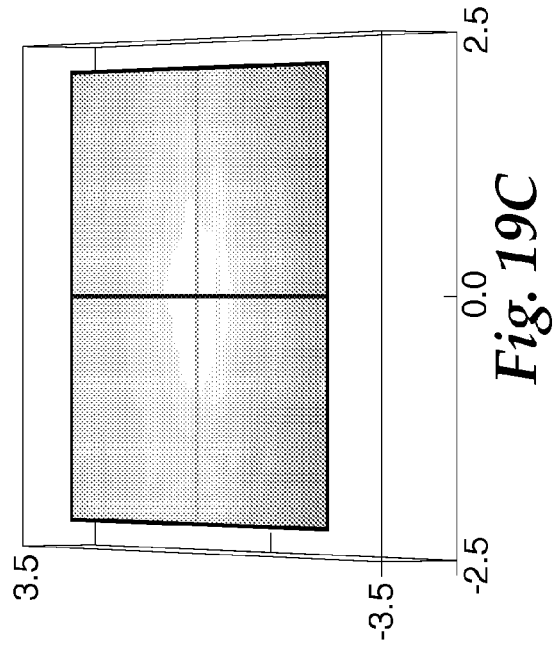
Fig. 19C
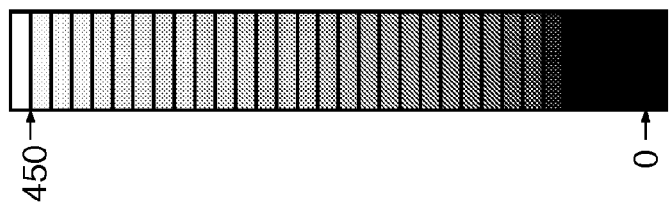

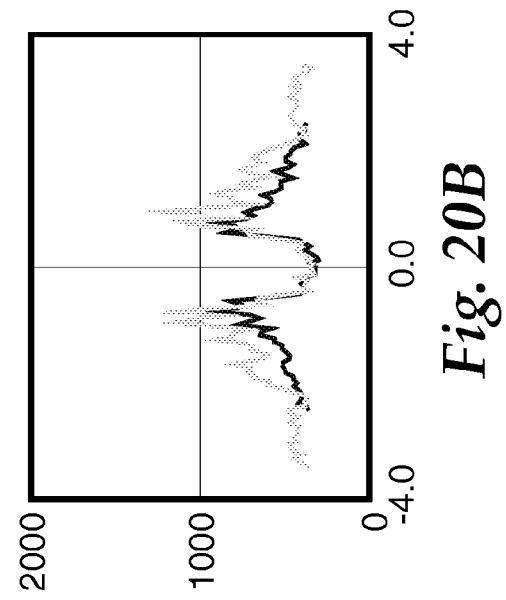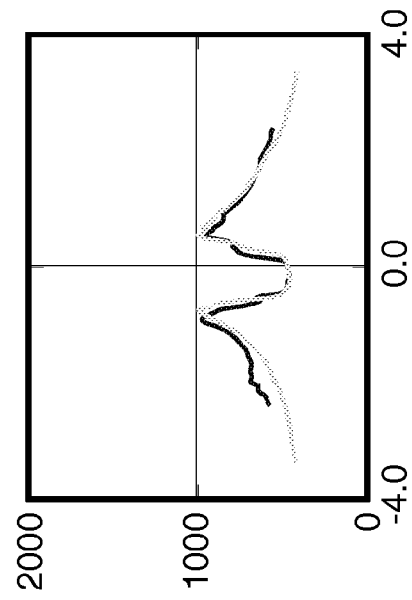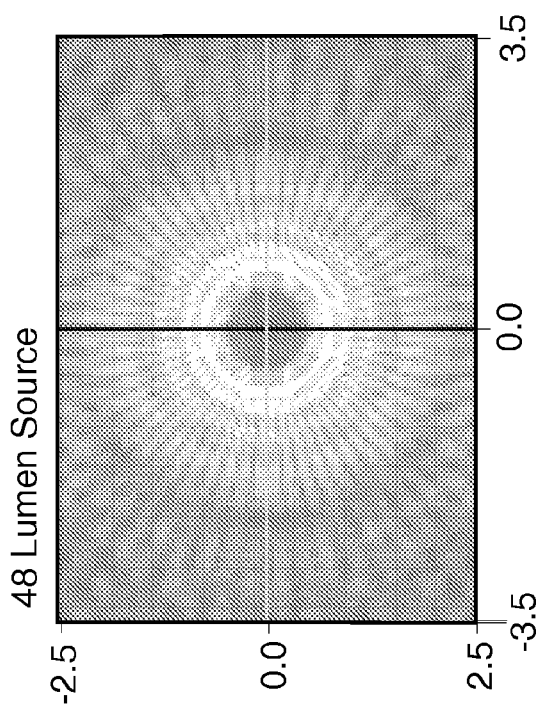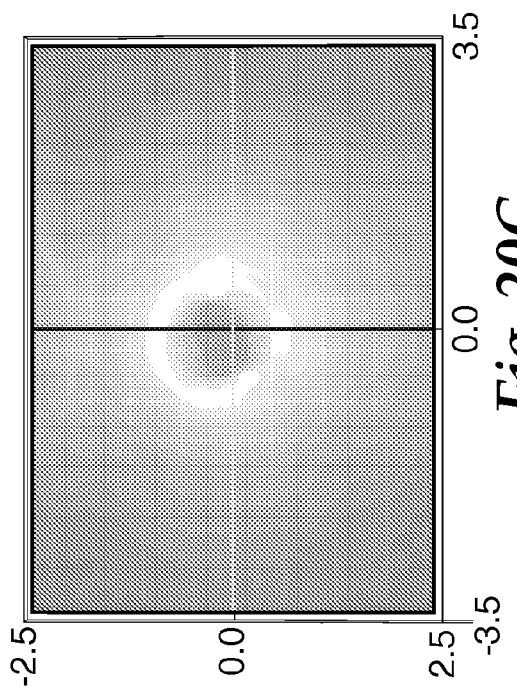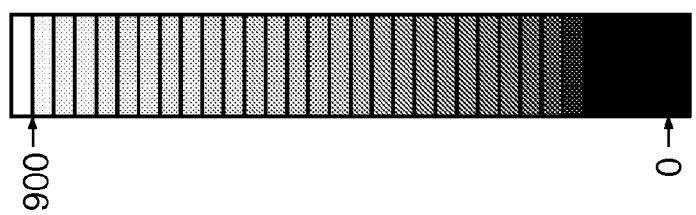

METHOD AND APPARATUS FOR BACKLIGHT SIMULATION

CROSS REFERENCE TO RELATED APPLICATIONS

This application claims the benefit of pending provisional U.S. Application No. 60/740,964, "Method and Apparatus for Backlight Simulation", filed Nov. 30, 2005.

FIELD OF THE INVENTION

The present invention is directed to the optical simulation of backlight systems.

BACKGROUND

The simulation of backlight systems is commonly performed by conventional ray tracing. In a conventional ray trace simulation through a variety of different components, components may be specified in a non-standard manner, which may require the simulation software to handle various components differently from a computational standpoint, thus introducing complexity into the simulation methodology. In addition, different users may decide to use different parameters to specify a particular component, leading to potential user-to-user variations in simulated performance. Furthermore, the ray trace calculations themselves may be prohibitively lengthy.

BRIEF SUMMARY

Computer-implemented methods of simulating backlights are disclosed. The backlight may include a plurality of components, each component having at least one element.

Some disclosed methods include: tracing rays to an output plane of the backlight; collecting information from the traced rays to produce a first database containing spatial and directional information of the rays incident on the output plane; associating a probability function with the output plane; and calculating a second database containing spatial and directional information for rays exiting the output plane as a function of the probability function and the database. In some cases, the output plane corresponds to a stack of optical films, e.g., diffusing films, prismatic films, reflective polarizing films, turning films, and the like. Preferably, the probability function is a bidirectional scattering distribution function ("BSDF") of the output plane.

In another aspect, the disclosed hybrid simulation methodology, which methodology traces rays from one system component to the next using BSDFs associated with each element, component, or collection of elements or components in order to compute the redirection of a ray, is used to calculate output characteristics of a display. If the output characteristics are stored in a database containing spatial and directional information, such database can be utilized in a customer-accessible user interface to permit the customer to simulate manipulating the viewing geometry of a selected backlight construction and seeing in virtual real-time how the appearance of the backlight changes.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIGS. 11A and C are grayscale plots, on the unit circle, of the predicted (11A) and measured (11C) gain of the diffuser plate underlying Vikuiti™ Brightness Enhancement Film (BEF). FIGS. 11B and 11D are plots of gain values along selected diameters of the unit circles of FIGS. 11A and 11C respectively.

FIGS. 12A-D are analogous to FIGS. 11A-D, but for the diffuser plate underlying two crossed sheets of BEF prismatic film.

FIGS. 14A and C are grayscale plots of predicted (14A) and measured (14C) images of an exemplary test fixture at normal viewing for a backlight utilizing the diffuser plate described in connection with FIG. 10. FIGS. 14B and 14D are plots of brightness values along perpendicular linear paths through the images of FIGS. 14A and 14C respectively.

FIGS. 15A and C are grayscale plots of predicted (15A) and measured (15C) images of the test fixture of FIGS. 14, but for a viewing angle 65-degrees away from normal. FIGS. 15B and 15D are analogous to FIGS. 14B and 14D.

FIGS. 19A-D are analogous to FIGS. 18A-D, but for a viewing angle 60-degrees away from normal.

FIGS. 20A and C are grayscale plots of predicted (20A) and measured (20C) images of the test fixture at normal viewing for a backlight using the diffuser plate face underlying glass, with an internal ESR dot plate. FIGS. 20B and D are analogous to FIGS. 14B and 14D.

In the drawings, like reference numerals designate like elements.

DETAILED DESCRIPTION OF ILLUSTRATIVE EMBODIMENTS

Figure 1:
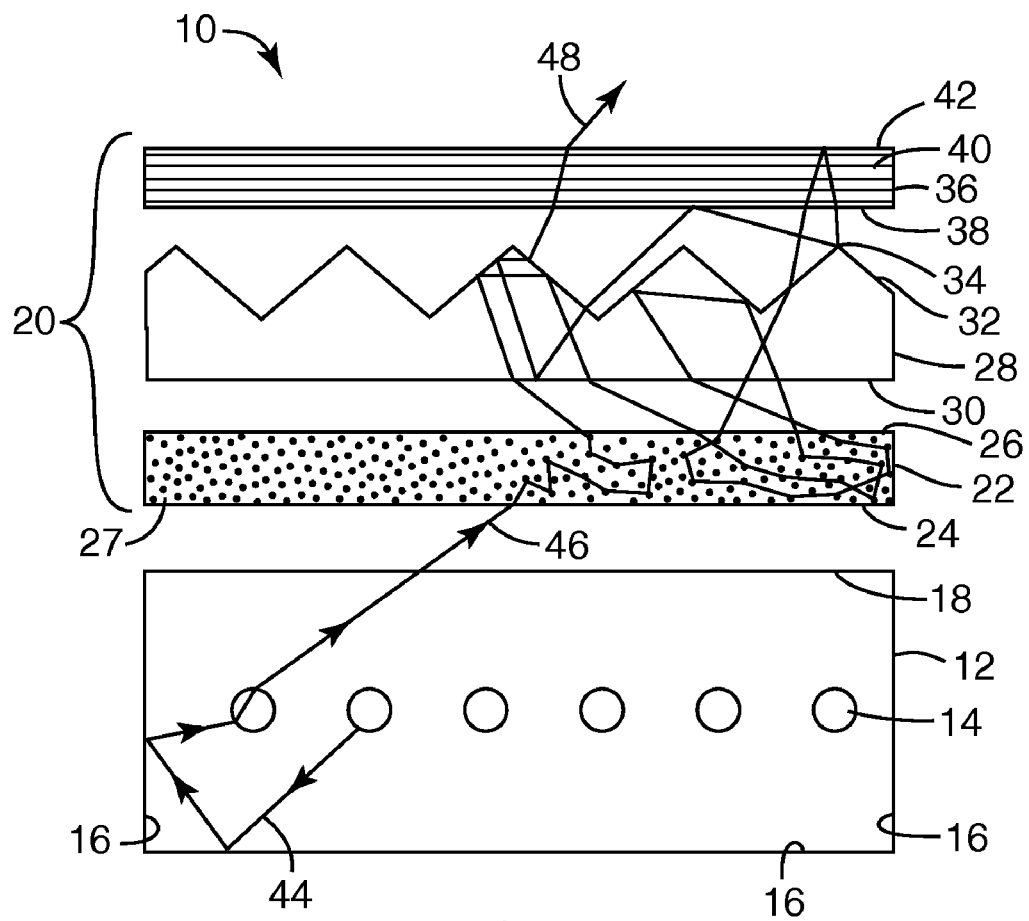
FIG. 1 is a schematic cross-sectional view of a backlight system, the figure also depicting a conventional ray trace though the system.

A current generation of liquid crystal display (LCD) computer monitors and televisions employ backlighting. The backlight system provides a generally uniform plane of illumination for a liquid crystal panel, which attenuates the backlight on a pixel-by-pixel basis to form an image. The liquid crystal panel is illuminated from the back, and the viewer observes the image from the front. A typical backlight system 10 is shown schematically in FIG. 1. System 10 is a direct-lit backlight, because it includes light sources disposed directly behind the output area of the backlight. In other systems, referred to as edge-lit backlights, a light source is disposed along the edge of the backlight outside the zone of the output area, and a wedge or slab light guide is typically included to direct light into the output area. The method described herein can be used to simulate any type of backlight, whether direct-lit, edge-lit, or otherwise. The method may also be used to simulate a backlight for a reflective display, which may not have an active light source.

A cavity 12 has one or more light sources 14 within it, typically an array of cold cathode fluorescent lamps, although an array of light emitting diodes may be used, as well as any other suitable light source. Although the light sources 14 are shown at roughly the center of the cavity 12, they may be located along a cavity wall 16 or any other suitable location. Typically, the cavity walls 16 are reflective, and may optionally have a roughened surface or coating to enhance scattering of the reflected light. The cavity 16 has an output area 18, which may be a physical surface or may be just a mathematical construct.

Light emerging from the cavity 12 encounters an optical film stack 20, which typically has one or more optical layers or films that redirect some light to particular viewing directions, reflect and recycle light having an undesirable polarization state (for example, when the backlight illuminates a liquid crystal display panel that includes an absorbing polarizer), or make the backlight more uniform across its output area. A multitude of different optical films, whether currently available or later developed, can be used in the optical film stack 20; examples of three films are described below. The films may be spaced apart by air, or they may be attached to one or more adjacent films by adhesives or coating operations. An air space can be macroscopic (e.g. on the order of a millimeter or more and visible to the unaided eye) or microscopic (e.g. as occurs when one optical film is simply laid atop another, leaving an air gap between contact points that is too small for the unaided eye to observe).

A conventional diffuser 22 has a large number of particles 27 randomly located inside a bulk layer. The particles can vary in a number of different properties, including location, size, shape, refractive index and so forth. Light passing through the diffuser interacts with the particles and is redirected in an essentially random manner. Overall, the light is made more uniform across the extent of the diffuser by both changing its direction, so that exiting light in any particular direction is derived as an average of incident light arriving in many directions, and by reflecting a portion of the incident light back into the cavity so that its position, direction, and polarization can be changed upon its next encounter with the diffuser. A typical bulk layer may have a refractive index of 1.50. The diffuser 22, which is a bulk diffuser, has a back surface 24 and a front surface 26. Surface diffusers having structured surfaces, or diffusing adhesives may also be used in backlight systems and displays.

A conventional brightness enhancing prismatic film 28 is shown having a substantially flat and smooth back surface 30, and an opposing front structured surface 32 that has distinct facets arranged to form an array of substantially 90 degree prisms extending parallel to each other along a prism axis or direction. The prismatic film 28 reflects normally incident light, and transmits or reflects obliquely incident light depending upon the direction of incidence. When illuminated by a Lambertian distribution of light, as is approximately the case in many backlights, the light transmitted through the prismatic film has a distribution that peaks at and is centered about the normal direction. The film 28 helps increase the apparent brightness to the viewer by redirecting some obliquely incident light into directions closer to the normal direction, and reflecting other light (including normally incident light) back towards the cavity 12. Unless it is completely absorbed by subsequent interactions, this reflected light can be redirected by the diffuser 22 and/or the reflective cavity walls 16 back towards the prismatic film until it eventually passes through the film 28 in a direction close to normal. In this manner, light propagating at high angles of incidence is redirected into low angles of exitance, and the apparent brightness to the viewer is increased at and around normal viewing angles. A typical prismatic film 28 may have an internal dihedral prism angle of about 90 degrees, with a prism-to-prism spacing and a prism height of about 50 microns. The top and/or bottom edges of each prism may not be perfectly sharp, instead being rounded and having a particular radius, e.g., on the order of a few microns. A typical prismatic film 28 may have a refractive index of 1.50. Alternatively, a layered structure may be used in which the prisms, composed of a first material having a first refractive index, are cast upon or otherwise attached to a uniformly flat base film composed of a second material having a different refractive index. Exemplary prismatic films useful for increasing the brightness of a display are offered by 3M Company as Vikuiti™ Brightness Enhancement Films (BEF). A variety of other microstructured films having alternative light redirecting structures may be used in optical film stacks, both in prisms-up and prisms-down orientations. The structures may be linear, i.e., extending uniformly along a given direction or axis, or they may be two-dimensional, as in structures having bases bounded in two orthogonal directions, for example, triangles, squares, rectangles, or circles. The structured features may be regular or irregular in terms of height, pitch, shape, and modulation.

A conventional reflective polarizer 36 is shown being made up of a large number of thin birefringent layers 40. The reflective polarizer 36, which has a back surface 38 and a front surface 42 opposite the back surface, transmits one polarization state, sometimes referred to as the "pass" state, and reflects an orthogonal polarization state, sometimes referred to as the "blocked" state. In the context of backlight system 10, light of the blocked state can be scattered and reflected by components of the backlight system 10 in such a way as to reorient its polarization state to the pass state, at which point the light can pass through the reflective polarizer 36. Such polarization recycling can be important in applications in which the backlight system is used to illuminate a liquid crystal panel, since the liquid crystal panel is polarization-sensitive, and the recycling converts at least some optical power in an otherwise wasted polarization state to a perpendicular state that is available for use by the liquid crystal panel. Exemplary reflective polarizers include Vikuiti® Dual Brightness Enhancement Films (DBEF) offered by 3M Company. Other suitable reflective polarizing films include diffusely reflective polarizing films, wire grid polarizers, and cholesteric reflective polarizers.

The combination of the diffuser 22, the prismatic film 28, and the reflective polarizer 36, in relatively close proximity to each other, forms an optical film stack 20. It is understood that the optical film stack 20 described herein is merely exemplary, and that the optical film stack may include or consist essentially of more layers, less layers, and different types of optical layers. For example, a given optical film stack may include microstructured turning films, adhesives, absorbing polarizers, light guides, reflective films, and/or diffusing or transparent support layers or plates intended to increase rigidity. No liquid crystal panel is shown in FIG. 1; if present, it would typically be located adjacent to the front surface 42 of the optical film stack 20.

One approach for simulating backlight systems is standard ray tracing. Rays originate at the source and propagate from component to component. Each ray interaction occurs with a rule for both adjusting the power in the ray, and determining a new direction. Ray interactions occur for both surface and volume interactions. For instance, surface interactions can include Fresnel reflection and transmission. Volume interactions can include scattering with random propagation and angle, or power reduction without any scattering or ray redirection, such as occurs when light propagates through a clear but absorbing bulk material. In a typical ray trace, the ray power may be diminished at each interaction, and the rays are commonly redirected based on well-established principles of optics, such as the law of specular reflection (angle of incidence equals angle of reflection), Snell's Law of refraction, and the Fresnel equations for the amplitude of reflected and transmitted light. Conventional ray tracing can also treat single-scattering with a random propagation distance and scattering angle, which may occur when a ray strikes a surface with a particular roughness. The rays can be traced until they reach an output plane, typically the plane at which the liquid crystal panel is to be located. The properties of the backlight can then be determined from a statistical analysis of the rays at the output plane.

In conventional ray tracing, there is limited use of probability in determining the ray interactions. For instance, the position and direction of source rays are often chosen randomly, based on a supplied description of a particular source. In addition, some interactions can be treated randomly, such as with diffusing components, where an exit angle is calculated probabilistically, based on an incident angle and a supplied description for a surface roughness. In this case, the interaction is typically treated as a perturbation of a conventional Fresnel reflectivity interaction. But normally, most other interactions, such as with the various components and surfaces depicted in FIG. 1, are treated deterministically. Inevitably, there is statistical noise in the simulated image. In order to reduce the statistical noise to an acceptable level, a large number of rays are traced from the source to the image, typically numbering in the millions. For a typical backlight construction, and where a spatial resolution on the face of the backlight of about ten thousand cells or pixels is desired, about ten million exit rays are typically traced. Note that each one of these rays can experience a large number of interactions before exiting the backlight system or being absorbed. An example of a conventional ray trace is shown in FIG. 1 and described below.

A ray 44 originates at a particular location on the source with a particular direction. Note that the initial conditions are commonly determined in a probabilistic manner by the source description. The ray 44 reflects off the cavity walls 16 and other elements inside the cavity 12 until it reaches the cavity output area 18, whereupon the ray leaves the cavity 12. The output area 18 may or may not be a physical surface.

The ray 46 leaving the output area 18 of the cavity 12 then encounters the optical film stack 20, where there may be many interactions, each one governed by optical principles such as those mentioned above. For instance, the interactions at the prisms of the film 28 are governed by optical principles mentioned above. Eventually, after multiple interactions and perhaps reflections back into the cavity, the ray 48 emerges from the optical film stack 20 and reaches, for example, an image plane of an LCD panel (not shown).

For good results with typical backlight systems, on the order of ten million rays are traced from the source, through multiple interactions, to the output area of the backlight itself, referred to hereafter as an output plane. In many cases the output plane corresponds to the outermost or front-most physical surface of the backlight system, which, in the case of backlight system 10, corresponds to the front surface 42 of the reflective polarizer 36. The actual number or rays (whether on the order of 1 million, 10 million, or 100 million, for example) depends on factors such as the physical size of backlight, the desired spatial resolution, and the desired precision (or the maximum acceptable level of statistical noise) in the model output results. After the rays are traced, a statistical analysis of the rays at the output plane predicts the properties of the backlight, such as average radiance, spatial uniformity or spatial variability of radiance across the output area of the backlight, and so forth. Some drawbacks to the exclusive use of standard ray tracing to simulate a backlight system are described below.

First, the physical information used to characterize various optical film components, e.g. prismatic films, diffuser films, multilayer films, holographic films, or absorbing films, can be very different from one component to another. For instance, the diffuser 22 may be specified by the bulk layer refractive index, the refractive index of the particles, the size and shape of the particles, and the average density at which the particles are found in the diffuser 22. In contrast, the prismatic film 28 may be specified by the prism angle, the prism spacing, the prism height, the refractive index of the prisms and the supporting substrate, and the radius of curvature of the prism edges. A multilayer film may be specified by the number of layers, their physical thicknesses, and their refractive indices in three orthogonal directions. The different types of information requires the simulation software to handle the various films differently from a computational standpoint, thus introducing complexity into the simulation methodology.

Second, the choice of which parameters to use when specifying a given film may significantly affect the simulated results. For instance, while some designers may be aware that simulated results may depend on the radius of curvature of the prism edges in the prismatic film 28, other designers may not be aware and may therefore not include the radius of curvature as an adjustable parameter in their simulations. Simulations that assume sharp prism edges may not match the true performance of a real prismatic film 28, which may have a small but non-zero radius of curvature. The radius of curvature of the prisms 28 is singled out merely an example; other subtle features may be important as well. In general, simulations of a given system may have inherent errors caused by inadvertent omission of a particular adjustable parameter. This choice of which parameters to specify may be largely left to the individual designers, and may contribute to designer-to-designer variations in the quality of simulated results.

Third, the ray trace calculations themselves may be prohibitively lengthy. For a typical system, a ray may commonly have between 10 and 1000 redirections and interactions before reaching the output area. Thus, the computational requirements of tracing on the order of ten million such rays through a backlight system may be overwhelming, requiring days or even weeks to complete on today's standard, readily available computer systems. Furthermore, the number of required calculations becomes even greater with an increased display size and complexity, such as a backlight for a large-screen LCD television display, which requires more information to specify the internal components for the ray trace, and requires much more than the ten million rays in order to maintain a comparable resolution and a sufficiently low level of statistical noise in the output plane.

Accordingly, it would be beneficial for a backlight simulation method and apparatus to employ standardization in its descriptions of different optical components, to reduce potential designer-to-designer variations, and/or to require fewer calculations than traditional methods.

One such simulation method and apparatus uses probabilities to redirect the rays in a ray trace. The optical properties of any given component in the backlight system are condensed into a bi-directional scattering distribution function, or BSDF, and the BSDF is treated mathematically in computer-implemented software as a matrix. The BSDF provides a probability that a ray striking the component at a particular incident direction with a particular incident intensity leaves the component at a particular exiting direction with a particular exiting intensity. The BSDF matrix can be set up or arranged in any consistent manner, but according to one convention the rows in the matrix correspond to exiting directions, the columns correspond to incident directions, and the values in the matrix cells are proportional to the probability densities corresponding to particular pairs of incident and exiting directions. Every component in the optical path of a backlight can be described by a single BSDF, which can be calculated a single time and then, if desired, stored in a library. In certain cases the BSDFs of adjacent or sequential components may be combined into a single combination BSDF, resulting in far fewer calculations overall compared to conventional ray tracing.

Figure 2:
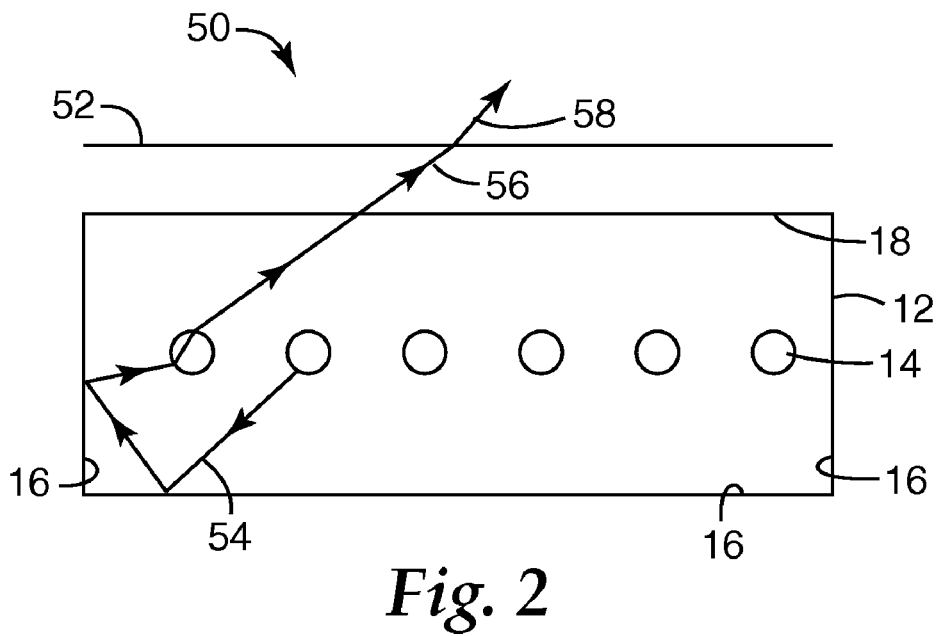
FIG. 2 is a schematic cross-sectional view of a simulated backlight system having the same operational characteristics as the backlight system of FIG. 1, the figure also depicting a simulation light path through the simulated backlight system.

As an example that can be compared with the ray trace method depicted in FIG. 1, consider the backlight system 50 of FIG. 2. System 50 is a simulated representation of the entire backlight system 10 (FIG. 1), where the individual components of film stack 20 have been replaced with individual BSDFs and then those BSDFs have been mathematically combined into a single aggregate BSDF for the film stack 20, represented in FIG. 2 by simulated film stack 52.

The other components of the backlight system, such as cavity walls 16 and light sources 14, are also represented by BSDFs.

FIG. 2 depicts a representative ray traced through the system 50, so that the complexity of the simulation may be compared with that of the conventional ray trace simulation depicted in FIG. 1. A ray 54 originates at the source 14, reflects several times off the cavity walls 16, and reaches the cavity output area 18. The ray 56 continues to propagate, reaching the simulated optical film stack 52. There, the ray 56 is operated on by a single aggregate BSDF matrix, the effect of which is to produce an output ray 58 which is substantially identical to the output ray 48 of FIG. 1 but arrived at with far fewer simulated interaction events and far fewer calculations. The small number of matrix operations that describe the interactions of FIG. 2 are significantly simpler than the 10 to 1000 optical interactions, each with its own computation based on optical principles, required in connection with the simulation of FIG. 1. The enhanced simplicity results in a significant reduction in computation time for the BSDF-based simulation. Note that the systems of FIGS. 1 and 2 are merely examples, and are not limiting in any way.

The disclosed BSDF-based simulation of backlights has several principal but independent aspects: (1) calculating each of the BSDFs for some or all components or elements making up the backlight, (2) optionally combining various BSDFs into one or more combination BSDFs, and (3) tracing rays with ray redirections governed by one or more BSDF(s). Each of these aspects is explained summarily in the following paragraphs, and is subsequently described in even greater detail.

Principal aspects (1) and (2) may be considered to be stack aspects of the simulation. The BSDF of each component of the optical path is represented as a matrix. The matrices are calculated analytically for each optical-path component listed, except for structured interfaces; the matrices for structured interfaces are calculated by simulation. The matrix representing the BSDF of the stack is calculated by combining the matrices of the optical-path components using methods of linear algebra. Electromagnetic reciprocal symmetries can be enforced and exploited, which minimizes memory requirements, reduces noise in the simulated components, and reduces the computational burden of combining individual component matrices. In addition, physical symmetries of each component can be enforced and exploited, which minimizes memory requirements, reduces noise in the calculations, and vastly reduces the computational burden of the calculations. Furthermore, the software and/or hardware for the required generic linear-algebraic operations may be optimized as well.

Principal aspect (3) relates to how rays are traced in the simulation. Each ray originates, for example, at the source or sources, with a random position and direction dictated by specified probability distributions that describe the emission of the source or sources. Each ray then propagates from component to component. For a backlight system, this involves propagation within an air-filled cavity or a plastic lightguide.

At each component, the ray power is diminished and rays are redirected randomly according to the probability distributions embedded within the local BSDF of the component. For example, when a ray strikes a component, its fate may be decided by two random decisions, the first selecting reflection or transmission (with absorption accounted for by a reduction in ray power), and the second selecting a reflected or transmitted direction. In this regard, the term random implies that a decision is made statistically according to a governing function, such as a BSDF, rather than deterministically. The probability distributions needed to make these decisions in a manner statistically identical to that of the conventional deterministic approach are embodied within the BSDF of the particular component. Each time a ray strikes the at least partially-transmissive output face of the backlight, all or part of its power is accumulated in a vector whose different components represent different incidence directions. One such vector can be maintained for each of a series of contiguous areas (or pixels) on the output face. After a sufficient number of rays are accumulated in each such vector, the locally transmitted radiance is calculated by multiplying the vector by the matrix representing the transmissive component of the local BSDF of the output face.

The simulation has advantages, which may include one or more of the following:

First, computational efficiency is increased, leading to an increase in calculation speed. As shown in a comparison between FIGS. 1 and 2, the calculation time is reduced by a factor of roughly 10 to 1000 for common backlight optical film stacks. In practical terms, this means that for a given amount of time during which a system is designed, more of the design space may be explored in simulations. This, in turn, may allow for simulation of some systems that were previously too complicated or too time-consuming to simulate.

Second, after the BSDFs of common films have been calculated, they can be stored and subsequently referenced by the identity of the film, and possible simple modifiers, such as specified rotations. Looking up the stored BSDF of a film requires far less computation time than recalculating it, which may lead to a further reduction in calculation time.

Third, a novel combination of known films may be calculated. Once the individual BSDFs of the films are stored, they may be recalled and combined in a straightforward manner.

Fourth, the simulation can generate in a straightforward manner the BSDFs of new or novel films. Once the BSDF of a new film is calculated, the film may be used immediately in simulations by itself or in combination with other films.

Fifth, all components or elements may be treated with relatively simple matrix operations, regardless of the physical complexity of the components or elements.

Sixth, a standardization of the component description leads to an ease of use for the user. In other words, the user can avoid specifying one set of parameters for a particular component, and a completely different and unrelated set of parameters for a different component.

Seventh, standardization of the component descriptions may reduce user-to-user variations in predicted results, which can arise if users choose which parameters to use when describing components.

The following paragraphs provide an overview for simulating a backlight design. Following the overview, each topic will be treated in greater detail.

Figure 3:
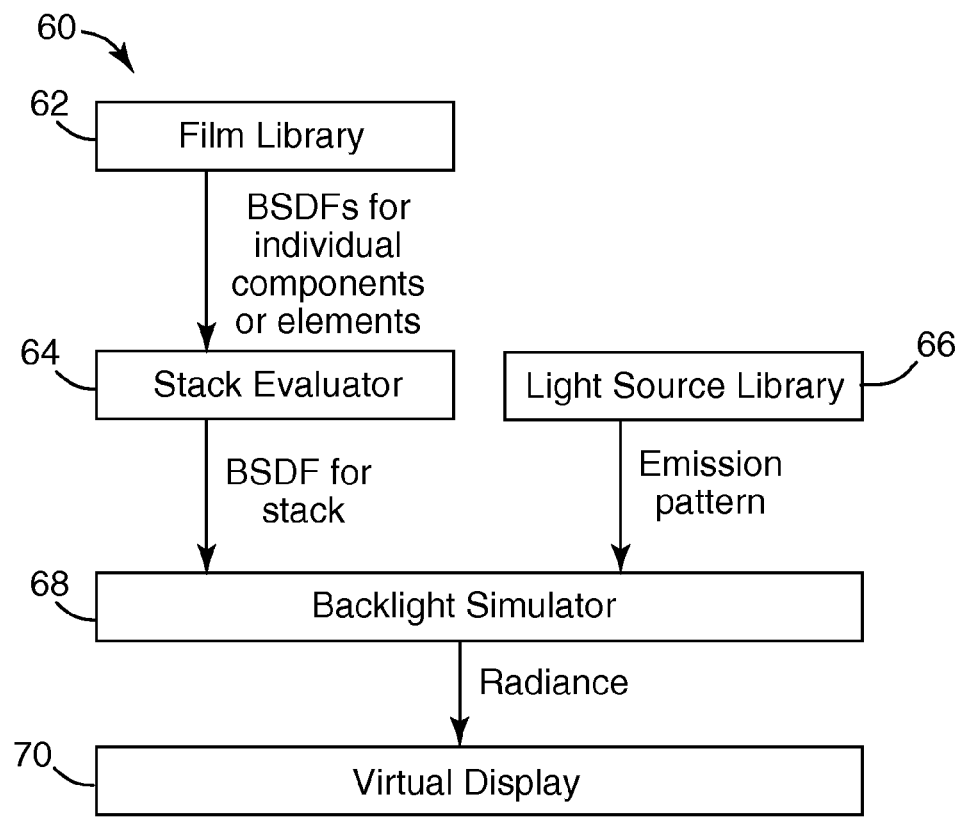
FIG. 3 is a block diagram of a backlight simulation system and its constituent elements or modules.

FIG. 3 shows a high-level schematic block diagram of a backlight simulation system 60. System 60 can represent a method of simulating a backlight design, or the apparatus that performs the simulation, such as a computer or one or more software files that may be available on a storage device such as a disk, or may be available for downloading.

BSDFs of selected materials, films, and/or surfaces can be generated by modeling, experiment, or both, and then saved in a library or database, denoted as Film Library 62. This can be done only once for each film or component; once a BSDF is calculated, it can be stored and recalled from the library as needed by any user, any number of times, in any simulation, without having to recalculate the BSDF. The component BSDFs are typically computed analytically or by simulation, although they may also be obtained experimentally. Recalling a stored BSDF is faster and more efficient than recalculating it each time it is needed.

The user of system 60 can select materials, films, and/or surfaces from the Film Library 62 to form a film stack. The user can also specify a geometry for the film stack, including the order, location, and orientation for each film or component. Where there is no significant free space propagation, a Stack Evaluator 64 mathematically combines the BSDFs from individual materials, films, and/or surfaces into a single combination BSDF. The Stack Evaluator 64 can use symmetries to reduce the number of calculations required. Calculating a combination BSDF can be done once for each design simulation, rather than every time a ray is traced.

In a manner similar to the Film Library 62, a Light Source Library 66 stores the emission patterns of selected light sources. The emission patterns, which may characterize a given source by both angular and spatial distribution of radiance (a radiometric quantity having units of power per unit area per solid angle) can be generated by modeling, experiment, or both. This can be done only once for each light source; after the emission pattern of a particular source is calculated or measured, and then stored, it can be recalled from the library as needed. Recalling a stored emission pattern is faster and more efficient than recalculating it each time it is needed.

System 60 also includes a Backlight Simulator 68, wherein a user specifies the type and location of one or more sources, the geometry and materials/films/surfaces of a reflecting cavity, a film stack, and an output plane. The output plane is commonly where the liquid crystal panel will be located in the display device, although other suitable output planes may be used. Rays are then traced from the source(s) to the output plane. After the rays are traced, their location, direction, and magnitude at the output plane determine the apparent brightness of the backlight display. The apparent brightness is typically expressed as radiance, as a function of viewing angle, and also as a function of the screen location.

After the backlight display radiance is calculated it can be displayed in a variety of manners, including graphically, pictorially, numerically, and so forth. For this purpose the system 60 includes a Virtual Display 70, which displays the simulation results in a manner so that the user can evaluate the backlight display performance, and can compare the performance to a known set of design specifications or criteria.

The numbered elements 62-70 will now be treated in greater detail.

Film Library: Overview

Figure 4:
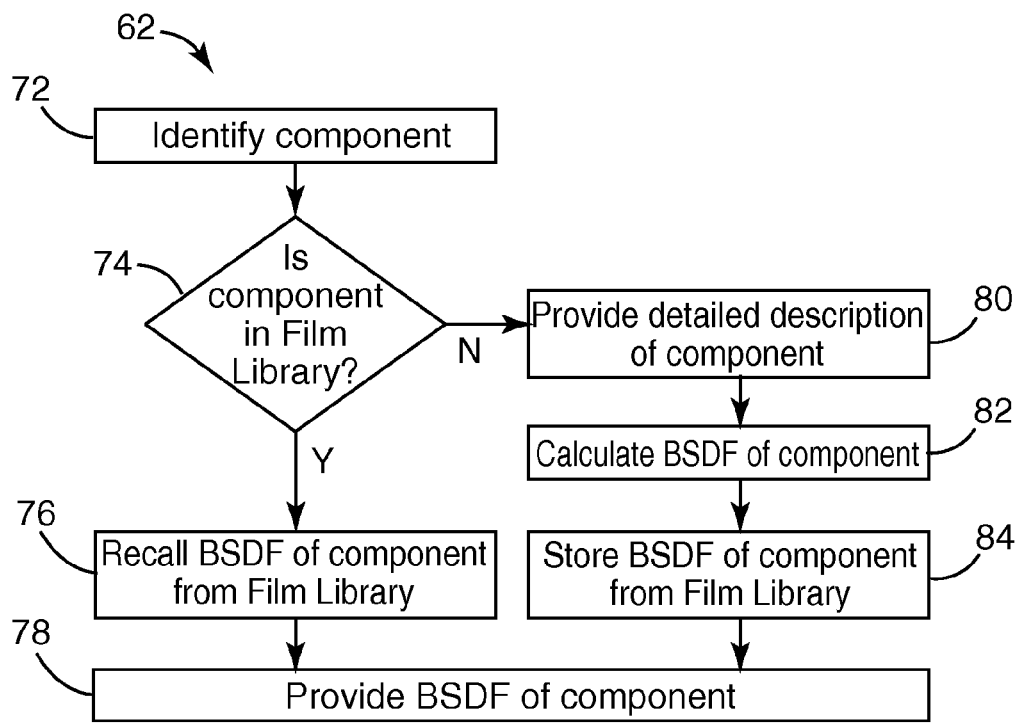
FIG. 4 is a block diagram showing the operation and layout of a film library useable in the backlight simulation system of FIG. 3.

The operation and layout of Film Library 62 is shown schematically in FIG. 4. In step 72, the Film Library 62 identifies a component, such as a particular film, material, or surface. In step 74, if the component is already in the Film Library 62, the BDSF of the component is recalled in step 76 and is then provided in step 78. In step 74, if the component is not in the Film Library 62, then the user provides a detailed description of the component in step 80, the Film Library calculates the BDSF of the component in step 82, the BSDF is stored in step 84 so that it need not be calculated again, and the BSDF is provided in step 78.

We use herein the following terminology, which follows a hierarchy of complexity. The simplest items that may be simulated are known herein as "elements" or "primitive structures". An example of an element is an individual interface with different refractive indices on opposing sides of the interface. Another example of an element is a medium with a particular refractive index and thickness. Next in the hierarchy are "components" or "films", which are made up of two or more elements. For instance, a plane parallel glass plate immersed in air may be made up of three elements: a first interface between air and glass, a glass medium of a particular refractive index, and a second interface between glass and air. Finally, at the top of the hierarchy is a stack or film stack, which can have two or more components in it. For instance, the stack 20 in FIG. 1 has three components. In general, components have a complexity similar to that of commercially available (single) light control films or products, and the stacks may be formed from multiple such components.

The components may be stored as a combination of elements, rather than as a single component. For instance, the glass plate immersed in air described above may be stored as an interface between air and glass, a medium of glass, and an interface between glass and air. A benefit of storing the component in this manner becomes apparent if the plate is bonded to another element or component with a refractive index-matching adhesive; the interface adjacent to the adhesive is no longer between glass and air, but is between glass and the adhesive. Although the components may be stored as their constituent elements, we may nevertheless use the simpler term "component BSDF" rather than "a combination of the BSDFs of the individual elements that make up the component".

Because the BSDFs of many of the simpler elements are relatively straightforward to calculate, they may be recalculated when needed, rather than stored and recalled. These recalculations do not add significantly to the overall amount of calculation required, and they eliminate the need to store the BSDFs of many of the simpler elements.

We assume that most real, physical components can be adequately modeled or simulated by the combination of one or more of the idealized elements described herein. Such models can ordinarily produce simulated results that compare favorably with experimental observation.

Steps 80 and 82 can be technically demanding steps in the Film Library, and the following sections address an explanation of BDSFs, matrix representations of BSDFs, reciprocal symmetries found in BSDFs, the angular basis used for BSDFs, and, finally, the creation of BSDFs for various components. The sections that follow each describe one exemplary embodiment of the film library; for each aspect, other suitable embodiments may be used.

Bidirectional Scattering Distribution Functions (BSDFs)

Consider a nominally-planar, doubly-repeating infinite structure situated in a Cartesian x-y-z coordinate system between parallel reference planes $z=z_b$ and $z=z_a$, with $z_b<z_a$. The medium above the structure is uniform with refractive index $n_a$; that below is uniform with index $n_b$. The lower reference plane is illuminated from below by a spatially-uniform radiance $I^{(i)}$ that is constant within an infinitesimal increment of solid angle $d\hat{s}_i$ about the direction $\hat{s}_i$, and is otherwise zero. Here and elsewhere, the notation "^" denotes a vector quantity of unit length. The superscript "(i)" in $I^{(i)}$ and the subscript "i" in $\hat{s}_i$ refer to "incident" light. Note that $\hat{s}_i \cdot \hat{z} > 0$. We seek to calculate the radiance $I^{(t)}(\hat{s}_t)$ on the upper reference plane which is transmitted by the structure into arbitrary directions $\hat{s}_t$ in an upper hemisphere, with $\hat{s}_t \cdot \hat{z} > 0$, as well as the radiance $I^{(r)}(\hat{s}_r)$ in the lower reference plane which is reflected into arbitrary directions $\hat{s}_r$ in a lower hemisphere, with $\hat{s}_r \cdot \hat{z} < 0$. The superscript "(t)" in $I^{(t)}$ and the subscript "t" in $\hat{s}_t$ denote "transmitted" light, and the superscript "(r)" in $I^{(r)}$ and the subscript "r" in $\hat{s}_r$ denote "reflected" light.

We describe the nominally planar structure as "doubly-repeating". By this we mean that one can select a unit cell of finite size in the horizontal or x-y plane, and the physical characteristics of the entire structure can be fairly represented by copying the unit cell in a step-and-repeat fashion along two orthogonal in-plane axes, such as the x- and y-axes.

In the simplest case of a doubly-repeating structure, the structure is perfectly planar, and homogeneous in refractive index. In other cases, the structure has surface features that deviate from an ideal plane. Alternatively or in addition, the structure may possess refractive index inhomogeneities that may be caused, for example, by voids or other inclusions in an otherwise homogeneous medium. Whether the variability of the structure is associated with surface features or refractive index variations, the variability may be periodic or non-periodic, and it may exist along only one in-plane axis, or along both in-plane axes, or combinations thereof (e.g. periodic along both in-plane axes, or periodic along one axis and non-periodic along another axis, or periodic along one axis and constant (no variability) along an orthogonal axis, and so on).

If the variability of the structure is periodic along an axis, the smallest spatial period or an integer multiple thereof may be selected as the width of the unit cell along that axis. If the variability of the structure is non-periodic along an axis, and assuming the variable features are both (a) small and numerous enough so that an ensemble average fits within a characteristic minimum length, and (b) distributed over the structure in a horizontally stationary fashion (meaning that the statistical properties of features within the characteristic length are independent of its position along the axis), then such characteristic length may be selected as the width of the unit cell along that axis. If the structure is constant (translationally invariant) along an axis, then any desired length, including an infinitesimal length, may be selected as the width of the unit cell along that axis. Advantageously, the repeating nature of the nominally planar structure makes it possible for simulation purposes to isolate a suitable unit cell, and then calculate the spatial dependence of the radiance functions $I^{(t)}$ and $I^{(r)}$ only within the bounds of the unit cell, since $I^{(t)}$ and $I^{(r)}$ will possess the same repetitive characteristic as the structure.

Furthermore, in cases where the unit cell is smaller (in both in-plane directions) than an observable resolution limit, it is appropriate to characterize the radiance functions $I^{(t)}$ and $I^{(r)}$ by their values spatially averaged over the unit cell, such that the radiance functions are spatially uniform. We shall restrict our further attention to these circumstances, where $I^{(t)}$ and $I^{(r)}$, like $I^{(i)}$, depend only upon direction and not on horizontal position.

The relationship between transmitted radiance $I^{(t)}(\hat{s}_t)$ and incident radiance $I^{(i)}(\hat{s}_i)$ is specified by a bidirectional transmissivity distribution function of the surface, $T^{(b)}(\hat{s}_t, \hat{s}_i)$. The relationship between $I^{(r)}(\hat{s}_r)$ and $I^{(i)}(\hat{s}_i)$ is specified by a bidirectional reflectivity distribution function $R^{(b)}(\hat{s}_r, \hat{s}_i)$. The functions $T^{(b)}$ and $R^{(b)}$, each of which is an example of a bidirectional scattering distribution function (BSDF), are usually expressed in integral form, describing the transmitted or reflected radiance in a specified direction arising from an angular distribution of incident radiance, as $$I^{(t)}(\hat{s}_t) = \int_{upwards\ unit\ hemisphere} d\hat{s}_i T^{(b)}(\hat{s}_t, \hat{s}_i) I^{(i)}(\hat{s}_i)$$

$$I^{(r)}(\hat{s}_r) = \int_{upwards\ unit\ hemisphere} d\hat{s}_i R^{(b)}(\hat{s}_r, \hat{s}_i) I^{(i)}(\hat{s}_i)$$

The superscript b is included as a reminder that $T^{(b)}$ and $R^{(b)}$ pertain to incidence from below the surface. There exists a second set of functions, $T^{(a)}$ and $R^{(a)}$, describing the analogous relationships for incidence from above. These relationships are of an identical form, except that the upwards/downwards sense of each argument ŝ is reversed.

A directional unit vector ŝ on the upwards-pointing hemisphere can be written in terms of its horizontal projection $\vec{s}_h$ as $$\hat{s} = \vec{s}_h + (1-s_h^2)^{1/2}\hat{z}$$

Here and elsewhere, the notation "→" denotes a vector quantity. A unit vector ŝ on the downwards-pointing hemisphere can be written similarly, but with the sign of the radical reversed. $I^{(i)}$, $I^{(t)}$, $I^{(r)}$ are functions of ŝ confined to either an upwards-pointing or downwards-pointing hemisphere. Accordingly, each can be represented as a function of just the horizontal projection of its argument, i.e. $I^{(i)}(\vec{s}_{hi})$, $I^{(t)}(\vec{s}_{ht})$, and $I^{(r)}(\vec{s}_{hr})$. Similarly, $T^{(b)}$, $R^{(b)}$, $T^{(a)}$, and $R^{(a)}$ can be expressed as functions of the horizontal projections of their arguments as, for example, $T^{(b)}(\vec{s}_{ht}, \vec{s}_{hi})$ and $R^{(b)}(\vec{s}_{hr}, \vec{s}_{hi})$. The domain of ŝ is the unit hemisphere, and in terms of the spherical-polar coordinates (r, θ, φ) of ŝ the differential element of solid angle dŝ is $$d\hat{s} = \sin\theta d\theta d\phi$$

The domain of $\vec{s}_h$ is the unit circle, and in terms of the plane-polar coordinates of $\vec{s}_h$ the differential element of area $d\vec{s}_h$ is $$d\vec{s}_h = \vec{s}_h ds_h d\phi$$

where $s_h \equiv |\vec{s}_h|$. Since by definition $s_h = \sin\theta$ and the azimuthal angles φ of ŝ and $\vec{s}_h$ are the same, $d\hat{s} = d\vec{s}_h(1-s_h^2)^{-1/2}$ while $ds_h = |\hat{s}\cdot\hat{z}|d\hat{s}$. Thus, in terms of $\hat{s}_h$, the relationships between $I^{(t)}$, $I^{(r)}$, and $I^{(i)}$ are $$I^{(t)}(\vec{s}_{ht}) = \int_{unit\ circle} d\vec{s}_{hi}(1-s_{hi}^2)^{-1/2} T^{(b)}(\vec{s}_{ht}, \vec{s}_{hi}) I^{(i)}(\vec{s}_{hi})$$

$$I^{(r)}(\vec{s}_{hr}) = \int_{unit\ circle} d\vec{s}_{hi}(1-s_{hi}^2)^{-1/2} R^{(b)}(\vec{s}_{hr}, \vec{s}_{hi}) I^{(i)}(\vec{s}_{hi})$$

for incidence from below. The form of these relationships is identical for incidence from above, except that $T^{(a)}(\vec{s}_{ht}, \vec{s}_{hi})$ replaces $T^{(b)}$, and $R^{(a)}(\vec{s}_{hr}, \vec{s}_{hi})$ replaces $R^{(b)}$.

The irradiance F associated with a radiance I(ŝ) confined to directions on either an upwards-pointing or downwards-pointing unit hemisphere is $$F = \int_{unit\ hemisphere} d\hat{s}|\hat{s}\cdot\hat{z}|I(\hat{s}) = \int_{unit\ circle} d\vec{s}_h I(\vec{s}_h)$$

The differential contribution to the irradiance is simply $I(\vec{s}_h)d\vec{s}_h$. Thus, a two-dimensional plot of an amplitude proportional to $I(\vec{s}_h)$ within the unit-circle domain of $\vec{s}_h$ naturally exhibits the relative contributions of different directions to I, because the observer naturally performs area integration when viewing such a plot. Our standard depictions of the directional dependence of the radiance are of this form, so that irradiance may be determined by simply integrating the depicted radiances over their unit-circle domain. In some cases the BSDF of an element, component, or stack may be calculated on only one side, rather than on both sides. Note that for the purposes of this document, the BSDFs of two otherwise identical elements, components, or stacks that are rotated or translated with respect to each other may be considered different, unless such elements, components, or stacks possess rotational or translational invariance, respectively.

Matrix Representations

Matrix representations of the relationships between $I^{(t)}$, $I^{(r)}$, and $I^{(i)}$, each of which is in general a function of direction ŝ, can be obtained by partitioning the unit-circle domain of $\vec{s}_h$ into a finite number N of contiguous finite-area cells, assuming that the transmitted, reflected, and incident radiances can be adequately represented as functions that are constant over the domain of each cell, so that only one radiance value (for each of $I^{(t)}$, $I^{(r)}$, and $I^{(i)}$) is assigned to any given cell. Each cell represents an incremental solid angle oriented in a particular direction on an unit hemisphere. This results in N-by-N matrix relationships of the form $$\underline{I}^{(t)} = \underline{\underline{T}}^{(b)} \underline{I}^{(i)}$$

$$\underline{I}^{(r)} = \underline{\underline{R}}^{(b)} \underline{I}^{(i)}$$

for incidence from below, where $\underline{I}^{(t)}$, $\underline{I}^{(r)}$, and $\underline{I}^{(i)}$ are N-component column vectors whose N elements are each populated with a single number, the number representing the constant or average value of $I^{(t)}$, $I^{(r)}$, and $I^{(i)}$, respectively, in the direction corresponding to the associated cell. $\underline{\underline{T}}^{(b)}$ and $\underline{\underline{R}}^{(b)}$ are N-by-N matrices whose values in a $k^{th}$ column and $l^{th}$ row are given by $$T_{kl}^{(b)} \equiv |s_h(k)|^{-1} \int_{\Delta sh(k)} d\vec{s}_{hi} \int_{\Delta sh(l)} d\vec{s}_{hi}(1-s_{hi}^2)^{-1/2} T^{(b)}(\vec{s}_{ht}, \vec{s}_{hi})$$

$$R_{kl}^{(b)} \equiv |s_h(k)|^{-1} \int_{\Delta sh(k)} d\vec{s}_{hr} \int_{\Delta sh(l)} d\vec{s}_{hi}(1-s_{hi}^2)^{-1/2} R^{(b)}(\vec{s}_{hr}, \vec{s}_{hi}),$$

where $\Delta\vec{s}_h(l)$ denotes the domain of the $l^{th}$ cell, and $|\Delta\vec{s}_h(l)|$ its area. The form of these relationships is identical for incidence from above, except that $\underline{\underline{T}}^{(a)}$ replaces $\underline{\underline{T}}^{(b)}$ and $\underline{\underline{R}}^{(a)}$ replaces $\underline{\underline{R}}^{(b)}$, with $T_{kl}^{(a)}$ and $R_{kl}^{(a)}$ defined identically with $T^{(a)}(\vec{s}_{ht}, \vec{s}_{hi})$ replacing $T^{(b)}$, and $R^{(a)}(\vec{s}_{hr}, \vec{s}_{hi})$ replacing $R^{(b)}$. Here and elsewhere, the conventional double underlining notation is used to denote a matrix, and single underlining is used to denote a column vector (i.e., a matrix having only one column).

Reciprocal Symmetries

Electromagnetic reciprocity imposes certain symmetries in the functions $T^{(b)}$, $R^{(b)}$, $T^{(a)}$, and $R^{(a)}$, which in turn impose certain symmetries in the matrix representations of these functions $\underline{\underline{T}}^{(b)}$, $\underline{\underline{R}}^{(b)}$, $\underline{\underline{T}}^{(a)}$, and $\underline{\underline{R}}^{(a)}$. These matrix symmetries are of a particularly simple form whenever the area of each cell within the partitioned unit-circle domain is the same. These are $$\underline{\underline{R}}^{(a)} = \underline{\underline{R}}^{(a)t}$$

$$\underline{\underline{R}}^{(b)} = \underline{\underline{R}}^{(b)t}$$

$$\frac{n_a}{n_b}\underline{\underline{T}}^{(a)} = \frac{n_b}{n_a}\underline{\underline{T}}^{(b)t},$$

where $\underline{\underline{A}}^t$ denotes the transpose of $\underline{\underline{A}}$ (the result of interchanging the k, l and l, k elements for every combination of k and l such that k<l). $\underline{\underline{R}}^{(a)}$ and $\underline{\underline{R}}^{(b)}$ are symmetric, each with N (N+1)/2 unique elements. Both $\underline{\underline{T}}^{(a)}$ and $\underline{\underline{T}}^{(b)}$ are generally non-symmetric, but either may be determined from the other by transposition. Of the total $4N^2$ elements in $\underline{\underline{T}}^{(b)}$, $\underline{\underline{R}}^{(b)}$, $\underline{\underline{T}}^{(a)}$, and $\underline{\underline{R}}^{(a)}$, only $N(N+1)+N^2$, or about $2N^2$, are unique.

Angular Basis

Figure 8:
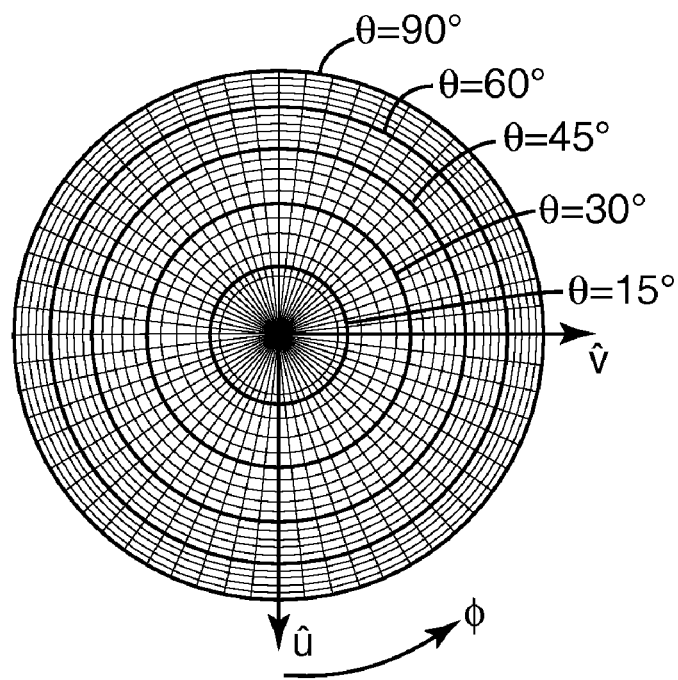
FIG. 8 is a diagram illustrating equal-area partitioning of a unit circle for characterizing the direction of a light ray.

One way, but by no means the only way, of partitioning the unit circle is accomplished by an N'-by-N" polar array of N=N'N" equal-area cells, each spanning 360/N" degrees of azimuth and an increment of squared radius equal to 1/N'. This partitioning scheme achieves equal-area cells, a convenience for simplifying the form of BSDF matrices, in an array possessing N"-fold rotational symmetry, a requirement for exploiting physical symmetry factoring of the matrices. We typically utilize a 1200-cell partitioning achieved with N'=20 and N"=60, illustrated in FIG. 8, where darker reference circles are also provided to show the location of polar angles θ=15, 13, 45, 60, and 90 degrees, and orthogonal reference axes û and v̂ are also shown. Cells can be referenced in a standard order of increasing azimuthal and then radial indices. For example, the azimuthal index may increase from 1 to N" as the azimuthal angle φ relative to û v̂ increases from −180 to +180 degrees in a counterclockwise direction. The radial index may increase from 1 to N' as the radius (the sine of the polar angle θ) increases from 0 to 1. Using a partitioning scheme such as this, cells at or near the center of the unit circle correspond to directions at or near normal to the base of the unit hemisphere (small polar angles), and cells at or near the edge of the unit circle correspond to directions at or near grazing angles to the base of the unit hemisphere (large polar angles). One can depict the angular distribution of radiance by displaying the N radiance values of the column vector $\underline{I}$ in their corresponding N cells (the radiance represented, for example, in false color) throughout the cell domain depicted in FIG. 8. This is analogous to viewing I(ŝ) as a function of the projection of the direction ŝ (covering a hemisphere of directions) into the horizontal plane. The irradiance associated with I(ŝ) is simply pi times the average radiance, i.e., pi times the average of the N values of $\underline{I}$.

Element BSDFs

The following sections describe the calculation of the BDSFs of various individual elements or primitive structures, which may be considered as building blocks for more complete components. The BDSFs of the individual elements or structures may then be combined to form the BSDFs of components such as films commonly used in backlight displays. In the discussion that follows, idealized Fresnel interfaces, multilayer stacks, attenuating layers, scattering layers, structured surfaces, backplanes, Lambertian interfaces, and composite interfaces are given as examples of individual elements or primitive structures, but this discussion is not intended to be limiting. Diffuser plates and brightness enhancing prismatic films are then described as exemplary backlight components, and that discussion also is not intended to be limiting.

Where appropriate, various components may be combined to form a stack or film stack, meaning that a combined BSDF is formed from the BSDFs of the various components in the stack. In practice, the simulation may be done with the elements or primitive structures corresponding to the components, rather than with the stored BSDFs of the components themselves. Also, the Film Library may calculate the BSDFs of many elements or primitive structures each time they are required, rather than storing them and recalling them later.

Fresnel Interfaces

By a Fresnel interface we mean a planar interface separating media possessing distinct real indices of refraction. The upper and lower surfaces of a glass plate are examples of surfaces that can be modelled as Fresnel interfaces. The bidirectional scattering distribution functions $T^{(b)}(\vec{s}_{ht}, \vec{s}_{hi})$ etc. of a Fresnel interface can be expressed in terms of the familiar Fresnel reflection coefficients by inspection, relying solely upon the equality of angles of incidence and reflection, Snell's Law of refraction, and the conservation of energy.

When these are substituted into the formulae for their matrix representations $\underline{\underline{T}}^{(b)}$, etc., three of the four required integrations can be completed analytically, due to the unidirectional nature of both the transmitted and reflected radiances. The resulting expressions are $$T_{kl'}^{(b)} = \delta(k'', l'')N' \int_{Ov(l',k';(n_a/n_b)^2)} ds_{hi}^2 \left(1 - R\left(\vec{s}_{hi}; \frac{n_a}{n_b}\right)\right)$$

$$R_{kl'}^{(b)} = \delta(k', l')\delta(k'', l'')N' \int_{\frac{l'-1}{N'}}^{\frac{l'}{N'}} ds_{hi}^2 R\left(\vec{s}_{hi}; \frac{n_a}{n_b}\right)$$

where $$R_\perp(x; n) \equiv \left|\frac{\sqrt{1-x^2} - \sqrt{n^2-x^2}}{\sqrt{1-x^2} + \sqrt{n^2-x^2}}\right|^2$$

$$R_\parallel(x; n) \equiv \left|\frac{n^2\sqrt{1-x^2} - \sqrt{n^2-x^2}}{n^2\sqrt{1-x^2} + \sqrt{n^2-x^2}}\right|^2$$

$$R(x; n) \equiv \frac{1}{2}(R_\perp(x; n) + R_\parallel(x; n))$$

|ẑ| denotes the magnitude of the potentially-complex quantity ẑ, and the integral over $s_{hi}^2$ in the expression for $T_{kl}^{(b)}$ extends over values such that $$(l'-1)/N' < s_{hi}^2 < l'/N'$$

and $$(n_a/n_b)^2(k'-1)/N' < s_{hi}^2 < (n_a/n_b)^2(k'/N'),$$

which is denoted by Ov(l', k'; $(n_a/n_b)^2$). Expressions for $T_{kl}^{(a)}$ and $R_{kl}^{(a)}$ are obtained by simply reversing the roles of $n_b$ and $n_a$. Here and elsewhere, the delta functions such as δ(k",l") are defined to be one (1.0) when the arguments of the function are the same, in this case k"=l", and zero when the arguments are different, in this case k"≠l".

If the indices are ordered with l' and k' varying first, $\underline{\underline{T}}^{(b)}$ is a diagonal array of N" identical N'-by-N' blocks, each composed of the elements $T_{k',1,1',1}^{(b)}$. When $(n_a/n_b) > 1$, the rows of this block vanish for $((k'-1)/N') (n_a/n_b)^2 > 1$, representing the containment of transmitted light to the cone $s_{ht} < (n_b/n_a)$. When $(n_a/n_b) < 1$, the columns vanish for $((l'-1)/N') > (n_a/n_b)^2$, representing the occurrence of total internal reflection for $s_{hi} > (n_b/n_a)$. For the same ordering of the indices, $\underline{\underline{R}}^{(b)}$ is a similar diagonal array of N" identical blocks, but for $\underline{\underline{R}}^{(b)}$ each block is also diagonal, possessing N' non-zero diagonal elements.

Reciprocity forces both $\underline{\underline{R}}^{(b)}$ and $\underline{\underline{R}}^{(a)}$ to be diagonal matrices (and hence symmetric), and it also means that $$T_{lk}^{(b)} = (n_a/n_b)^2 T_{kl}^{(a)}.$$

$\underline{\underline{T}}^{(b)}$ can thus be calculated by transposing $\underline{\underline{T}}^{(a)}$, and scaling the result by $(n_a/n_b)^2$.

Layered Media

By a layered medium we mean one or more plane-parallel layers possessing distinct indices of refraction, embedded between upper and lower media possessing potentially-distinct real indices of refraction. The refractive indices of the embedded layers may be real or complex, and may be isotropic or birefringent; the thicknesses of the individual layers may be large, small, or moderate relative to an optical wavelength; and there may be arbitrarily many (as in a multilayer stack) or as few as one such layer. For instance, an Enhanced Specular Reflector (ESR) visible-mirror film manufactured by 3M Company is an example of a multilayer stack possessing over 500 alternating layers of isotropic PMMA and birefringent PEN, each of order 100-nm thickness, sandwiched between order 5 -μm skins of birefringent PEN. The specific layer thicknesses provide a high reflectivity which is largely independent of incidence angle and wavelength over the visible spectrum. In air, ESR is a multilayer stack between media of indices $n_a=n_b=1.00$. When, for example, it is laminated atop a glass plate using an adhesive of index n=1.50, the same ESR is a multilayer stack between upper and lower media of indices $n_a=1.00$ and $n_b=1.50$.

The plane-parallel structure of a layered medium forces the form of the fields in the incident and transmitted media to be the same as those for a Fresnel interface between media of the same indices. This is true even if the embedded layer(s) of the layered medium exhibit dielectric anisotropy. Only the values of the complex reflection and transmission coefficients are altered by the presence of the layer(s). These we calculate using the method disclosed in Berreman, D. W., Optics in Stratified and Anisotropic Media; 4×4-Matrix Formulation, J. Opt. Soc. Am. 62, 502-510 (1972). If we denote the polarization-dependent values so calculated as $R_{ab}$ and $T_{ab}$, with a and b denoting parallel ∥ or perpendicular ⊥, respectively, then the power reflected or transmitted per unit horizontal area relative to incident unpolarized light is $$R(\vec{s}_{hi}; n_i, n_t; \tau_1, \ldots, \tau_N; \underline{\varepsilon}_1 \ldots \underline{\varepsilon}_N) = (\tfrac{1}{2})(|R_{\|\|}|^2 + |R_{\|\perp}|^2 + |R_{\perp\perp}|^2 + |R_{\perp\|}|^2)$$

$$T(\vec{s}_{hi}; n_i, n_t; \tau_1, \ldots, \tau_N; \underline{\varepsilon}_1 \ldots \underline{\varepsilon}_N) = (n_t \cos\theta_t)/(n_i \cos\theta_i)(\tfrac{1}{2})(|T_{\|\|}|^2 + |T_{\|\perp}|^2 + |T_{\perp\perp}|^2 + |T_{\perp\|}|^2)$$

where $\theta_i$ is the polar angle of incidence, $n_i$ and $n_t$ are the real indices of the incident and transmitted media, $n_t \sin\theta_t = n_i \sin\theta_i$, and $\cos\theta_t = (1-\sin^2\theta_t)^{1/2}$. The ratios depend upon the indices of the incident and transmitted media, the dimensionless thicknesses ($\tau_i \equiv k_0 t_i$) and relative permittivities $\underline{\varepsilon}_i$ of the embedded layers, and in general both the polar and azimuthal components of the direction of incidence $\vec{s}_{hi}$. (It is only when the layered medium is 'balanced', meaning that the refractive index of every layer is isotropic within the horizontal plane, that the reflectivity and transmissivity depend only upon $|\vec{s}_{hi}|$.) In terms of R and T, the elements of the matrix BSDFs are $$R_{k\ell}^{(b)} = \delta(k', \ell')\delta(k'', \ell'')\frac{N}{\pi}$$

$$\int_{\frac{\ell'-1}{N'}}^{\frac{\ell'}{N'}} ds_{hi}^2 \int_{\frac{2(\ell''-1)-N''}{N''}\pi}^{\frac{2\ell''-N''}{N''}\pi} d\phi_i R(\vec{s}_{hi}; n_b, n_a; \tau_1 \ldots \tau_N; \underline{\varepsilon}_1 \ldots \underline{\varepsilon}_N)$$

$$R_{k\ell}^{(a)} = \delta(k', \ell')\delta(k'', \ell'')\frac{N}{\pi}$$

$$\int_{\frac{\ell'-1}{N'}}^{\frac{\ell'}{N'}} ds_{hi}^2 \int_{\frac{2(\ell''-1)-N''}{N''}\pi}^{\frac{2\ell''-N''}{N''}\pi} d\phi_i R(\vec{s}_{hi}; n_a, n_b; \tau_N \ldots \tau_1; \underline{\varepsilon}_N \ldots \underline{\varepsilon}_1)$$

$$T_{k\ell}^{(a)} = (k'', \ell'')\frac{N}{\pi}$$

$$\int_{OV(\ell', k'; (n_a/n_b)^2)} \int_{\frac{2(\ell''-1)-N''}{N''}\pi}^{\frac{2\ell''-N''}{N''}\pi} d\phi_i T(\vec{s}_{hi}; n_a, n_b; \tau_N \ldots \tau_1; \underline{\varepsilon}_n \ldots \underline{\varepsilon}_1)$$

$\underline{\underline{T}}^{(b)}$ is calculated by transposing $\underline{\underline{T}}^{(a)}$ and scaling by $(n_a/n_b)^2$.

Attenuating Layers

By an attenuating layer we mean a plane-parallel non-scattering layer of uniform index n that exhibits a relative absorption per unit path length equal to α. Uniformly-thick optical-quality glass is an example of an attenuating layer, whose index is approximately n=1.50, and whose absorption per unit path length $\alpha = (4\pi n''/\lambda)$ is typically 0.011 mm$^{-1}$ at λ=550 nm, corresponding to an imaginary component of the refractive index equal to $5 \times 10^{-7}$. An attenuating layer in isolation reflects no light. For example, the reflections from a plate of glass arise entirely from reflections at the top and bottom Fresnel interfaces, which separate the attenuating glass from the surrounding media. But attenuating layers do diminish the transmissivity to values less than one, in a manner that depends upon the polar angle of propagation insofar as this determines the path length through the uniformly-thick layer.

The elements of the matrix BSDFs of an attenuating layer are $$R_{k\ell}^{(a)} = R_{k\ell}^{(b)} = 0$$

$$T_{k\ell}^{(a)} = T_{k\ell}^{(b)}$$

$$= \delta(k', \ell')\delta(k'', \ell'')N' \int_{\frac{\ell'-1}{N'}}^{\frac{\ell'}{N'}} ds_{hi}^2 e^{-\alpha T/\sqrt{1-s_h^2}}$$

$$= \delta(k', \ell')\delta(k'', \ell'')N'\tau^2 \left[\frac{z^2 E_1(z) + (1-z)e^{-z}}{z^2}\right]_{z(\ell')}^{z(\ell'-1)}$$

where T (not to be confused with the bidirectional transmissivity distribution function T on the left-hand side of the equation) is the thickness of the layer, $\tau \equiv \alpha T$, $z(l') = \tau(N'/(N'-l'))^{1/2}$, and $E_1(z)$ is the exponential integral disclosed in Abramowitz, M. and Stegun, I. A., Handbook of Mathematical Functions, Dover Publications, New York, 1965. Note that $\underline{\underline{T}}^{(b)}$ and $\underline{\underline{T}}^{(a)}$ are identical diagonal matrices. They nevertheless satisfy the reciprocal-symmetry conditions, since $n_a = n_b = n$ for an attenuating layer, and diagonal matrices are invariant under transposition.

Scattering Layers

By a scattering layer we mean a plane-parallel layer of uniformly randomly distributed refractive index inhomogeneities within a host of otherwise uniform refractive index n. We assume that the individual scattering events produced by the inhomogeneities create distributions of scattered radiance that depend only upon the angle between the incident and scattered directions. Such scattering is expected from either spherical inhomogeneities, aspherical inhomogeneties with an isotropic distribution of orientations, or any mixture of these. And we assume that individual scattering events are sufficiently separated that multiple interactions of light between distinct scatterers can be treated incoherently. The interiors of many films commercially available from 3M Company known as Scotchcal films, having random dispersions of titanium-oxide particles within a vinyl host, are examples of media that can be approximated as scattering layers.

We calculate the matrix transmissivity and reflectivity BSDFs of a scattering layer by solving the Radiative Transfer Equation for a horizontal stratum of a uniform scattering medium using the matrix-exponential approach disclosed in Waterman, P. C., Matrix-Exponential Description of Radiative Transfer, J. Opt. Soc. Am. 71, 410-422 (1981). We characterize single-scattering events within the stratum by a scattering albedo ω and a Henyey-Greenstein scattering phase function parameterized in terms of the average value of the cosine of the scattering angle g, and we characterize the combined effects of the extinction per unit volume and the thickness of the stratum by an optical thickness τ. Note that non-unit values of the scattering albedo may represent either non-conservative single-scattering events, absorption within the host between scattering events, or any combination of these effects.

One solution procedure can involve four steps:

(1) expressing the angular dependence of the Radiative Transfer Equation in our angular basis, resulting in a first-order matrix differential equation describing the z-dependence of the upwards and downwards-propagating components of the radiance resolved in the same angular basis;

(2) expressing the formal solution of this differential equation as a matrix exponential, and this matrix exponential as a linear-algebraic function of $\underline{\underline{R}}^{(a)}=\underline{\underline{R}}^{(b)}=\underline{\underline{R}}$ and $\underline{\underline{T}}^{(a)}=\underline{\underline{T}}^{(b)}=\underline{\underline{T}}$ (by simple symmetry considerations, the BSDFs of a scattering layer are independent of the sense of incidence);

(3) diagonalizing the argument to permit calculation of the matrix exponential; and (4) inverting the linear-algebraic functions to determine $\underline{\underline{R}}$ and $\underline{\underline{T}}$.

Conservative scattering (ω=1) calls for special treatment of the diagonalization to compensate for degeneracies, and moderate to large optical thicknesses call for a perturbative inversion relative to an analytic result. All of these aspects of the solution are addressed by Waterman; we recast the formalism of Waterman in our angular basis, and simplify the perturbative inversion by exploiting the speed and accuracy of modern computing. The pairs $\underline{\underline{R}}^{(b)}$ and $\underline{\underline{R}}^{(a)}$, and $\underline{\underline{T}}^{(b)}$ and $\underline{\underline{T}}^{(a)}$, are identical symmetric matrices, which satisfy the reciprocal-symmetry conditions since $n_a=n_b=n$ for a scattering layer.

Structured Surfaces

By a structured surface we mean any doubly-repeating non-planar interface between an upper and lower media of distinct index of refraction. The interface therefore possesses deviations or displacements from planarity, and can be fairly represented (globally) by copying a unit cell of finite size in a step-and-repeat fashion along two orthogonal in-plane axes, as discussed above. The unit cell of the displacements is assumed large relative to an optical wavelength, yet small relative to the scales on which observations can resolve spatial variations in radiance. Local variations in displacement within the unit cell are assumed to occur predominantly on horizontal scales large relative to a wavelength, so that the 'scattering' of light is well described by incoherent reflection and transmission by locally-flat surfaces. Many films commercially available from 3M Company and known as Brightness Enhancement Films provide examples of structured surfaces. For example, the non-planar side of Vikuiti™ brand BEF-II 90/50 is a translationally-invariant sawtooth interface between n≈1.50 acrylic and n=1.00 air created by parallel 90-degree prisms occurring on a 50-μm pitch.

As the complexity of the non-planar interface increases, the prospects for closed-form expressions for the matrix BSDFs diminish. In these circumstances, the elements of $\underline{\underline{R}}^{(b)}$, $\underline{\underline{R}}^{(a)}$, $\underline{\underline{T}}^{(b)}$ and $\underline{\underline{T}}^{(a)}$ can be calculated by a method other than direct integration of the functions $R^{(b)}$, $R^{(a)}$, $T^{(b)}$ and $T^{(a)}$. Instead, conventional ray-trace simulation can be used to calculate the matrix elements, as long as the characteristic dimensions of the structure are large relative to an optical wavelength. The following paragraphs describe a methodology by which virtually any ray-trace 'engine' can be used to estimate the elements of $\underline{\underline{R}}^{(b)}$, $\underline{\underline{R}}^{(a)}$, $\underline{\underline{T}}^{(b)}$ and $\underline{\underline{T}}^{(a)}$ via simulation.

Note that the power incident upon the unit cell when an interface is illuminated from below by a spatially-uniform radiance that is constant and equal to $I_l^{(i)}$ for $\vec{s}_{hi}$ within $\Delta \vec{s}_h(l)$ and otherwise zero is $$P_l^{(i)} = A|\Delta \vec{s}_h(l)|I_l^{(i)}$$

where A is the area of the unit cell. The resulting power transmitted from the unit cell into directions $\vec{s}_{ht}$ within $\Delta \vec{s}_h(k)$ is $$P_k^{(t)} = A\int_{\Delta sh(k)} d\vec{s}_{ht} \int_{\Delta sh(l)} d\vec{s}_{hi}(1-s_{hi}^2)^{-1/2} T^{(b)}(\vec{s}_{ht}, \vec{s}_{hi})I_l^{(i)},$$

while the power reflected into directions $\vec{s}_{hr}$ within $\Delta s_h(k)$ is $$P_k^{(r)} = A\int_{\Delta sh(k)} d\vec{s}_{hr} \int_{\Delta sh(l)} d\vec{s}_{hi}(1-s_{hi}^2)^{-1/2} R^{(b)}(\vec{s}_{hr}, \vec{s}_{hi})I_l^{(i)}.$$

In terms of these powers, the elements of the bidirectional transmissivity distribution function matrix $\underline{\underline{T}}^{(b)}$ and the bidirectional reflectivity distribution function matrix $\underline{\underline{R}}^{(b)}$ are $$T_{kl}^{(b)} \equiv |\Delta \vec{s}_h(k)|^{-1} \int_{\Delta sh(k)} ds_{ht} \int_{\Delta sh(l)} ds_{hi}(1-s_{hi}^2)^{-1/2} T^{(b)}(\vec{s}_{ht}, \vec{s}_{hi}) = (P_k^{(t)}/P_l^{(i)})$$

$$R_{kl}^{(b)} \equiv |\Delta \vec{s}_h(k)|^{-1} \int_{\Delta sh(k)} ds_{hr} \int_{\Delta sh(l)} ds_{hi}(1-s_{hi}^2)^{-1/2} R^{(b)}(\vec{s}_{hr}, \vec{s}_{hi}) = (P_k^{(r)}/P_l^{(i)})$$

where the final equalities are the result of our equal-area paritioning of the unit circle. Thus, the elements of $\underline{\underline{T}}^{(b)}$ and $\underline{\underline{R}}^{(b)}$ incorporate the directionally-dependent partitioning of incident power into transmitted and reflected components. A ray-trace simulation discerns exactly this partitioning (as well as the complement of the incident power that is absorbed). Thus, tracing an ensemble of rays incident from below the structure with $\hat{s} = \vec{s}_h + (1-s_h^2)^{1/2} \hat{z}$ and $\vec{s}_h$ confined to $\Delta \vec{s}_h(l)$ specifies the fth column of both $\underline{\underline{T}}^{(b)}$ and $\underline{\underline{R}}^{(b)}$. The full matrices are determined by considering ensembles confined to each $\Delta \vec{s}_h(l)$, for l=1 to N in turn. Similarly, tracing an ensemble of rays incident from above with $\hat{s} = \vec{s}_h - (1-s_h^2)^{1/2} \hat{z}$ for each $\Delta \vec{s}_h(l)$ in turn determines $\underline{\underline{T}}^{(a)}$ and $\underline{\underline{R}}^{(a)}$.

The prescribed incident radiance should be spatially uniform over the unit cell and constant within the domain of $\Delta \vec{s}_h(l)$. An ensemble of incident rays representing such a radiance can be generated by selecting unit-power rays distributed uniformly in area with $\Delta \vec{s}_h(l)$, and independently distributed uniformly in area within the unit cell. Then the increment of power incident within any subelement of both A and $\Delta \vec{s}_h(l)$ is $$dP = \eta_A dA \eta_{sh} |d\vec{s}_h|$$

where $\eta_A$ and $\eta_{sh}$ are the number densities of rays in the area of the unit cell and the area of the domain of $\vec{s}_h$, respectively. dP is proportional to dA and $|d\vec{s}_h|$, but independent of the local values of position and $\vec{s}_h$, as is required for the prescribed radiance.

The resulting matrices $\underline{\underline{R}}^{(b)}$, $\underline{\underline{R}}^{(a)}$, $\underline{\underline{T}}^{(b)}$ and $\underline{\underline{T}}^{(a)}$ will be exact only in the limit as the number of rays in each ensemble approaches infinity. In this limit they will exhibit the symmetries demanded by reciprocity. For any finite number of incident rays, i.e., in all practical cases, the integrity of the simulation estimates can be enhanced by replacing $\underline{\underline{R}}^{(a)}$, $\underline{\underline{R}}^{(b)}$, $(n_a/n_b)\underline{\underline{T}}^{(a)}$ and $(n_b/n_a)\underline{\underline{T}}^{(b)t}$ by the values $$\underline{\underline{R}}^{(a)}=(1/2)(\underline{\underline{R}}^{(a)}+\underline{\underline{R}}^{(a)t})$$

$$\underline{\underline{R}}^{(b)}=(1/2)(\underline{\underline{R}}^{(b)}+\underline{\underline{R}}^{(b)t})$$

$$(n_a/n_b)\underline{\underline{T}}^{(a)}=(n_b/n_a)\underline{\underline{T}}^{(b)t}=(1/2)((n_a/n_b)\underline{\underline{T}}^{(a)}+(n_b/n_a)\underline{\underline{T}}^{(b)t})$$

where the matrices on the right-hand sides are the original values from the simulation. The impact upon the statistical noise in $\underline{\underline{T}}$ and $\underline{\underline{R}}$ roughly corresponds to doubling the number of incident rays in each ensemble. The matrices on the left-hand sides satisfy the reciprocal-symmetry conditions regardless of the level of statistical noise in the original simulation matrices.

Backplanes

By a backplane we mean an optically-thick plane-parallel layer of uniform complex refractive index n=n'+in" sandwiched between upper and lower media of real index $n_a$ and $n_b$, respectively. The imaginary component of the refractive index is assumed positive, and the optical thickness sufficiently large that the transmissivity of the sandwiched layer is zero.

A sheet of aluminum that provides structural support for the side or back walls of a backlight cavity (and to whose interior surface might be laminated a highly-reflective film) is an example of a backplane.

The bidirectional reflectivity distribution functions (BRDFs, which are special cases of BSDFs) of a backplane can be expressed in terms of the familiar Fresnel reflection coefficients by inspection, and the resulting expressions integrated (with three of the four required integrals completed analytically) to determine the matrix BRDFs. The net result is $$R_{k\ell}^{(b)} = \delta(k', \ell')\delta(k'', \ell'')N' \int_{\ell'-1/N'}^{\ell'/N'} ds_{hi}^2 R\left(\vec{s}_{hi}; \frac{n}{n_b}\right)$$

$$R_{k\ell}^{(a)} = \delta(k', \ell')\delta(k'', \ell'')N' \int_{\ell'-1/N'}^{\ell'/N'} ds_{hi}^2 R\left(\vec{s}_{hi}; \frac{n}{n_a}\right)$$

where R(x; n) denotes the polarization-averaged Fresnel reflectivity described above (but here calculated for a complex argument n). The bidirectional transmissivity distribution functions (BTDFs, also special cases of BSDFs) and their matrix representations $\underline{\underline{T}}^{(b)}$ and $\underline{\underline{T}}^{(a)}$ are identically zero, by virtue of the assumed total opacity of the sandwiched layer. Clearly these matrix BSDFs satisfy the reciprocal-symmetry conditions.

A backplane can be modeled as a layered medium having only a single-layer, whose refractive index is isotropic and equal to n'+in", and whose dimensionless thickness is such that $n''\tau_1 \gg 1$. Thus, the backplane is not a new component, but rather a special case of the layered media components already discussed above. However, the results of the Berreman formulation assume a particularly simple and familiar form for the special case (frequently encountered in backlight designs) pertaining to a backplane. It therefore proves expedient to consider backplanes as distinct from layered media, in both a software implementation of, and a body of understanding of, component BSDFs.

A backplane can usually not be modeled as the composite construction of (1) a Fresnel interface between a lower medium of index nb and an upper medium of index n', underlying (2) an attenuating layer possessing a relative absorption per unit path length equal to $\alpha=4\pi n''/\lambda$ and thickness T such that $\alpha T \gg 1$, underlying (3) a Fresnel interface between a lower medium of index n' and an upper medium of index $n_a$. The reflectivity of a backplane, specified by R(x; n) with a complex argument n, generally cannot be reproduced by Fresnel interfaces between real media sandwiching an attenuating layer. It is only in the limit of n" approaching zero with $\alpha T \gg 1$ that the backplane and this composite construction produce comparable results.

Lambertian Interfaces

By a Lambertian interface we mean a surface that separates a lower medium of refractive index $n_b$ and an upper medium of refractive index $n_a$ and that exhibits ideal Lambertian scattering characteristics. There exist a variety of real interfaces that can, in appropriate circumstances, be approximated as Lambertian. For example, the interface formed by extreme roughening of a Fresnel interface, or that formed by the application of a thin layer containing a high concentration of highly-scattering particles to such an interface. However, the Lambertian assumption is usually an idealization, and in many circumstances an interface that might be modeled as Lambertian can be more realistically modeled as a combination of other components (e.g. as an optically-thick scattering layer applied to a Fresnel interface).

The radiative-transport properties of a Lambertian interface are described by the direction-independent total reflectivity $R^{(a,b)}$ and transmissivity $T^{(a,b)}$ of the surface. $R^{(a,b)}$ is defined as the reflected power per unit surface area divided by the incident power per unit surface area, and $T^{(a,b)}$ is defined as the transmitted power per unit surface area divided by the incident power per unit surface area, with each for incidence from either above or below the surface. The BSDFs are $$R^{(b)}(\vec{s}_{hr}, \vec{s}_{hi}) = \pi^{-1}(1-s_{hi}^2)^{1/2} R^{(b)}$$

$$R^{(a)}(\vec{s}_{hr}, \vec{s}_{hi}) = \pi^{-1}(1-s_{hi}^2)^{1/2} R^{(a)}$$

$$T^{(b)}(\vec{s}_{hr}, \vec{s}_{hi}) = \pi^{-1}(1-s_{hi}^2)^{1/2} T^{(b)}$$

$$T^{(a)}(\vec{s}_{hr}, \vec{s}_{hi}) = \pi^{-1}(1-s_{hi}^2)^{1/2} T^{(a)}$$

The reflected and transmitted radiances are independent of direction, and proportional to R or T times the irradiance incident upon the surface. Conservation of energy requires that the total irradiance reflected and transmitted equal one minus the absorptivity times the incident radiance:

$$R^{(b)}+T^{(b)}=1-A^{(b)}$$

$$R^{(a)}+T^{(a)}=1-A^{(a)}.$$

Reciprocity requires $$(n_a/n_b)(1-s_{hi}^2)^{1/2}T^{(a)}(\vec{s}_{hr}, \vec{s}_{hi})=(n_b/n_a)(1-s_{hi}^2)^{1/2}T^{(b)}(\vec{s}_{hi}, \vec{s}_{hr})$$

or $$(n_a/n_b)T^{(a)}=(n_b/n_a)T^{(b)}.$$

Thus, in the most-general case there are only three independent parameters. We select these as $T^{(b)}$, $A^{(b)}$, and $A^{(a)}$:

$$0 \leq T^{(b)} \leq 1$$

$$R^{(b)} = 1 - A^{(b)} - T^{(b)}$$

$$0 \leq A^{(b)} \leq 1 - T^{(b)}$$

$$R^{(a)} = 1 - A^{(a)} - (n_b/n_a)^2 T^{(b)}$$

$$0 \leq A^{(a)} \leq 1 - (n_b/n_a)^2 T^{(b)}$$

$$T^{(a)} = (n_b/n_a)^2 T^{(b)}.$$

There is only one independent parameter ($0 \leq T^{(b)} \leq 1$) for interfaces free of absorption.

In our equal-area angular basis, the elements of $\underline{\underline{T}}^{(b)}$, $\underline{\underline{R}}^{(b)}$, $\underline{\underline{T}}^{(a)}$, and $\underline{\underline{R}}^{(a)}$ are $$R_{kl}^{(b)} = (1/N)(1 - A^{(b)} - T^{(b)})$$

$$R_{kl}^{(a)} = (1/N)(1 - A^{(a)} - (n_b/n_a)^2 T^{(b)})$$

$$T_{kl}^{(b)} = (1/N)(T^{(b)})$$

$$T_{kl}^{(a)} = (1/N)((n_b/n_a)^2 T^{(b)}).$$

Each matrix is simply a constant times an N-by-N array whose elements are all one (1.0). Clearly these matrices satisfy the reciprocal-symmetry conditions.

Composite Interfaces

By a composite interface we mean an interface between a lower medium of refractive index $n_b$ and an upper medium of refractive index $n_a$ for which different portions or sub-elements of the interfacial plane possess different scattering characteristics, i.e., different reflectivity and/or transmissivity characteristics as exemplified by distinct sets of BSDFs. The different sub-elements form a doubly-repeating spatial pattern. Thus, the interface with its pattern of different scattering characteristics can be fairly represented (globally) by copying a unit cell of finite size in a step-and-repeat fashion along two orthogonal in-plane axes, as discussed above. Along a given in-plane axis, the pattern may be periodic, non-periodic, or constant (translationally invariant). We assume as before that the unit cell is smaller than the observable resolution limit. Dot patterns of diffuse white ink printed on acrylic waveguides, when observed through a diffusing film or plate, are examples of composite interfaces, composed of Fresnel and Lambertian sub-elements situated between refractive index 1.50 and 1.00 media.

The local area-averaged radiances observed from a composite interface can be readily calculated using an area-weighted average of the BSDFs of the sub-elements making up the interface. Thus, for example, for a surface having sub-elements possessing BSDFs $\underline{\underline{R}}_1^{(b)}$, $\underline{\underline{T}}_1^{(b)}$, $\underline{\underline{R}}_1^{(a)}$, and $\underline{\underline{T}}_1^{(a)}$, and $\underline{\underline{R}}_2^{(b)}$, $\underline{\underline{T}}_2^{(b)}$, $\underline{\underline{R}}_2^{(a)}$, and $\underline{\underline{T}}_2^{(a)}$, occupying fractional areas $f_1$ and $1 - f_1$ respectively, the BSDFs of the composite interface are $$\underline{\underline{R}}^{(a,b)} = f_1 \underline{\underline{R}}_1^{(a,b)} + (1 - f_1) \underline{\underline{R}}_2^{(a,b)}$$

$$\underline{\underline{T}}^{(a,b)} = f_1 \underline{\underline{T}}_1^{(a,b)} + (1 - f_1) \underline{\underline{T}}_2^{(a,b)}.$$

The composite BSDFs satisfy the reciprocal-symmetry conditions as long as those of the individual sub-elements do. The extension of these formulae to composite interfaces possessing more than two distinct sub-elements is straightforward.

Component BSDFs

The BSDFs of the individual elements or primitive structures described above may be combined to form the BSDFs of some films or components commonly used in backlight systems. The following sections provide the BSDFs of several of these components.

Component BSDF: Diffuser Plate or Film

A diffuser, as commonly used in a film stack for backlight systems, is typically a plane parallel plate of a particular refractive index, that houses randomly sized and randomly positioned particles having a different refractive index than the plate. Light passing through the diffuser exits in an essentially random direction, based on refractive interactions with the small particles. The BSDF of an exemplary diffuser film can be calculated as follows.

One example film is a 2-mm thick (rigid) diffuser plate from a Sharp™ 30-inch LCD-TV, model number LC-30HV2U. Many design details of this diffuser, referred to hereafter as the "Sharp diffuser", are largely unknown. In such a circumstance the exhaustive direct (experimental) measurement of the BSDF is usually preferred. However, the necessary instrumentation and data-analysis software are frequently not available. Here we illustrate how a combination of metrology, standard optical characterizations, and analysis can be used to provide an approximate BSDF.

Scanning electron microscopy and Fourier-transform infrared spectrometry on the Sharp diffuser indicate a PMMA host incorporating uniform random dispersions of both 5-μm diameter glass and 10-to-20-μm diameter polystyrene spheres. The refractive index of PMMA is approximately n=1.50. The size and relative indices of the spheres within this host are expected to produce scattering that is symmetric about the direction of incidence, strongly peaked in the forward direction, and largely independent of wavelength. We model this using a Henyey-Greenstein scattering phase function with asymmetry parameter g (the average value of the cosine of the scattering angle relative to the direction of incidence) independent of wavelength and equal to 0.995. Two remaining parameter values are necessary to complete a model description from which the BSDF can be calculated: the scattering albedo ω, equal to the ratio of total scattered to incident power for each scattering event, and the optical thickness τ, equal to the scattering-plus-absorption cross section per unit volume times the thickness of the plate. We obtain values for these by matching the results of standard optical characterizations. The total normal-incidence transmissivity and reflectivity of the plate, measured using a Perkin-Elmer Lambda-900 spectrophotometer, indicated 55-to-65-percent transmission and approximately 16-percent absorption throughout the visible. In particular, T=0.60 and R=0.24 at a wavelength of 640 nm. These values, however, are artificially low, because the 2-mm plate thickness allows for guiding of otherwise transmitted or reflected light to and through the edges of the plate, which guided light is not collected by the spectrophotometer. This creates a bias toward unrealistically high measured absorptivities. Furthermore, it is unlikely that a diffuser with 16-percent absorption would be incorporated into a television backlight, where optical efficiency is at a premium. We estimate the actual transmissivity and reflectivity at 640 nm to be T=0.68 and R=0.32 by partitioning equal amounts of the apparent absorption to T and R. By assuming R+T is exactly one, we also specify the scattering albedo to be exactly one. We then choose an optical thickness τ that yields the observed partitioning between transmission and reflection, and the result is τ=100.

Figure 10A:
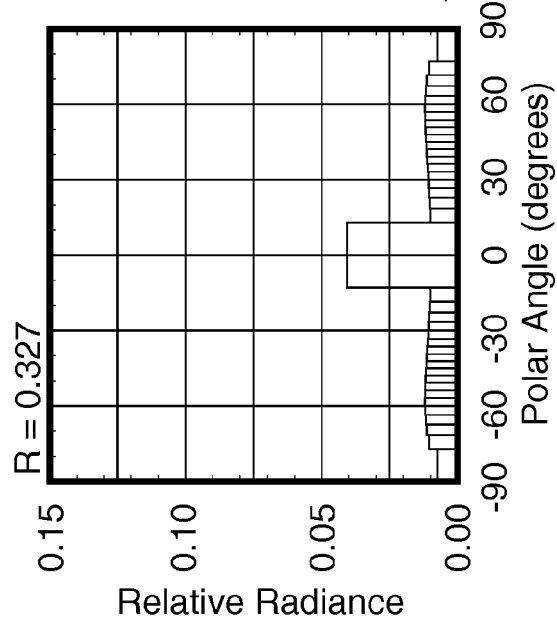
FIG. 10A is the corresponding predicted distribution of reflected radiance.
Figure 10B:
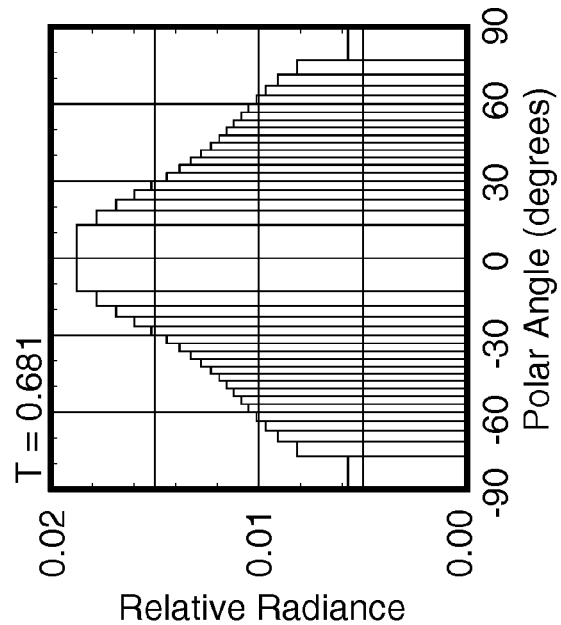
FIGS. 10B and 10D are down-sampled representations of FIGS. 10A and 10C respectively.
Figure 10C:
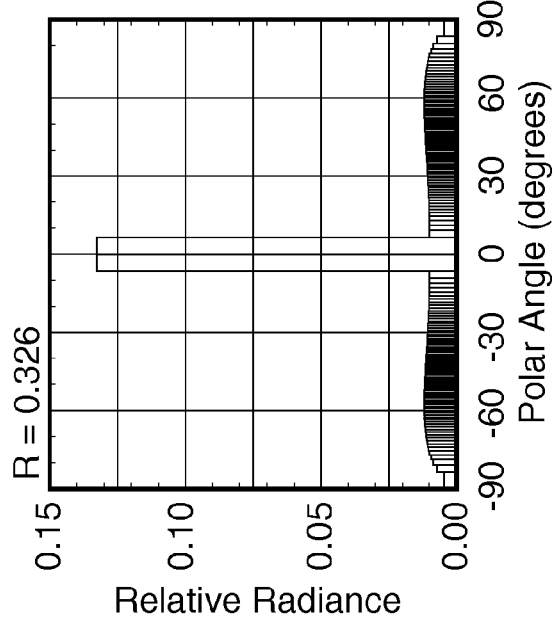
FIG. 10C is a plot of measured and predicted angular distributions of transmitted radiance for a particular diffuser plate.

There exist many other combinations of g and τ for which T=0.68, R=0.32, and ω=1. Generally, these are any combination for which $(1-g)\tau = 0.500$. Our particular selection reflects the assumption g=0.995, which we estimated based on the observed physical characteristics of the scattering particles. Further validation is provided by the measured angular distribution of transmitted radiance for normal illumination. These measured data are indicated by the locus of points depicted in FIG. 10C. The predicted distribution for g=0.995 and τ=100 is indicated by the vertical bars. The agreement is good, but not perfect. Smaller values of g and τ (still with (1−g)τ=0.500) yield predicted distributions that deviate even further from the measured data, generally exhibiting a strong peak near normal, and broad regions of strong upward and then downward curvature between normal and grazing angles. Larger values may yield better agreement, but cannot be accurately assessed by our current generic model for diffuser BSDFs. In this sense, the Sharp diffuser, by virtue of possessing many (τ is large) near forward-scattering (1−g is small) particles, as well as by virtue of its thickness (confounding the spectrophotometer), presents a particular challenge.

Figure 10D:
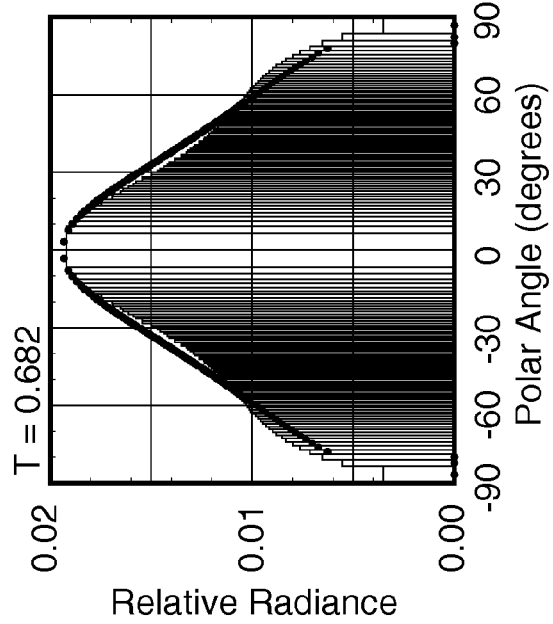

Our generic model for diffuser BSDFs assumes a uniform scattering layer characterized by values of g, ω, and τ embedded within a uniform host of refractive index n, and a polar-by-azimuthal equal-area angular basis characterized by values of N' and N", and implements the analytic approach disclosed in Waterman, P. C., "Matrix-Exponential Description of Radiative Transfer", J. Opt. Soc. Am. vol. 71, pp. 410-422 (1981). This approach calculates the matrix BSDF of the scattering layer. This is then combined with matrices for the upper and lower Fresnel interfaces to determine the matrix BSDF of the composite structure. Layers of strongly forward-scattering particles often demand high polar-angular resolution (large N') to attain independence from basis-set artifacts in the BSDF. Our calculations for the Sharp diffuser utilized N'=80, N"=60 (FIGS. 10A, 10C), and are downsampled to a standard N'=20, N"=60 basis (FIGS. 10B, 10D respectively) following completion of the calculations. Values of g even closer to one would require N' even greater than 80, for which the dimensions of the matrices are so large as to render the required linear-algebraic operations susceptible to numerical noise. While remedies are available, we deem them unwarranted in light of the adequate experimental/predicted agreement exhibited in FIG. 10C.

To avoid the physical impossibility R+T>1, which occurs in FIGS. 10A-D due to residual numerical noise, we set ω=0.9998 (rather than ω=1) in our ultimate calculation of the BSDF of the Sharp diffuser. This yields predicted values τ=0.676 and R=0.324, for which R+T=1.000.

The specific values calculated above for the Sharp diffuser pertain to a wavelength of 640 nm. This wavelength resides within the narrow emission band of an LED device of particular interest as a light source in subsequent backlight simulations. Other wavelengths will produce different results. These should account for the 55-to-65 percent drift in total transmissivity across the visible spectrum already noted, and the high probability that the total absorptivity of this polymeric system is not zero near the blue end of the spectrum. Clearly, more accurate measurements of total transmission and reflection, as might be attained on thiner sections of the plate and/or by using a large-aperture integrating-sphere detector, would be useful to extend our calculations across the visible. In the absence of such data, the 640-nm BSDF may, depending on the degree of accuracy required by the user, reasonably be used also at green wavelengths, and less rigorously may be used to model broadband 'white' light sources, but may not be suitable for blue wavelengths, e.g., blue LED sources, again depending on the user's requirements.

Component BSDF: Brightness Enhancing Film

Brightness enhancing prismatic films help redirect stray light toward normal incidence. A common such film is constructed as a one-dimensional sawtooth grating with an optically large pitch (~50 microns) and depth (~50 microns). The teeth of the sawtooth grating typically have an apex angle of about 90 degrees, although other dimensions and angles may be used. The tips of the teeth may have a small radius, typically on the order of a few microns or less, which may arise from the manufacturing process.

An examplary film is Vikuiti™ Brightness Enhancement Film BEF-II 90/50, available from 3M Company. Because the detailed composition and structure of this film may be known, reliable estimates of its BSDF are possible via first-principles modeling.

The prismatic structure of BEF-II 90/50 consists of parallel translationally-invariant 90-degree prisms occurring on a 50-μm pitch. The base plane of the prisms is coincident with the upper surface of an underlying uniformly-thick land layer. The prisms are cast acrylic, and the land layer consists of 1-to-3 microns of residual cast acrylic upon a 5-mil (0.005 inch) polyethylene terephthalate (PET) substrate. The radii of the apices of the prisms typically strongly affect optical performance; actual values are one micron or less. The refractive index of the acrylic resin decreases monotonically with increasing wavelength from n=1.625 at a 380 nm to n=1.580 at 780 nm. That of the PET decreases from n=1.695 to n=1.630. At a wavelength of 640 nm, the refractive index of the acrylic is 1.586, and that of the PET is 1.630. Absorption per unit path length is comparable in the acrylic and PET, and is as large as several percent per mil near 380 nm, but of order 0.1 percent per mil or less near 640 nm. More precise values at 640 nm are generally not available.

We model the BSDF of 'points-up' BEF-II 90/50 at 640 nm as that of (1) a Fresnel interface between lower and upper media of indices $n_b$=1.000 and $n_a$=1.630, underlying (2) a non-scattering attenuating layer of optical thickness τ=0.004, underlying (3) a Fresnel interface between media of indices $n_b$=1.630 and $n_a$=1.586, underlying (4) a 90-degree sawtooth interface possessing 1-μm radius tips between media of indices $n_b$=1.586 and $n_a$=1.000. The BSDF is independent of the pitch because the pitch vastly exceeds the optical wavelength, and the incoherent scattering of a periodic structure, when averaged over a unit cell of the structure, is independent of the size of the cell. The matrix BSDFs of elements (1) through (3), using our N'=20, N"=60 angular basis, can be calculated analytically. That of element (4) can be calculated using ray-trace simulation. For that simulation we processed 10,000 incident rays within each of the 1200 cells of the angular basis. The tip radius, known not to exceed 1 micron but otherwise unspecified, was chosen to equal 1 micron so as to best match measured gain distributions described below. For convenience we account for absorption effects, which can also be important to optical performance, by relegating all absorption within the acrylic and PET to the PET substrate, i.e., element (2). This is done primarily for computational convenience but also due to the greater thickness of the PET relative to the acrylic. Absorption within plane-parallel layers can be treated analytically, while that within structured media is typically assessed via simulation. The optical thickness of the attenuating layer is chosen consistent with known material absorptivities, and otherwise so as to best match measured gain distributions. For the particular Sharp diffuser tested, the modeling described pertains only to a wavelength of 640 nm. Other wavelengths may require modifying the refractive indices of the PET and the acrylic and the optical thickness of the PET. For more absorptive wavelengths, accounting for the individual absorptivities of the PET and acrylic may be required. For the degree of accuracy we sought, the calculated 640-nm BSDF may reasonably be used also for green and white sources, but not blue sources.

Stack Evaluator: Overview

Figure 6:
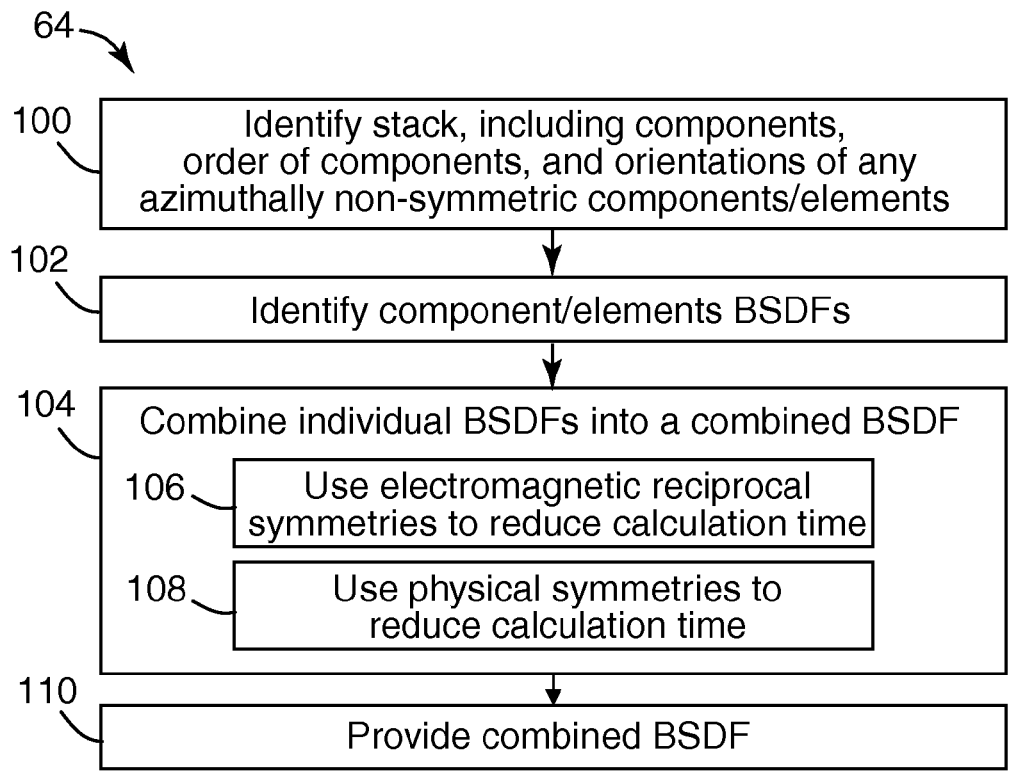
FIG. 6 is a block diagram showing the operation and layout of a stack evaluator useable in the backlight simulation system of FIG. 3.

We turn now to the Stack Evaluator 64, the operation and layout of which is shown in FIG. 6. In step 100, Stack Evaluator 64 identifies a film stack, including its components, the order of its components, and the orientations of any azimuthally non-symmetric components.

Implicit in step 100 is that the components in the film stack lie close enough to each other so that there is no significant longitudinal propagation of the rays as they propagate from component to component. If the rays do not propagate significantly in the stack, then they exit the stack at about the same transverse location at which they entered. That is, if the beam does not travel significantly along z, for instance, then its exiting location (x,y) is about the same as its entering location (x,y). The local properties of each component at (x,y) may then be used for each ray that enters the stack at (x,y).

If there is significant longitudinal separation between two components, so that the location (x,y) of each ray changes significantly from component-to-component, then the BSDFs of those components should remain separate and not be combined. Such a case may be treated by performing a ray trace between the two components. Where possible, the Stack Evaluator combines the BSDFs of stack components into one or more combination BSDFs.

In step 102, the BSDFs are identified for the components identified in step 100. This typically involves recalling them from the Film Library 62, although they may be calculated, obtained experimentally, or obtained by manual input if necessary. In step 104, the BSDFs of the identified components are combined to produce a combined BSDF or a stack BSDF. The combination step reduces calculation time by using electromagnetic reciprocal symmetries in step 106 and physical symmetries in step 108. After the combined BSDF is calculated in step 104, it is provided to a subsequent calculation or to the user at step 110.

Step 104 is typically the most computationally demanding step in the Stack Evaluator 64, and is explained further in the following paragraphs.

In some cases the BSDFs for each element or component of the optical path can be combined to yield the BSDFs of the optical path as a whole. The present method, implementable on a conventional computer system, combines the BSDFs of two adjacent layers (elements or components) to yield the BSDFs of the composite structure. If more than two layers are adjacent each other, the method iterates by combining the result with the BSDFs of the next adjacent layer, and then combines that result with the BSDFs of the next adjacent layer, and so on until all components of the path have been exhausted. Each pairwise combination is treated according to $$\underline{R}^{(a)} = \left(\frac{n_a}{n_2}\underline{T}_{-2}^{(a)}\right)^t (\underline{1} - \underline{R}_{-1}^{(a)}\underline{R}_{-2}^{(b)})^{-1} \underline{R}_{-1}^{(a)}\left(\frac{n_a}{n_2}\underline{T}_{-2}^{(a)}\right) + \underline{R}_{-2}^{(a)}$$

$$\underline{R}^{(b)} = \left(\frac{n_2}{n_b}\underline{T}_{-1}^{(a)}\right)(\underline{1} - \underline{R}_{-2}^{(b)}\underline{R}_{-1}^{(a)})^{-1} \underline{R}_{-2}^{(b)}\left(\frac{n_2}{n_b}\underline{T}_{-1}^{(a)}\right) + \underline{R}_{-1}^{(b)}$$

-continued $$\frac{n_a}{n_b}\underline{T}^{(a)} = \left(\frac{n_2}{n_b}\underline{T}_{-1}^{(a)}\right)(\underline{1} - \underline{R}_{-2}^{(b)}\underline{R}_{-1}^{(a)})^{-1}\left(\frac{n_a}{n_2}\underline{T}_{-2}^{(a)}\right).$$

For computational efficiency the Stack Evaluator can use these relations to calculate the scaled transmissivity for incidence from above $$\left(\frac{n_a}{n_b}\underline{T}^{(a)}\right),$$

and then use simple transposition to calculate transmissivity for incidence from below $$\left(\frac{n_b}{n_a}\underline{T}^{(b)}\right).$$

The subscripts 1 and 2 on the right-hand sides denote matrices for the lower and upper components, respectively; the unsubscripted matrices on the left are those for the combination. Calculating the BSDFs of an M-component optical path in this way requires M–1 successive applications of these relations.

Wherever possible, the Stack Evaluator 64 can use symmetries, such as physical or electromagnetic reciprocal symmetries, to increase calculation speed and efficiency.

Use of physical symmetries can reduce the number of calculations required for a symmetric material. For a typical 60-by-20 basis set having 60 azimuthal positions, the matrices of azimuthally symmetric components can be symmetry factored into 60 20-by-20 blocks. The resulting reduction in computation time can be substantial.

Since the mathematics of combining BSDFs involves inversion of matrices, and inversion time varies as the matrix dimension cubed, it is highly desirable for the Stack Evaluator to perform intermediate inversions using smaller matrices. For instance, using the 60-by-20 example above, much less computation is needed to invert sixty 20-by-20 matrices than to invert a single 1200-by-1200 matrix.

By exploiting these symmetries, the Stack Evaluator 64 can combine the component BSDFs into a single combined BSDF in a fraction of the time it would otherwise take. For currently existing hardware and software implementations and for a typical film arrangement, the Stack Evaluator 64 produces a combined BSDF in about a minute, compared to the several hours it would take without exploiting symmetries. This is a substantial time savings, and allows the simulation of systems and combinations that would otherwise be impractical due to unreasonably long computation times. The following sections provide more detail for the calculation of combined BSDFs.

Optical Paths

By the optical path of a film stack we mean an ordered list of (1) each interface, either planar or structured, separating media of distinct index of refraction, (2) each plane-parallel layer of uniform index possessing a finite absorptivity, (3) each plane-parallel layer of random bulk heterogeneities in a host of other-wise uniform refractive index, (4) each multilayer optical film embedded between media of potentially-distinct index of refraction, and (5) each optically-thick (and therefore opaque) plane-parallel layer of complex index of refraction separating media of potentially-distinct real index of refraction. A great many non-imaging optical systems can be described by optical paths containing only these 5 types of elements.

Figure 22:
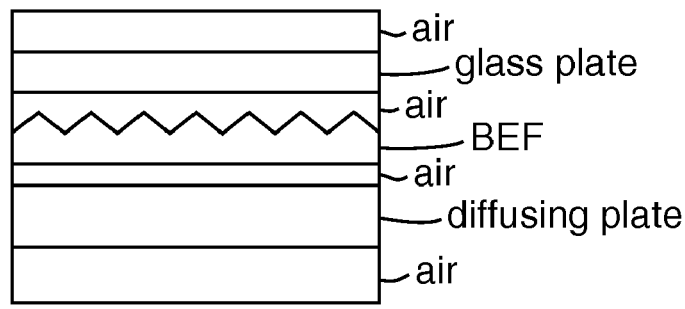
FIG. 22 is a schematic cross-sectional view of an exemplary gain enhancement stack.

FIG. 22 depicts a gain-enhancement stack including a sheet of a monolithic film commercially available from 3M Company and sold under the name Brightness Enhancement Film (BEF), applied points-up on and separated by an air gap from a bulk-diffusing plate, and overlain by and separated by an air gap from a glass plate included to maintain the BEF flat. The optical path includes: (1) a plane interface between index $n_b=1.00$ and $n_a=1.50$ media, underlying (2) a plane-parallel layer of random bulk heterogeneities embedded within a medium of host index $n=1.50$, underlying (3) a plane interface between index $n_b=1.50$ and $n_a=1.00$ media, underlying (4) a plane interface between index $n_b=1.00$ and $n_a=1.58$ media, underlying (5) a deterministic sawtooth interface between index $n_b=1.58$ and $n_a=1.00$ media, underlying (6) a plane interface between index $n_b=1.00$ and $n_a=1.53$ media, underlying (7) a plane parallel layer of index $n=1.53$ possessing a finite absorptivity, underlying (8) a plane interface between index $n_b=1.53$ and $n_a=1.00$ media.

Figure 23:
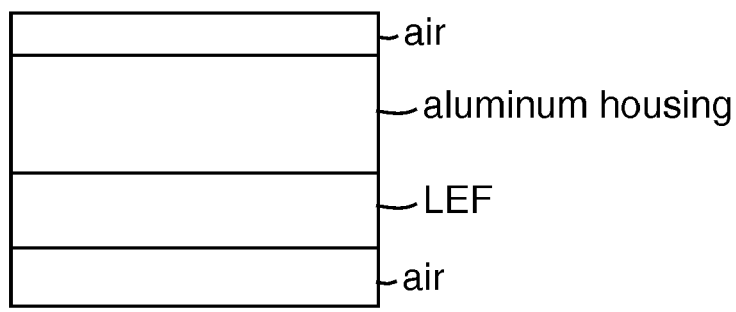
FIG. 23 is a schematic cross-sectional view of an exemplary wall construction.

FIG. 23 depicts a wall construction having a commercially available film manufactured by 3M Company and sold under the name Light Enhancement Film (LEF) applied in optical contact with an aluminum housing. Optical contact is achieved via an index $n=1.50$ adhesive (not shown in the figure) joining the LEF and the aluminum. Here the optical path has (1) a plane interface between index $n_b=1.00$ and $n_a=1.50$ media, underlying (2) a plane-parallel layer of random bulk heterogeneities within a medium of host index $n=1.50$, underlying (3) an opaque plane-parallel layer of refractive index $n=0.96+i6.69$ separating index $n_b=1.50$ and $n_a=1.00$ media.

The description of an optical path can be simplified when the BSDFs of the combination of two or more adjacent primitive components are already known or available. For example, after the BSDFs of the plane and sawtooth interfaces that define the BEF film in FIG. 22 are combined, the results can be stored in a library of films and accessed for use in subsequent stacks that incorporate this film. When the BSDFs of BEF are so catalogued, the gain-enhancement stack of FIG. 22 may be viewed as an optical path possessing 7, not 8, components or elements.

Pairwise Combinations

Figure 24:
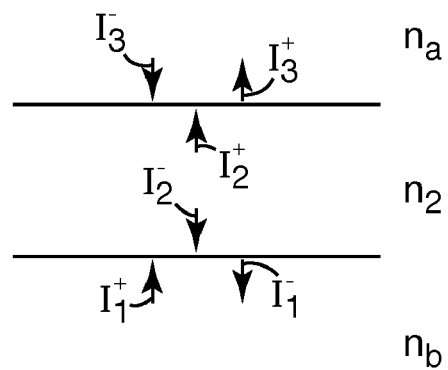
FIG. 24 is a schematic cross-sectional view of two nominally planar structures used in defining terms for solving the Radiative Transfer Equation.

FIG. 24 illustrates a stack having two parallel nominally-planar infinite structures, each represented here by a planar interface, separated by a layer of a non-scattering and non-absorbing medium of refractive index $n_2$. The medium above the layer is uniform with refractive index $n_a$, and that below is uniform with refractive index $n_b$. We seek to calculate the matrix representations of the BSDFs of the stack as a whole in terms of the matrix representations of the BSDFs of the individual structures. The desired BSDFs can be found by solving the Radiative Transfer Equation for the three-layer system (including the lower structure, the central layer, and the upper structure) when illuminated by a spatially-uniform incident radiance. If the directional dependencies of the upwards and downwards-propagating components of the radiance within each medium are resolved in our angular basis, the Radiative Transfer Equation can be expressed in matrix form as $$\underline{I_2}^+ = \underline{T}_{12}\underline{I_1}^+ + \underline{R}_{21}\underline{I_2}^-$$

$$\underline{I_2}^- = \underline{T}_{32}\underline{I_3}^- + \underline{R}_{23}\underline{I_2}^+$$

$$\underline{I_3}^+ = \underline{T}_{23}\underline{I_2}^+ + \underline{T}_{32}\underline{I_3}^-$$

$$\underline{I_1}^- = \underline{T}_{21}\underline{I_2}^- + \underline{R}_{12}\underline{I_1}^+$$

where the scattering by each structure is described by its component matrix BSDFs, and the non-scattering and non-absorbing central layer preserves the radiance. We initially solve the first two equations for $\underline{I_2}^+$ and $\underline{I_2}^-$ in terms of $\underline{I_1}^+$ and $\underline{I_3}^-$;

$$\begin{bmatrix} I_2^+ \\ I_2^- \end{bmatrix} = \begin{bmatrix} (\underline{1}-\underline{R}_{21}\underline{R}_{23})^{-1} & (\underline{1}-\underline{R}_{21}\underline{R}_{23})^{-1}\underline{R}_{21} \\ (\underline{1}-\underline{R}_{23}\underline{R}_{21})^{-1}\underline{R}_{23} & (\underline{1}-\underline{R}_{23}\underline{R}_{21})^{-1} \end{bmatrix} \begin{bmatrix} \underline{T}_{12}I_1^+ \\ \underline{T}_{32}I_3^- \end{bmatrix}$$

Substituting these expressions into the third and fourth equations yields $$\underline{I_1}^- = \underline{T}_{21}(\underline{1}-\underline{R}_{23}\underline{R}_{21})^{-1}\underline{T}_{23}\underline{I_3}^- + [\underline{T}_{21}(\underline{1}-\underline{R}_{23}\underline{R}_{21})^{-1}\underline{R}_{23}\underline{T}_{12} + \underline{R}_{12}]\underline{I_1}^+$$

$$\underline{I_3}^+ = \underline{T}_{23}(\underline{1}-\underline{R}_{21}\underline{R}_{23})^{-1}\underline{T}_{12}\underline{I_1}^+ + [\underline{T}_{23}(\underline{1}-\underline{R}_{21}\underline{R}_{23})^{-1}\underline{R}_{21}\underline{T}_{32} + \underline{R}_{32}]\underline{I_3}^-$$

These are of the form $$\underline{I_1}^- = \underline{T}_{31}\underline{I_3}^- + \underline{R}_{13}\underline{I_1}^+$$

$$\underline{I_3}^+ = \underline{T}_{13}\underline{I_1}^+ + \underline{R}_{31}\underline{I_3}^-$$

describing the net transmissivity and reflectivity of the stack as a whole, resolved in our angular basis. $\underline{T}_{31}$ and $\underline{R}_{13}$ are the desired matrix BSDFs of the stack for incidence from below, and $\underline{T}_{13}$ and $\underline{R}_{31}$ are those for incidence from above.

It is helpful to express the net transmissivity and reflectivity from above and below in terms of those of the lower (index 1) and upper (index 2) structures, and in terms of scaled transmissivity matrices that explicitly exhibit reciprocal symmetry, as $$(n_a/n_b)\underline{T}^{(a)} = (n_2/n_b)\underline{T}_1^{(a)}(\underline{1}-\underline{R}_2^{(b)}\underline{R}_1^{(a)})^{-1}(n_a/n_2)\underline{T}_2^{(a)}$$

$$(n_b/n_a)\underline{T}^{(b)} = (n_2/n_a)\underline{T}_2^{(b)}(\underline{1}-\underline{R}_1^{(a)}\underline{R}_1^{(b)})^{-1}(n_b/n_2)\underline{T}_1^{(b)}$$

$$\underline{R}^{(b)} = (n_2/n_b)\underline{T}_1^{(a)}(\underline{1}-\underline{R}_2^{(b)}\underline{R}_1^{(a)})^{-1}\underline{R}_2^{(b)}(n_b/n_2)\underline{T}_1^{(b)} + \underline{R}_1^{(b)}$$

$$\underline{R}^{(a)} = (n_2/n_a)\underline{T}_2^{(b)}(\underline{1}-\underline{R}_1^{(a)}\underline{R}_1^{(b)})^{-1}\underline{R}_1^{(a)}(n_a/n_2)\underline{T}_2^{(a)} + \underline{R}_2^{(a)}.$$

Since for any matrix $\underline{A}$, $(\underline{A}^t)^{-1} = (\underline{A}^{-1})^t$, and since the $\underline{R}$ matrices are symmetric, $$((\underline{1}-\underline{R}_1^{(a)}\underline{R}_2^{(b)})^{-1})^t = (\underline{1}-\underline{R}_2^{(b)}\underline{R}_1^{(a)})^{-1}$$

and both $(\underline{1}-\underline{R}_2^{(b)}\underline{R}_1^{(a)})^{-1}\underline{R}_2^{(b)}$ and $(\underline{1}-\underline{R}_1^{(a)}\underline{R}_2^{(b)})^{-1}\underline{R}_1^{(a)}$ are symmetric. Also, $(n_a/n_2)\underline{T}_2^{(a)} = (n_2/n_a)\underline{T}_2^{(b)t}$ and $(n_2/n_b)\underline{T}_1^{(a)} = (n_b/n_2)\underline{T}_1^{(b)t}$, $\underline{R}^{(b)}$ and $\underline{R}^{(a)}$ are symmetric, and $(n_a/n_b)\underline{T}^{(a)} = (n_b/n_a)\underline{T}^{(b)t}$. Thus, the relations preserve reciprocal symmetries. In practice, $\underline{R}^{(a)}$, $\underline{R}^{(b)}$, and $(n_a/n_b)\underline{T}^{(a)}$ are calculated from $\underline{\underline{R}}_1^{(a)}$, $\underline{\underline{R}}_1^{(b)}$, and $(n_2/n_b)\underline{\underline{T}}_1^{(a)}$, and $\underline{\underline{R}}_2^{(a)}$, $\underline{\underline{R}}_2^{(b)}$, and $(n_d/n_2)\underline{\underline{T}}_2^{(a)}$, according to $$\underline{\underline{R}}^{(a)} = ((n_d/n_2)\underline{\underline{T}}_2^{(a)})^t (\underline{\underline{1}} - \underline{\underline{R}}_1^{(a)}\underline{\underline{R}}_2^{(b)})^{-1} \underline{\underline{R}}_1^{(a)} (n_d/n_2)\underline{\underline{T}}_2^{(a)} + \underline{\underline{R}}_2^{(a)}$$

$$\underline{\underline{R}}^{(b)} = ((n_2/n_b)\underline{\underline{T}}_1^{(a)}) (\underline{\underline{1}} - \underline{\underline{R}}_2^{(b)}\underline{\underline{R}}_1^{(a)})^{-1} \underline{\underline{R}}_2^{(b)} (n_2/n_b)\underline{\underline{T}}_1^{(a)} + \underline{\underline{R}}_1^{(b)}$$

$$(n_d/n_b)\underline{\underline{T}}^{(a)} = (n_2/n_b)\underline{\underline{T}}_1^{(a)} (\underline{\underline{1}} - \underline{\underline{R}}_2^{(b)}\underline{\underline{R}}_1^{(a)})^{-1} (n_d/n_2)\underline{\underline{T}}_2^{(a)}$$

and $(n_b/n_a)\underline{\underline{T}}^{(b)}$ is calculated by transposition.

The technique of combining matrix representations of BSDFs is clearly iterative, so that the matrix representation of the BSDFs of any optical path can be calculated by successive pairwise combination of neighboring components or elements, beginning (in one approach) at the bottom of the stack. Of course, other conventions can be followed, such as beginning at the top or any other place in the stack.

Physical-Symmetry Factoring

Reciprocal symmetries reduce by approximately a factor of two the memory required to represent any individual or any combined optical-path element, and reduce by approximately a factor of two the computational burden of combining optical-path elements. (Only $(n_a/n_b)\underline{\underline{T}}^{(a)}$ and approximately half of the elements of $\underline{\underline{R}}^{(a)}$ and $\underline{\underline{R}}^{(b)}$ need be explicitly calculated for each combination.) Additional reductions in both memory and computational burden, frequently more substantial than those afforded by reciprocal symmetry, are provided by factoring of BSDF matrices according to the known physical symmetries of the structures they represent. Physical-symmetry factoring can be important to achieve the high throughput of stack calculations desired to support a highly-efficient backlight-simulation tool.

Let $\underline{\underline{A}}$ denote any of $\underline{\underline{R}}^{(b)}$, $\underline{\underline{T}}^{(b)}$, $\underline{\underline{R}}^{(a)}$, or $\underline{\underline{T}}^{(a)}$, each constructed in the standard manner where the angular-basis cells are ordered with their azimuthal index varying first. Assume that the structure whose BSDFs are represented by $\underline{\underline{A}}$ possesses $C_{nv}$ symmetry, where n is any factor of N". (For N"=60, n=1, 2, 3, 4, 5, 6, 10, 12, 15, 20, 30, or 60.) A structure possesses $C_{nv}$ symmetry if it is invariant under any operation in the group $C_{nv}$; these are the identity operation ($\hat{E}$), an n-fold rotation about the vertical axis ($\hat{C}_n$), mirror symmetry about a vertical plane containing the $\hat{u}$ axis ($\sigma_u$), and all unique operations derived as combinations of these with their accumulated unique offspring. There are 2n such operations in the group $C_{nv}$, namely, n rotations $\hat{C}_n^{0=\hat{E}}$, $\hat{C}_n$, $\hat{C}_n^2$, ..., $\hat{C}_n^{n-1}$, and n vertical mirror planes separated by equal increments of azimuth. Any matrix that represents the scattering characteristics of a given structure will be invariant under transformation of both its rows and columns by any operation that leaves that structure unchanged. That is, if $\underline{\underline{S}}$ is an N-by-N matrix describing the transformation of the angular-basis cells under any one of the operations of $C_{nv}$, then $\underline{\underline{S}}^t \underline{\underline{A}} \underline{\underline{S}} = \underline{\underline{A}}$.

Now, consider $\underline{\underline{A}}$ as a partitioned matrix having an N'-by-N' array of N"-by-N" blocks. Let $\underline{\underline{A}}^{(ij)}$ ($1 \leq i \leq N'$; $1 \leq j \leq N'$) denote the i,jth block. The operations of $C_{nv}$ transform basis cells into other cells with differing azimuthal indices, but do not alter the polar index. It follows that the $\underline{\underline{A}}^{(ij)}$ do not mix, and therefore that each $\underline{\underline{A}}^{(ij)}$ is invariant under each operation of $C_{nv}$.

Invariance of $\underline{\underline{A}}^{(ij)}$ under any of the rotations implies the structure $$\underline{\underline{A}}^{(ij)} = \begin{bmatrix} \underline{A}_0 & \underline{A}_1 & \underline{A}_2 & \cdots & \underline{A}_{n-2} & \underline{A}_{n-1} \\ \underline{A}_{n-1} & \underline{A}_0 & \underline{A}_1 & \cdots & \underline{A}_{n-3} & \underline{A}_{n-2} \\ \underline{A}_{n-2} & \underline{A}_{n-1} & \underline{A}_0 & \cdots & \underline{A}_{n-4} & \underline{A}_{n-3} \\ \vdots & \vdots & \vdots & \ddots & \vdots & \vdots \\ \underline{A}_2 & \underline{A}_3 & \underline{A}_4 & \cdots & \underline{A}_0 & \underline{A}_1 \\ \underline{A}_1 & \underline{A}_2 & \underline{A}_3 & \cdots & \underline{A}_{n-1} & \underline{A}_0 \end{bmatrix}$$

where each $\underline{A}_j$ is a $n_u$-by-$n_u$ matrix. $n_u = N''/n$ is the number of rotationally-unique azimuthal cells. The remaining $N'' - n_u$ azimuthal cells are derivable from these by 1, 2, ..., n-1 successive n-fold rotations. Note that the $\underline{A}_j$ are, in general, different for every $\underline{\underline{A}}^{(ij)}$. We have dropped the identifying superscript only for notational simplicity.

Let $\underline{\underline{U}}$ denote the complex-valued unitary matrix $$\begin{bmatrix} e^{i2\pi \frac{0 \cdot 0}{n}} \underline{V} & e^{i2\pi \frac{0 \cdot 1}{n}} \underline{V} & e^{i2\pi \frac{0 \cdot 2}{n}} \underline{V} & \cdots & e^{i2\pi \frac{0 \cdot (n-2)}{n}} \underline{V} & e^{i2\pi \frac{0 \cdot (n-1)}{n}} \underline{V} \\ e^{i2\pi \frac{1 \cdot 0}{n}} \underline{V} & e^{i2\pi \frac{1 \cdot 1}{n}} \underline{V} & e^{i2\pi \frac{1 \cdot 2}{n}} \underline{V} & \cdots & e^{i2\pi \frac{1 \cdot (n-2)}{n}} \underline{V} & e^{i2\pi \frac{1 \cdot (n-1)}{n}} \underline{V} \\ e^{i2\pi \frac{2 \cdot 0}{n}} \underline{V} & e^{i2\pi \frac{2 \cdot 1}{n}} \underline{V} & e^{i2\pi \frac{2 \cdot 2}{n}} \underline{V} & \cdots & e^{i2\pi \frac{2 \cdot (n-2)}{n}} \underline{V} & e^{i2\pi \frac{2 \cdot (n-1)}{n}} \underline{V} \\ \vdots & \vdots & \vdots & \ddots & \vdots & \vdots \\ e^{i2\pi \frac{(n-2) \cdot 0}{n}} \underline{V} & e^{i2\pi \frac{(n-2) \cdot 1}{n}} \underline{V} & e^{i2\pi \frac{(n-2) \cdot 2}{n}} \underline{V} & \cdots & e^{i2\pi \frac{(n-2) \cdot (n-2)}{n}} \underline{V} & e^{i2\pi \frac{(n-2) \cdot (n-1)}{n}} \underline{V} \\ e^{i2\pi \frac{(n-1) \cdot 0}{n}} \underline{V} & e^{i2\pi \frac{(n-1) \cdot 1}{n}} \underline{V} & e^{i2\pi \frac{(n-1) \cdot 2}{n}} \underline{V} & \cdots & e^{i2\pi \frac{(n-1) \cdot (n-2)}{n}} \underline{V} & e^{i2\pi \frac{(n-1) \cdot (n-1)}{n}} \underline{V} \end{bmatrix}$$

where $\underline{V}$ is any real-valued orthogonal $n_u$-by-$n_u$ matrix. Then $$\underline{\underline{U}}^\dagger \underline{\underline{A}}^{(ij)} \underline{\underline{U}} = \begin{bmatrix} \underline{V}^t \underline{B}_0 \underline{V} & \underline{0} & \underline{0} & \cdots & \underline{0} & \underline{0} \\ \underline{0} & \underline{V}^t \underline{B}_1 \underline{V} & \underline{0} & \cdots & \underline{0} & \underline{0} \\ \underline{0} & \underline{0} & \underline{V}^t \underline{B}_2 \underline{V} & \cdots & \underline{0} & \underline{0} \\ \vdots & \vdots & \vdots & \ddots & \vdots & \vdots \\ \underline{0} & \underline{0} & \underline{0} & \cdots & \underline{V}^t \underline{B}_{n-2} \underline{V} & \underline{0} \\ \underline{0} & \underline{0} & \underline{0} & \cdots & \underline{0} & \underline{V}^t \underline{B}_{n-1} \underline{V} \end{bmatrix}$$

where $\underline{\underline{U}}^\dagger$ denotes the adjoint of $\underline{\underline{U}}$ (the complex conjugate of the transpose), and $$\underline{\underline{B}}_k = \sum_{l=0}^{n-1} e^{i2\pi \frac{lk}{n}} \underline{\underline{A}}_l \quad (0 \leq k \leq n-1)$$

Since the $\underline{\underline{A}}_l$ are real, and if we define $\underline{\underline{B}}_n = \underline{\underline{B}}_0$, $$\underline{\underline{B}}_{n-k} = \underline{\underline{B}}_k^* \quad (0 \leq k \leq n)$$

Thus, $\underline{\underline{B}}_0$ is real, as is $\underline{\underline{B}}_{n/2}$ when n is even. The remaining $\underline{\underline{B}}_k$ are complex. Here and elsewhere, the notation "*" refers to the complex conjugate.

The invariance of $\underline{\underline{A}}^{(ij)}$ under the mirror-plane reflections implies $$A_l(i,j) = A_{n-l}(n_u - i + 1, n_u - j + 1) \quad (1 \leq i \leq n_u; 1 \leq j \leq n_u)$$

for each of $0 \leq t \leq n$ (we define $\underline{\underline{A}}_n = \underline{\underline{A}}_0$), where $A_l(i,j)$ denotes the i,jth component of $\underline{\underline{A}}_l$. It follows that $$B_k(i,j) = B_k(n_u - i + 1, n_u - j + 1)^* \quad (1 \leq i \leq n_u; 1 \leq j \leq n_u)$$

for each of $0 \leq k \leq n$. If we choose $\underline{V}$ as the matrix whose columns are normalized linear combinations of two of the $n_u$ rotationally-unique azimuthal cells, which are either symmetric or antisymmetric with respect to reflection in the vertical mirror plane that bisects the set, then if $\underline{\underline{B}}_k$ is represented as $$\underline{\underline{B}}_k = \begin{bmatrix} b_1 & b_2 & b_3 & b_4 & b_5 \\ b_6 & b_7 & b_8 & b_9 & b_{10} \\ b_{11} & b_{12} & b_{13} & b_{12}^* & b_{11}^* \\ b_{10}^* & b_9^* & b_8^* & b_7^* & b_6^* \\ b_5^* & b_4^* & b_3^* & b_2^* & b_1^* \end{bmatrix}$$

when, for example, $n_u = 5$, $$\underline{\underline{C}}_k \equiv \underline{V}^t \underline{\underline{B}}_k \underline{V} =$$

$$\begin{bmatrix} \text{Re}(b_1 + b_5) & \text{Re}(b_2 + b_4) & \sqrt{2}\,\text{Re}b_3 & i\text{Im}(b_2 - b_4) & i\text{Im}(b_1 - b_5) \\ \text{Re}(b_6 + b_{10}) & \text{Re}(b_7 + b_9) & \sqrt{2}\,\text{Re}b_8 & i\text{Im}(b_7 - b_9) & i\text{Im}(b_6 - b_{10}) \\ \sqrt{2}\,\text{Re}b_{11} & \sqrt{2}\,\text{Re}b_{12} & b_{13} & i\sqrt{2}\,\text{Im}b_{12} & i\sqrt{2}\,\text{Im}b_{11} \\ i\text{Im}(b_6 + b_{10}) & i\text{Im}(b_7 + b_9) & i\sqrt{2}\,\text{Im}b_8 & \text{Re}(b_7 - b_9) & \text{Re}(b_6 - b_{10}) \\ i\text{Im}(b_1 + b_5) & i\text{Im}(b_2 + b_4) & i\sqrt{2}\,\text{Im}b_3 & \text{Re}(b_2 - b_4) & \text{Re}(b_1 - b_8) \end{bmatrix}$$

There are $n_s = [(n_u + 1)/2]$ symmetric combinations, and $n_a = n_u - n_s$ antisymmetric ones ([x] denotes the integer portion of x). When $n_u$ is odd, $n_s = n_a + 1$. The extra symmetric 'combination' is the one wherein the cell is bisected by the mirror plane. When $n_u$ is even, $n_s = n_a$, and $\underline{\underline{C}}_k$ is of the form indicated above, but without the anomalous center column and row. Since $\underline{\underline{B}}_0$ and $\underline{\underline{B}}_{n/2}$ (n even) are real, $\underline{\underline{C}}_0$ and $\underline{\underline{C}}_{n/2}$ contain only $n_s$-by-$n_s$ and $n_a$-by-$n_a$ diagonal blocks. All of the other $\underline{\underline{C}}_k$ are dense $n_u$-by-$n_u$ matrices.

Let $\underline{\underline{U}}_{lk}$ denote $e^{i2\pi(l \cdot k/n)}\underline{V}$, which is the l+1, k+1th block of $\underline{\underline{U}}$. $\underline{\underline{U}}_{lk}$ is real when either l or k is equal to zero or n/2 (when n is even). All other blocks are complex, but with $$\underline{\underline{U}}_{lk} = \underline{\underline{U}}_{ln-k}^* \quad \underline{\underline{U}}_{lk} = \underline{\underline{U}}_{n-l\,k}^*$$

such that pairs of rows and pairs of columns of blocks are complex conjugates of one another. In order to recover a real-valued factored matrix, we now finally form the two real-valued unitary combinations of the complex-conjugate column blocks of $\underline{\underline{U}}$, for each pair of such column blocks, to obtain a new real-valued orthogonal matrix $\underline{\underline{\tilde{U}}}$. When, for example, n=6, $\underline{\underline{\tilde{U}}}$ is obtained from $\underline{\underline{U}}$ by right multiplying by the 6-by-6 array of $n_u$-by-$n_u$ blocks $$\begin{bmatrix} \underline{1} & \underline{0} & \underline{0} & \underline{0} & \underline{0} & \underline{0} \\ \underline{0} & \underline{Q} & \underline{0} & \underline{0} & -i\underline{Q}^* & \underline{0} \\ \underline{0} & \underline{0} & \underline{Q} & \underline{0} & \underline{0} & -i\underline{Q}^* \\ \underline{0} & \underline{0} & \underline{0} & \underline{1} & \underline{0} & \underline{0} \\ \underline{0} & \underline{Q}^* & \underline{0} & \underline{0} & i\underline{Q} & \underline{0} \\ \underline{0} & \underline{0} & \underline{Q}^* & \underline{0} & \underline{0} & i\underline{Q} \end{bmatrix}$$

where, for example, when $n_u = 5$ $$\underline{\underline{Q}} = \frac{1}{\sqrt{2}} \begin{bmatrix} 1 & 0 & 0 & 0 & 0 \\ 0 & 1 & 0 & 0 & 0 \\ 0 & 0 & 1 & 0 & 0 \\ 0 & 0 & 0 & -i & 0 \\ 0 & 0 & 0 & 0 & -i \end{bmatrix}$$

When n is odd, the second occurrence of a row and column whose only non-zero block is $\underline{1}$ is absent, and when $n_u$ is even there are an equal number of 1's and $-i$'s on the diagonal of $\underline{\underline{Q}}$.

When $\underline{\underline{\tilde{U}}}$ replaces $\underline{\underline{U}}$, we have finally (for n=6)

$$\underline{\underline{\tilde{U}}}^t \underline{\underline{A}}^{(ij)} \underline{\underline{\tilde{U}}} = \begin{bmatrix} \underline{\underline{C}}_0 & \underline{0} & \underline{0} & \underline{0} & \underline{0} & \underline{0} \\ \underline{0} & \underline{\underline{D}}_1 & \underline{0} & \underline{0} & \underline{0} & \underline{0} \\ \underline{0} & \underline{0} & \underline{\underline{D}}_2 & \underline{0} & \underline{0} & \underline{0} \\ \underline{0} & \underline{0} & \underline{0} & \underline{\underline{C}}_3 & \underline{0} & \underline{0} \\ \underline{0} & \underline{0} & \underline{0} & \underline{0} & \underline{\underline{\tilde{D}}}_1 & \underline{0} \\ \underline{0} & \underline{0} & \underline{0} & \underline{0} & \underline{0} & \underline{\underline{\tilde{D}}}_2 \end{bmatrix}$$

where $$\underline{\underline{D}}_k =$$

$$\begin{bmatrix} \text{Re}(b_1 + b_5) & \text{Re}(b_2 + b_4) & \sqrt{2}\,\text{Re}b_3 & \text{Im}(b_2 - b_4) & \text{Im}(b_1 - b_5) \\ \text{Re}(b_6 + b_{10}) & \text{Re}(b_7 + b_9) & \sqrt{2}\,\text{Re}b_8 & \text{Im}(b_7 - b_9) & \text{Im}(b_6 - b_{10}) \\ \sqrt{2}\,\text{Re}b_{11} & \sqrt{2}\,\text{Re}b_{12} & b_{13} & \sqrt{2}\,\text{Im}b_{12} & \sqrt{2}\,\text{Im}b_{11} \\ -\text{Im}(b_6 + b_{10}) & -\text{Im}(b_7 + b_9) & -\sqrt{2}\,\text{Im}b_8 & \text{Re}(b_7 - b_9) & \text{Re}(b_6 - b_{10}) \\ -\text{Im}(b_1 + b_5) & -\text{Im}(b_2 + b_4) & -\sqrt{2}\,\text{Im}b_3 & \text{Re}(b_2 - b_4) & \text{Re}(b_1 - b_8) \end{bmatrix}$$

(for $n_u = 5$), and $\underline{\underline{\tilde{D}}}_k$ is $\underline{\underline{D}}_k$ with the sign of the imaginary values reversed. When n is odd, $\underline{\underline{C}}_{n/2}$ is absent. $\underline{\underline{\tilde{U}}}^t \underline{\underline{A}}^{(ij)} \underline{\underline{\tilde{U}}}$ is our desired real-valued block-factored form. When n is even, there are n$-2n_u \times n_u$, two $n_s \times n_s$, and two $n_a \times n_a$ diagonal blocks. When n is odd, there are n$-1 n_{u \times nu}$ blocks, one $n_s \times n_s$ block, and one $n_a \times n_a$ block.

The results we have outlined permit the following basic operations:

(1) symmetrization of any N"-by-N" matrix $\underline{\underline{A}}^{(ij)}$ according to the symmetry of the group $C_{nv}$, where n is any factor of N";

(2) calculation of the number of diagonal blocks in the symmetry-factored form of $\underline{\underline{A}}^{(ij)}$, and the dimension of and values making up each diagonal block; and (3) inversion of the factoring to calculate $\underline{\underline{A}}^{(ij)}$ from its symmetry-factored form.

To factor the full matrix $\underline{\underline{A}}$ we initially individually factor each block $\underline{\underline{A}}^{(ij)}$ (using item (2) immediately above). When $\underline{\underline{A}}$ is symmetric, so that $\underline{\underline{A}}^{(ji)} = \underline{\underline{A}}^{(ij)t}$, we need only explicitly factor those $\underline{\underline{A}}^{(ij)}$ for which i≧j, since the factored form of $\underline{\underline{A}}^{(ij)t}$ is the transpose of the factored form of $\underline{\underline{A}}^{(ij)}$. We then reorder the rows and columns of $\underline{\underline{A}}$ so that the polar index varies first. The result is a block-factored matrix having n−2N'$n_a$×N'$n_u$, two N'$n_s$×N'$n_s$, and two N'$n_a$×N'$n_a$ diagonal blocks when n is even, and n−1, one, and one such blocks when n is odd. By so symmetry factoring $\underline{\underline{R}}_1^{(a)}$, $\underline{\underline{R}}_1^{(b)}$, and $(n_2/n_b)\underline{\underline{T}}_1^{(a)}$, and $\underline{\underline{R}}_2^{(a)}$, $\underline{\underline{R}}_2^{(b)}$, and $(n_a/n_2)\underline{\underline{T}}_2^{(a)}$, for adjacent structures 1 and 2 (separated by a medium of index $n_2$), the N-by-N linear-algebraic relations expressing $\underline{\underline{R}}^{(a)}$, $\underline{\underline{R}}^{(b)}$, and $(n_a/n_b)\underline{\underline{T}}^{(a)}$ of the composite structure are reduced to either n+2 or n+1 independent relations whose dimensions are smaller by a factor of at least 1/n. Since cpu times for the required operations scale as the cube of the matrix dimension, the reduction in the computational burden is approximately $1/n^2$ or better.

In our standard angular basis with N"=60, the most common symmetry encountered is $C_{60v}$. (Fresnel interfaces, balanced layered media, attenuating layers, scattering layers, backplanes, and Lambertian interfaces all exhibit $C_{N"v}$ symmetry.) With n=60, symmetry factoring results in 60 N'-by-N' systems, only 31 of which are unique. The reduction in the computational burden realized is $31/60^3$, or about 1/7,000. Structured surfaces and unbalanced layered media are the primary exceptions to this norm. For example, a film commercially available from 3M Company and sold as brightness enhancement film (BEF) possesses $C_{2v}$ symmetry. For n=2 with N"=60, symmetry factoring results in four 15N"-by-15N' systems. The reduction in the computational burden is $4/4^3 = 1/16$.

It is desirable that adjacent structures be factored under the same symmetry group to exploit these computational gains. When adjacent structures possess different symmetries, they can advantageously be 'demoted' to a lower common symmetry prior to their combination. Any structure possessing $C_{n1v}$ symmetry can be demoted to $C_{n2v}$ symmetry (where $n_2 < n_1$ with $n_1/n_2$ an integer) by inverting the factored form of $\underline{\underline{A}}$ (using item (3) above), and factoring the result according to the symmetry of $C_{n2v}$ (using item (2) above). The computational burden of combining a series of components is minimized if all pairwise combinations are performed at the highest level of symmetry possible. Thus, for example, for the optical path of FIG. 22, where components 1 through 4 and 6 through 8 possess $C_{60v}$ symmetry, and component 5 possesses $C_{2v}$ symmetry, the computational burden is minimized if the BSDFs of components 1 and 2 are combined, and the result is combined with the BSDFs of 3, and that result is combined with the BSDFs of 4. Then the BSDFs of 6 and 7 are combined, and that result is combined with those of 8. Then the two resulting combination BSDFs, having $C_{60v}$ symmetry, are demoted to $C_{2v}$, and the BSDFs for 1+2+3+4 are combined with the BSDFS of 5, and the result is combined with the BSDFs of 6+7+8. The Stack Evaluator 64 is preferably programmed to combine the BSDFs of the various adjacent elements, components, or stacks in such a fashion, wherein the symmetry groups of all such items are identified, and then pairs of items are selected for BSDF combination according to their respective symmetry groups, where each combination operation utilizes the symmetries of the pair being combined to reduce the computational burden.

The memory required to store a matrix is reduced by symmetry factoring by at least 1/n. For $C_{60v}$ with N"=60, the precise reduction is $(31/60)(58 \cdot 1^2 + 2 \cdot 1^2 + 2 \cdot 0^2)/(60^2)$, or roughly 1/120, which is smaller than 1/n because only 31 of the 60 factored blocks are unique. For $C_{2v}$ it is $(0 \cdot 30^2 + 2 \cdot 15^2 + 2 \cdot 15^2)/(60^2) = 1/4$, smaller than 1/n because of the additional factoring of $\underline{\underline{C}}_0$ and $\underline{\underline{C}}_{n/2}$. The full N-by-N matrices $\underline{\underline{R}}^{(a)}$, $\underline{\underline{R}}^{(b)}$, and $(n_a/n_b)\underline{\underline{T}}^{(a)}$ can be calculated using item (3) above.

Finally, the statistical noise in matrices generated by ray-trace simulation can be reduced, often dramatically, using item (1) above. Symmetrization is analogous to applying each of the operations in the symmetry group of the structure to the matrix representations of its BSDFs, and averaging the results. For a group possessing 2n operations, the reduction in the rms noise is $(2n)^{-1/2}$, analogous to launching 2n times as many rays. For brightness enhancement film (BEF), symmetrization yields a factor-of-two reduction in the rms noise of its matrix BSDFs. For a structure possessing $C_{60v}$ symmetry (for example, a diffuser modeled by simulation) rms noise is reduced by more than a factor of 10.

Optimized Linear-Algebra Routines

By using the Radiative Transfer Equation, expressing its solution in matrix form, and then using the resulting equations in the simulation system 60, the system 60 predominantly utilizes linear algebra, rather than ray tracing, to calculate the scattering (reflection and transmission) characteristics of optical paths in a backlight. Linear algebraic techniques have also been used to address a vast array of other, unrelated, problems in applied physics. As a result, scientific-computing software engineers have developed highly-optimized tools for performing common linear-algebraic operations, and these tools are preferably exploited by the Stack Evaluator 64 to realize further computational acceleration. Specifically, the Stack Evaluator preferably utilizes the Basic Linear Algebra Subroutines disclosed in Lawson et al., Basic Linear Algebra Subroutines for Fortran Usage, ACM Trans. on Mathematical Software 5, 308-325 (1979); use of these subroutines on a Silicon Graphics, Inc. workstation typically achieve a five-fold acceleration in software.

Ray-tracing software can also be optimized, both by careful crafting of the architecture, and by the use of optimizing compilers, but the degree of acceleration is unknown and great developmental expense may be required. An advantage of the linear-algebraic approach resides in the ready availability of software that is already maximally-optimized through decades of developmental effort.

Rotations, Reflections, and Inversions

Selected physical transformations of optical-path components, or combinations thereof, can be effected by simple manipulation of the matrix representations of their BSDFs. If $\underline{\underline{A}}$ denotes $\underline{\underline{R}}^{(a)}$, $\underline{\underline{R}}^{(b)}$, or $(n_a/n_b)\underline{\underline{T}}^{(a)}$, constructed in the standard manner where the angular basis cells are ordered with their azimuthal index varying first, and $\underline{\underline{A}}^{(ij)}$ denote the i,jth N"-by-N" block of $\underline{\underline{A}}$, then a right-hand rotation of the component about $\hat{n} = \hat{u} \times \hat{v}$ by any integer number of azimuthal increments 360°/N" is accomplished by a cyclic permutation of the rows and columns of each $\underline{\underline{A}}^{(ij)}$. A rotation by m increments is accomplished by a permutation such that rows (and columns) 1, 2, ..., N" in the unrotated matrix occur in the order N"−m+1, ..., 1, 2, ..., N"−m in the rotated matrix. The reflection of a component in a vertical mirror plane that bisects either one unit cell or the union of two adjacent unit cells is accomplished by interchanging all pairs of rows and columns whose cells are reflections of one another. The reflection of a component and its enveloping indices of refraction in any horizontal mirror plane is accomplished by interchanging $\underline{\underline{R}}^{(a)}$ and $\underline{\underline{R}}^{(b)}$, and $\underline{\underline{T}}^{(a)}$ and $\underline{\underline{T}}^{(b)}$. The latter interchange is accomplished by replacing $(n_a/n_b)\underline{\underline{T}}^{(a)}$ by its transpose. If the enveloping indices are not inverted, the matrix BSDFs of the inverted structure must be recalculated from 'first principles' (i.e. by a modified application of the methods used to calculate the BSDFs of the original structure). The inversion of a component and its enveloping indices through a point is accomplished by successive two-fold rotation and reflection in a horizontal mirror plane. The order of operations is immaterial. Finally, two-fold rotation of a structure and its enveloping indices about any horizontal axis is accomplished by successive reflections in a vertical mirror plane containing the axis and a horizontal mirror plane. Again, the order of operations is immaterial.

Cumulative BSDFs

The characteristics of matrix BSDFs that relate to ray propagation in a simulated backlight are:

(1) The total reflectivity and transmissivity of a surface, illuminated by a uniform radiance confined within cell j of the angular basis (corresponding to a particular direction on the unit hemisphere), are:

$$R_j^{(a,b)} \equiv \sum_{i'=1}^{N} R_{i'j}^{(a,b)}$$

$$T_j^{(a,b)} \equiv \sum_{i'=1}^{N} T_{i'j}^{(a,b)}.$$

(2) The cumulative probabilities of reflection and transmission into cell i of the angular basis, for illumination by a uniform radiance confined within cell j, are:

$$\tilde{R}_{ij}^{(a,b)} \equiv \sum_{i'=1}^{i} R_{i'j}^{(a,b)} / R_j^{(a,b)}$$

$$\tilde{T}_{ij}^{(a,b)} \equiv \sum_{i'=1}^{i} T_{i'j}^{(a,b)} / T_j^{(a,b)}.$$

When calculated for each incident cell $1 \leq j \leq N$ in turn, these quantities form N-component vectors $\underline{R}^{(a,b)}$ and $\underline{T}^{(a,b)}$, and N-by-N matrices $\underline{\underline{\tilde{R}}}^{(a,b)}$ and $\underline{\underline{\tilde{T}}}^{(a,b)}$, respectively. Total reflectivities and transmissivities are used to make ray-handling decisions that select between reflection and transmission. Random selections made with relative probabilities $R_j^{(a,b)}$ and $T_j^{(ab)}$ for rays incident within cell j will faithfully reproduce the actual fate of an ensemble of photons striking the surface with directions within cell j. After selecting between reflection and transmission of a given ray, cumulative distributions are used to determine its direction. Randomly-selected reflected or transmitted cells i, whose cumulative distribution values $\tilde{R}_{ij}^{(a,b)}$ or $\tilde{T}_{ij}^{(a,b)}$, for rays incident within cell j, are uniformly-distributed between 0 and 1, will faithfully reproduce the actual distribution between cells of an ensemble of photons striking the surface with directions within cell j.

After the Stack Evaluator calculates the matrix BSDFs of an optical path for a combination of elements, components, and/or stacks, those BSDFs may be stored in a library file (such as Film Library 62 or the like) if desired by the user. Depending on which acceleration techniques are implemented, the calculation of combined BSDFs may be sufficiently fast that only very common, or very complex (and therefore time-consuming), optical paths are typically cataloged. Cataloged BSDFs may be stored in their symmetry-factored forms, wherein only the lower triangles of $\underline{\underline{R}}^{(a)}$ and $\underline{\underline{R}}^{(b)}$, and the full matrix $(n_a/n_b)\underline{\underline{T}}^{(a)}$ (but not $(n_b/n_a)\underline{\underline{T}}^{(b)}$, are written. Then, the full N-by-N matrices $\underline{\underline{R}}^{(a)}$, $\underline{\underline{R}}^{(b)}$, $\underline{\underline{T}}^{(a)}$ and $\underline{\underline{T}}^{(b)}$ are readily calculated from the symmetry-factored forms of $\underline{\underline{R}}^{(a)}$, $\underline{\underline{R}}^{(b)}$, and $(n_a/n_b)\underline{\underline{T}}^{(a)}$, using reciprocal symmetries, the known value of the ratio $(n_a/n_b)$, and the technique of item (3) above $\underline{\underline{R}}^{(a)}$, $\underline{\underline{R}}^{(b)}$, $\underline{\underline{T}}^{(a)}$, and $\underline{\underline{T}}^{(b)}$, as well as $\underline{\underline{\tilde{R}}}^{(a)}$, $\underline{\underline{\tilde{R}}}^{(b)}$, $\underline{\underline{\tilde{T}}}^{(a)}$, and $\underline{\underline{\tilde{T}}}^{(b)}$ are calculated from $\underline{\underline{R}}^{(a)}$, $\underline{\underline{R}}^{(b)}$, $\underline{\underline{T}}^{(a)}$ and $\underline{\underline{T}}^{(b)}$. The final entry in each column of each cumulative-BSDF matrix is, by definition, unity, and so need not be stored. Instead, the vectors of total reflectivity and transmissivity may if desired be stored in these locations, both for economy of memory and logistical simplicity. Finally, the four full N-by-N cumulative-BSDF matrices may be written to an output file for subsequent use by a backlight-simulation program. Reciprocal or physical symmetries may not be exploited to 'compress' these files (although both symmetries may be fully exploited in the calculation of their contents). The output cumulative-BSDF files may if desired be stored in temporary memory, to be deleted upon completion of the backlight simulation. Such a file-maintenance strategy avoids the complexity of inverting factorizations in simulation software, and recognizes the rapidity with which cumulative BSDFs can be recalculated from maximally-compressed BSDF files by the Stack Evaluator software.

Light Source Library

Figure 5:
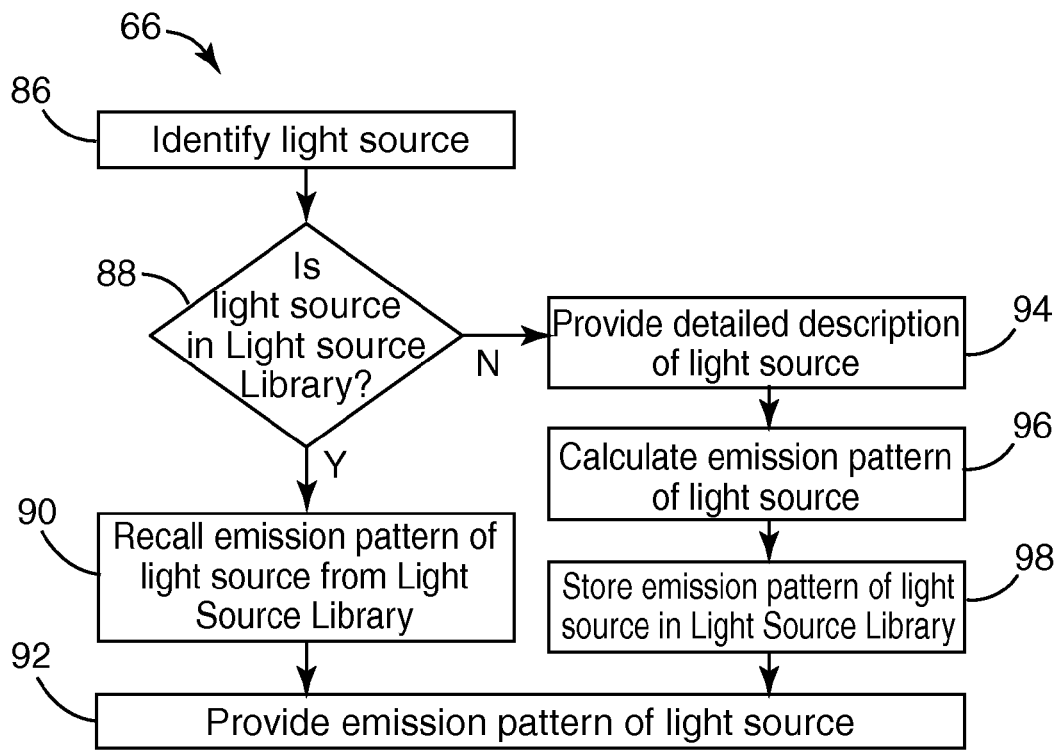
FIG. 5 is a block diagram showing the operation and layout of a light source library useable in the backlight simulation system of FIG. 3.

The operation and layout of Light Source Library 66 is shown schematically in FIG. 5. In step 86, the Light Source Library 66 identifies a light source, such as a particular light emitting diode (LED) or cold cathode fluorescent lamp. In step 88, if the light source is already stored in the library 66, the emission pattern of the light source is recalled in step 90 and is then provided in step 92. In step 88, if the light source is not in library 66, then the user provides a detailed description of the component in step 94, the library 66 uses the description to calculate the emission pattern of the light source in step 96, stores the emission pattern in step 98 so it need not be calculated again, and provides the emission pattern in step 92. The library infrastructure may be similar to that of Film Library 62, if desired.

Similar to Film Library 62, the most technically demanding steps of Light Source Library 66 are steps 94 and 96, which involve specifying the light source and calculating the emission pattern of the light source. These steps are treated in greater detail below.

The specification of a light source should answer the question: How bright does the source appear from various viewing orientations, and how does this brightness vary over the emission area of the source? A suitable quantity known from radiometry is radiance, which has units of power per area per solid angle, or watts per (m²-steradian) in SI units. Unlike some other radiometric quantities, the radiance of a source is invariant with respect to the viewing distance away from the source. The radiance is a function of viewing angle in two directions, e.g. along an x-direction and along a y-direction, and for extended sources may be a function of position, e.g. x and y. The radiance may thus be a function of four variables: two for angle and two for position. For point sources, which have an insignificant spatial extent, the quantity radiant intensity is used, rather than radiance. Radiant intensity has units of power per solid angle, and is sufficiently specified only in terms of the two viewing angles. As used herein, the "brightness" of a source shall mean the radiance if the source is extended (i.e., has a finite spatial extent), and shall mean the radiant intensity if the source is a point source. The "brightness" of a backlight usually refers to radiance, since backlights are typically extended sources.

The radiance of a source may be measured, or calculated, or specified by the source manufacturer. For instance, the emission pattern of an LED may be measured straightforwardly in a test fixture that sequentially positions a detector in various locations in the emission hemisphere, records the measured power (along with an aperture size at a particular distance away from the source), then either reports the emission pattern directly or fits it to a predetermined curve, such as the well-known Gaussian or Lambertian distributions. For these distributions, the angular width is commonly reported. Likewise, a particular distribution and the accompanying angular widths may be reported by the manufacturer of the source, as well as tolerance values on the widths and direction of the emission. Alternatively, the emission pattern may be calculated from a specification of the near-field emission pattern; that is, the light distribution of a relatively small source may be provided at the source itself, then a diffraction model may be employed to produce the far-field emission pattern.

The discussion of radiance above does not address wavelength dependencies, but for real sources radiance is wavelength dependent. A nominally red-emitting source may for example have a radiance specified at the center wavelength of the source, and the radiance may be assumed to change with wavelength in the same manner for all directions of emitted light. That is, the radiance at a short wavelength end of the nominally red emission band is assumed to have the same angular dependence as the radiance at a long wavelength end of the band, and each are attenuated by a uniform scaling factor compared to the peak radiance at the center wavelength. In practice, radiance may be specified independently at multiple colors or wavelengths, such as a red, a green, and a blue radiance, corresponding to the center wavelengths of a red, green, and blue source. If more than one radiance is provided, each for a distinct wavelength, the simulation system 60 may calculate, store, and manipulate a BSDF or sets of BDSFs for each wavelength.

Typically, the radiance of one or more sources is specified, and the system 60 provides the radiance of the simulated backlight system as a function of viewing angle and spatial location at an output surface of the backlight. The spectral response of the human eye may optionally be incorporated to the simulation by using the photometric quantity, luminance. Luminance has the units of lumens per m$^2$ per steradian, or "nit", commonly abbreviated "nt". The units of photometry implicitly incorporate the spectral response of a typical human eye, which has its maximum sensitivity at 550 nm—the peak of the well-known bright-adapted spectral luminous efficiency curve. In this manner, one may directly compare the perceived brightnesses of each wavelength band by comparing the luminance values, rather than manually noting, scaling and comparing the red, green and blue radiance values.

We will now describe two sample specifications for radiance-one for a cold cathode fluorescent lamp, and one for an LED. The reader will appreciate that other suitable light sources may be specified in a similar manner.

First, a sample emission pattern is described for a cold cathode fluorescent lamp. A cold cathode fluorescent lamp is usually modeled by Lambertian emission at each point (i.e., the emitted radiance is independent of direction over the outward-directed hemisphere), which is uniform over the emissive area of the lamp.

A detailed description of a light source may require, in addition to its emissive properties, its reflective and transmissive properties for light incident upon it. For example, cold cathode fluorescent lamps are typically modeled as Lambertian reflectors, and in advanced models, as partially transparent reflective tubes, requiring also specification of the (e.g. Lambertian) transmissivity of their surfaces. This is depicted in FIGS. 1 and 2.

Figure 9:
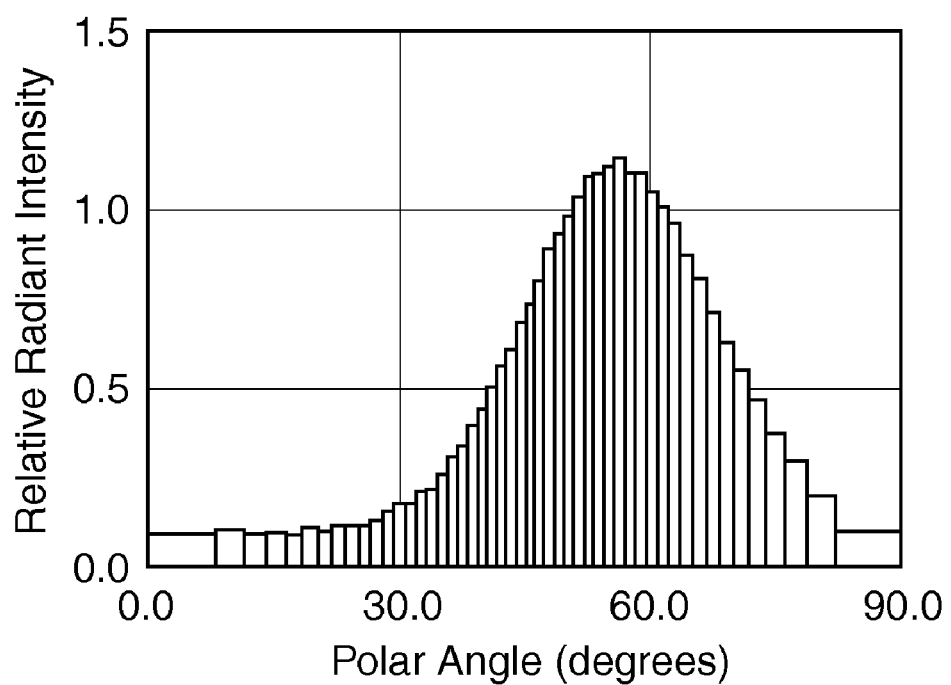
FIG. 9 is a plot of an emission pattern from an exemplary light emitting diode.

Next, a sample emission pattern is described for an exemplary LED. The LED emits from its active area an azimuthally-symmetric radiance whose dependence upon the polar angle $\theta$ is the superposition of the constant value 0.1 with a mean=0.75, standard deviation=0.20 Gaussian in $\sin^2 \theta$, clipped exterior to the domain $0 \leq \sin^2 \theta \leq 1$, and possessing normalization 0.9. The LED is modeled as a point source, meaning both that emission is confined to an infinitesimal area, and that light does not interact with the source subsequent to emission. Azimuthally-symmetric point sources are commonly characterized by their emitted radiant intensity (power per unit solid angle) as a function of $\theta$. This characterization of the present example LED is depicted in FIG. 9. The histogram-style result in FIG. 9 is developed by binning emitted rays from a simulation in constant increments of $\sin^2 \theta$, and dividing the accumulated number, relative to the total, by the bin-averaged value of $\cos \theta$. This style of light source specification is well suited for generating source rays by a flexible yet simple algorithm, described below. Unit-power rays are launched with azimuths uniformly distributed between 0 and 360 degrees, and values of $\sin^2 \theta$ independently distributed (1) uniformly between 0 and 1 with probability 0.1, and (2) normally with mean 0.75 and standard deviation 0.20, but confined between 0 and 1, with probability 0.9. The density of $\sin^2 \theta$ (rather than $\sin \theta$ or $\theta$) is specified so that, conveniently, a Lambertian distribution corresponds to a uniform density.

Backlight Simulator: Overview

Figure 7:
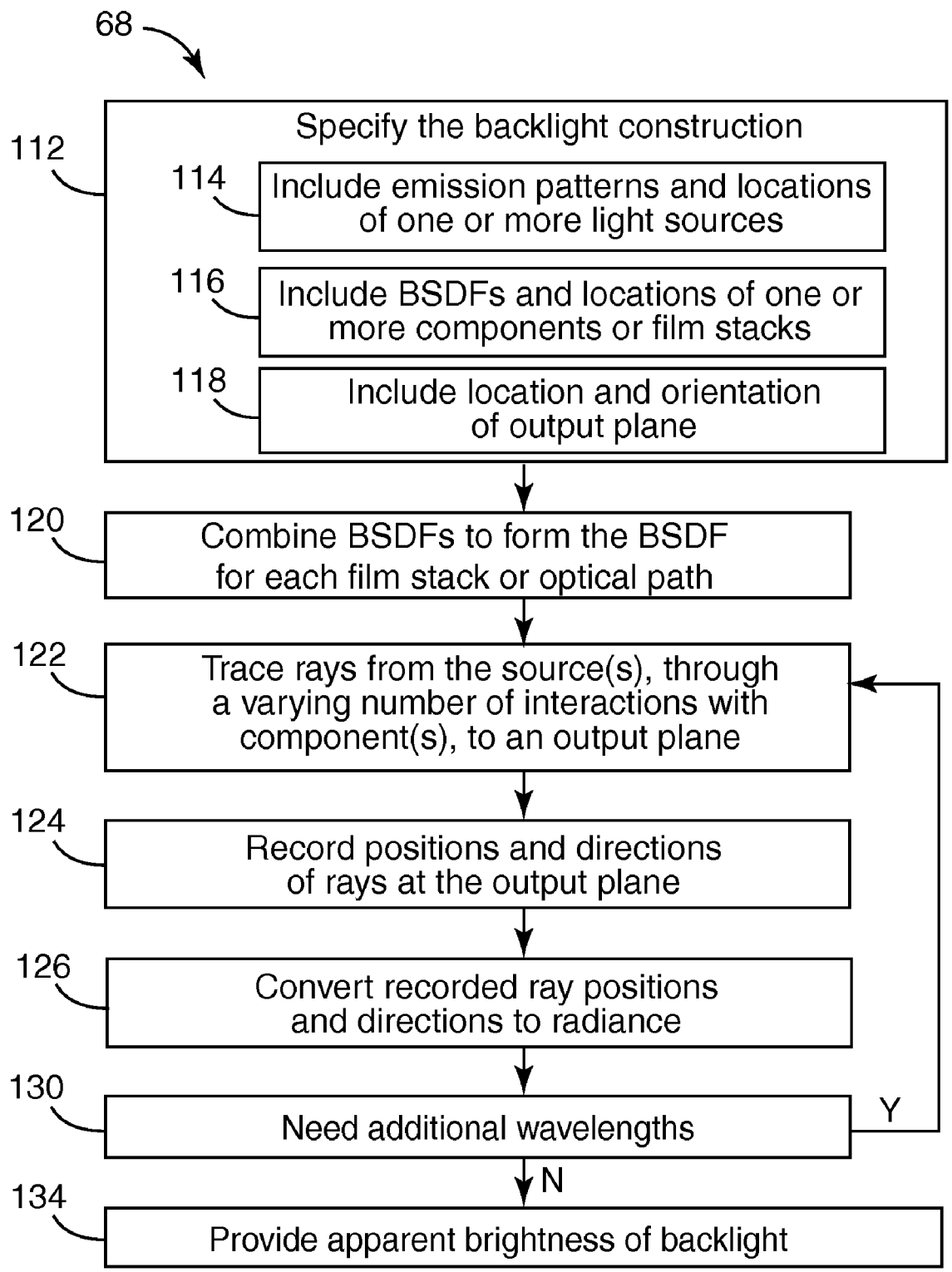
FIG. 7 is a block diagram showing the operation and layout of a backlight simulator useable in the backlight simulation system of FIG. 3.

The operation and layout of Backlight Simulator 68 is shown schematically in FIG. 7. In step 112, the backlight construction is specified. This may be done manually by a user, or automatically, such as by a computer during an iteration step. Regardless of the initiator of step 112, at the conclusion of step 112 the backlight construction is specified, including the emission patterns and locations of one or more light sources (step 114), the BSDFs and locations of one or more components or film stacks (step 116), and the location and orientation of an output plane (step 118). If more than one wavelength or wavelength band is required, this may also be incorporated into step 112. In step 120, the BSDFs of adjacent components may be combined into one or more combined BSDFs; this step may optionally utilize the Stack Evaluator 64. In step 122, rays are traced from the source(s), through a varying number of interactions with the components or film stacks, to an output plane. In step 124, the positions and directions of the rays at the output plane are recorded, such as with a histogram-like power vector, or the like. In step 126, the recorded positions and directions of the rays at the output plane are converted to an emission pattern, such as one described by the radiance transmitted through the output plane. If additional wavelengths or wavelength bands are required (step 130), operation returns to step 122. If not, the emission pattern is provided (step 134), either to the user in the form of data, graphs, or displays, or to a display engine that may generate graphs or other display plots. There are several technically demanding steps shown in FIG. 7, and these are all described in greater detail below.

The optical paths are specified in terms of the primitive elements listed above. Film components are selected from the library of BSDFs, such as the Film Library 62. If the BSDF of a film component is unavailable, it can be generated by specifying its optical path, and incorporated into the library if desired.

Frequently, the film stack and optical path will be uniform over the entire extent of each surface, but spatially-varying film stacks and optical paths (e.g. dot patterns) can be described by pixelating the surface, and providing an integer identifier for each pixel indicating the local identity of the film stack and optical path. For instance, a registered diffusing film having a periodic structure may require spatial variation. Or, a reflective dot pattern, as commonly used with edgelit light guides, may also require spatial variation.

Often, the physical thickness of a film stack or optical path does not substantially affect backlight performance. However, when an optical path possesses substantial thickness thought to affect performance, it can be represented by separated parallel surfaces, with a portion of the optical path associated with each surface.

Also as part of the backlight construction specification, the identity, location, and orientation of each light source should be specified. The sources are selected from the library of emission patterns, such as the Light Source Library 66.

For sources with a small spatial extent in one or both dimensions, line-source (CCFL) approximations and point-source (LED) approximations are often adequate, respectively. For these small spatial extent cases, only directional (point) or directional and one-dimensional positional (line) emission patterns are required, rather than a different emission pattern for each pixel location on the source. However, ray interactions with the sources subsequent to emission cannot be assessed for these idealized sources of zero cross section.

For larger sources, which have a finite spatial extent, the source representations can include (in addition to emission as a function of direction and three-dimensional position) the size, shape, and reflective and transmissive characteristics of the sources, in order to enable the assessment of ray/source interactions subsequent to emission.

Based on the relative powers of the sources and the emission pattern (both spatial and directional) of each source, unit-power rays are launched with random position and direction. The launch conditions may correspond to the source properties, in that relatively more rays are launched along paths of high optical power, and fewer rays are launched along paths of low optical power.

Alternatively, other suitable launch conditions may also be used. For instance, the rays may be launched with uniformly distributed angles, but the power associated with each ray is scaled according to the directional properties of the source radiance.

Each ray, which is launched with a particular "unit-power", has its power diminished exponentially with its distance traveled within a volume according to the specified absorption per unit path length. For free space propagation, and for propagating within a non-absorbing medium, there is essentially no absorption, and each ray retains its power. However, inside an absorbing medium, each ray loses a particular fraction of its power for each unit length traveled. In physical terms, absorption in a material generally occurs only when there is a substantial non-zero imaginary component to the refractive index of the material.

When propagating in a uniform, homogeneous, isotropic medium, as is typically the case in backlight systems, the rays travel in an essentially straight lines. After the rays are launched, they propagate until they strike a surface or component, at which point they interact with the surface or component.

The interaction with the particular component is dictated by the local BSDF of the component. Recall that the BSDF is a probability distribution that generally answers the question: If a ray strikes the component with a particular incident orientation, what is the probability that the ray exits the component with a particular orientation? The BSDF of the component governs the ray behavior after the ray strikes the component. Specifically, the ray power is (typically) diminished and ray direction is (typically) altered randomly upon each interaction with the component, as dictated by the local BSDF.

This ray interaction is fundamentally different from the ray interaction of conventional ray tracing, in which the exiting angle is calculated deterministically from fundamental physical principles. Here, each ray interaction is determined probabilistically, rather than deterministically. For instance, if two rays having identical incident conditions strike a component, the rays will usually have different exiting conditions, because each ray interacts with the component in a manner dictated by a probability function, namely the BSDF of the component.

Upon reflection at a surface or component, rays are retained within the incident volume. Typically, upon reflection, a ray is relaunched and redirected within the incident volume, and the process repeats. Upon transmission through a surface or component, rays exit the incident volume and propagate to an adjacent volume.

We now describe an exemplary process for terminating rays and keeping track of their associated powers. This is typically done when the rays strike the output plane; the reflected portion is easily handled by relaunching rays within the incident volume; the transmitted portion is handled by a process such as the one described below.

Upon each intersection with the output plane, all or part of the incident ray power may be accumulated in a vector associated with the pixel (increment of area) containing the point of intersection, with the elements of the vector representing distinct directions of incidence. This vector functions essentially as a power histogram, and describes the power contained in each particular direction incident upon the given pixel of the output plane. If all of the incident power is to be accumulated, the ray is terminated. If only a portion of the incident power is to be accumulated, a ray containing the residual power is randomly reflected. When all of the incident power is accumulated, if and only if the incident power is less than some specified threshold, then all rays will eventually terminate on the output plane, where each intersection with the output plane constitutes one 'exit' ray. This is one method for terminating rays; other suitable methods of ray termination may also be used.

The ray positions and directions are converted to a radiance distribution in step 126. Within each pixel on the output plane, the vector of accumulated incident power is multiplied by the matrix representing the local BTDF of the surface, and the result is divided by the area of the pixel, the number of unit-power rays launched, and pi divided by the number of directional cells considered. The final result is the radiance transmitted into every direction for unit power emitted by the source(s).

Note that the output plane may be the film stack itself. In this case, rays may be traced from the source through the cavity to the film stack, and may be terminated upon incidence on the film stack. A statistical analysis may be performed of the rays incident on the film stack, yielding, after multiplication by the BTDF of the film stack, the spatial and direction brightness distribution exiting the film stack. It should be emphasized that the rays may terminate before passing through the film stack, and that the multiplication by the BTDF of the film stack effectively converts the "incident" information to the "exiting" information that is desired by the user. One reason for accumulating the ray information before passing through the film stack is to reduce statistical noise in the simulation; one would not observe this reduction in statistical noise if the rays were additionally traced through the film stack, and the analysis were performed after transmission. In other cases, although there is no reduction in statistical noise, the rays may also be traced through the film stack, and the analysis performed on the rays that exit the film stack. In this manner, the rays may be traced to any arbitrary plane or other suitable shape, where they may be accumulated and analyzed.

The number of exit rays required depends upon the number of pixels on the output plane, and the tolerable level of statistical noise in the calculated transmitted radiance. Typical values are 10 to 100 million.

It is instructive to summarize the ray trace thus far. Rays are initially launched from the source or sources, then propagate from component to component within a particular incident volume. Interactions with components are governed by the BSDFs of the particular components. The rays reflect from component to component, with appropriate accounting of the relative power in each ray, until they strike a partially or wholly transmissive output face (or surface or component). The output face may be an effective boundary between the incident volume and an exiting volume, or may be the output plane of the system. At the output face, a reflected portion is relaunched into the incident volume. For all transmissive faces except the output plane, there is an exiting volume, and the transmitted portion is launched into the exiting volume. If the partially transmissive face is the output plane, then there is no exiting volume, and the histogram-style power vector determines the radiance distribution at the output plane.

In this exemplary process, rays are launched from a source, propagate inside a volume until they strike a partially transmissive face, then either terminate at an output plane, or enter a new volume by passing through the partially transmissive face. This exemplary process is depicted in steps 122-126; the reader will understand that various other processes may be used to trace rays from the source to the output plane.

Steps 122-126 can be repeated for each of several different visible wavelengths (step 130) to determine the spectral dependence of the radiance transmitted by the output plane. The following paragraphs describe step 130 in further detail.

If the source power changes with wavelength but the relative angular distribution at each wavelength is the same (meaning that the emission distribution at the different wavelengths are related by a simple scaling factor), then the spectral dependencies of the transmitted radiance and source powers are identical.

If, however, the emission patterns change with wavelength (meaning that the emission distribution changes shape or location at different wavelengths), as is the case for separate red, green, and blue LEDs, then separate simulations should be performed for each wavelength or wavelength band. For instance, there may be differences in angular emission for different-color devices, or slight differences in spatial emission caused by offsets of red, green, and blue devices. Additionally, while the optical characteristics of many films are substantially independent of wavelength throughout much of the visible, plastics frequently exhibit increased absorption in the blue, resulting in associated changes in their BSDFs for these wavelengths. Furthermore, multi-layer films, whose optical response is determined by a multitude of coherent interactions, can exhibit substantial wavelength dependence throughout the visible, and may require separate simulations for each wavelength of interest.

In step 134, after the radiance at the output plane is established for each desired wavelength, a quantity denoted as apparent brightness is provided. The apparent brightness may be radiance itself, or it may be the photometric counterpart of radiance, luminance. As a further alternative, the apparent brightness may be a quantity known as brightness, which is the photopic analogue of radiance, equal to the spectral radiance, weighted by the response of the human visual system, integrated over the visible spectrum. As a further alternative, a quantity known as color may be used, which equals a two-component vector characterizing human visual perception of spectral variations in radiance, equal to the spectral radiance weighted by each of two color-matching functions integrated over the visible spectrum. Optionally, one or more of the above quantities may be provided to form the apparent brightness. Alternatively, any other suitable quantity may be used.

The apparent brightness of the output plane may be provided by step 134 directly to the user, in the form of a data file, a printout, a graph or a plot, or may be provided to a display engine that can display and configure the apparent brightness in response to a user input or a predetermined set of conditions. One example of a display engine is the Virtual Display 70 of FIG. 3.

Although cross-sectional plots, contour plots, and surface maps may be used by the Virtual Display, an especially convenient form of presenting the apparent brightness is through a gray-scale or color map, described in further detail below.

The Virtual Display can exhibit the full spatial extent of the backlight, or any portion thereof as desired, enabling the user to quickly see any non-uniformities in the apparent brightness. The viewing angle may be changed in both the x-direction and the y-direction, using controls similar to those in many CAD packages. The viewing distance may also be varied, enabling the user to view the display with position-dependent viewing angles. That is, for an observation point close to the screen, the viewing angle is different for different pixels on the output plane, for example, ranging from normal incidence viewing for a pixel at the center of the screen, to grazing or high incidence viewing for a pixel at an edge or corner of the screen.

We now provide further detail of the backlight simulation.

There are numerous aspects to performing a ray-trace simulation of a backlight. These include defining a series of closed surfaces that specify the geometry, and which implicitly define the volumes making up the backlight (or alternatively defining the volumes and inferring the surfaces), and defining the attenuating and scattering characteristics of these surfaces and volumes. They include defining and positioning light sources, as points, lines, areas, or volumes, and specifying their spatial and angular distributions of emitted radiance. They can also include defining the three-dimensional structure and scattering characteristics of these sources so that their interaction with rays subsequent to emission can be modeled. They include specifying the specific characteristics of backlight emission of interest, by, for example, defining an output plane for the backlight, the incident radiance on which constitutes the observed emission. They also include the many algorithms for handling rays, including the determination of surface intersections, the modification of power and the redirection of rays upon intersections with surfaces, and the attenuation and possible scattering of rays along their paths between surface intersections.

Many of the aspects of traditional backlight simulation are left substantially unaltered by our approach. These include, for example, the generation of source rays, and the handling of volumetric attenuation and scattering. The approach outlined herein may differ from traditional approaches in one or more of the following five principal respects:

(1) a single surface can be used to represent a finite optical path;

(2) the scattering characteristics of surfaces (including those representing finite optical paths) are represented by matrix BSDFs;

(3) ray power and direction are modified upon intersection with surfaces according to equations based upon the BSDFs associated with the surface;

(4) rays are accumulated on an at least partially-transmissive output face of the backlight (which may be referred to as an output plane), and the spatial and angular distribution of those rays is stored; and (5) backlight emission is calculated by matrix multiplication of vectors of accumulated incidence on the output plane.

We will now discuss the unique aspects associated with these itemized differences.

Items (1) and (2) afford a substantial simplification, relative to traditional approaches, of the burden of specifying the geometries and scattering characteristics of nontrivial optical paths. For example, a face having a complex gain-enhancement stack is specified by a single surface that defines the mean position of the face and an associated BSDF, rather than every surface element present within the optical path over the entire extent of the face. Since items (1) and (2) are simplifying and relatively straightforward, we focus now on items (3), (4), and (5).

Selected benefits of our approach can be realized using only a subset of these unique aspects. For example, items (4) and (5) might be omitted by transmitting rays to an image plane, as in a traditional simulation. Items (1), (2), and (3) can nevertheless be used to substantially increase the rate at which rays are processed to eventually reach the image plane.

Surface Elements

In a simulation, the handling of rays according to scattering characteristics described by BSDFs occurs exclusively upon the intersection of rays with surfaces. Surfaces may be specified many different ways in a ray-trace simulation. One is as a series of contiguous planar facets, but other ways, such as by specifying one equation in three spatial coordinates (e.g. $x^2+y^2+z^2=R^2$ for a sphere) are also possible. Ultimately, all surfaces will possess a local tangent plane at all points intercepted by any of a finite number of randomly-launched rays. This tangent plane constitutes the horizontal plane relative to which the local BSDFs of the surface are defined.

The calculation of the scattering characteristics at a point on a surface relies upon the definition of two orthogonal vectors $\hat{u}$ and $\hat{v}$ spanning the tangent plane at the point. There are two degrees of freedom associated with this choice: the orientation of $\hat{u}$, and the sense of the rotation toward $\hat{v}$. The former determines the rotational orientation of the element, component, or stack ("optical path") which is described by the BSDFs to be applied at that point. The latter determines the sense of the surface normal $\hat{n}=\hat{u}\times\hat{v}$, which defines the regions 'above' ($+\hat{n}$) and 'below' ($-\hat{n}$) the surface. This, in turn, determines the sense, relative to a possible horizontal mirror-plane reflection, of the optical path described by the BSDFs to be applied at that point.

We shall assume throughout the ensuing discussion that $\hat{u}$ and $\hat{v}$ are defined at all points intercepted by any randomly-launched ray, and that the cumulative BSDFs $\tilde{\underline{\underline{R}}}^{(a)}$, $\tilde{\underline{\underline{R}}}^{(b)}$, $\tilde{\underline{\underline{T}}}^{(a)}$, and $\tilde{\underline{\underline{T}}}^{(b)}$ as well as the total reflectivities and transmissivities $\underline{R}^{(a)}$, $\underline{R}^{(b)}$, $\underline{T}^{(a)}$ and $\underline{T}^{(b)}$, also are specified. The latter specification is usually accomplished by a mapping of all points on surfaces that define the backlight to a list of unique cumulative BSDFs, reflectivities, and transmissivities. There will exist, in general, surfaces for which only a subset of $\tilde{\underline{\underline{R}}}^{(a)}$, $\tilde{\underline{\underline{R}}}^{(b)}$, $\tilde{\underline{\underline{T}}}^{(a)}$, $\tilde{\underline{\underline{T}}}^{(b)}$, $\underline{R}^{(a)}$, $\underline{R}^{(b)}$, $\underline{T}^{(a)}$ and $\underline{T}^{(b)}$, are required. For economy of memory, only the necessary components should be included in the list. We describe below the minimum requirements for each surface within the context of the decision rules which are applied there. At least one of the surfaces that define the backlight will constitute the output face through which light emitted by the sources eventually passes to form the backlight emission. In circumstances where any one of these is sufficiently large that the backlight emission varies substantially over its extent, resolution of spatial variations in emission requires subdivision of the subject surface into an array of pixels, and independent calculation of the emission for each pixel. Upon completion of the simulation, the radiance transmitted through the subject surface is displayed on a pixel-by-pixel basis to exhibit its spatial dependence. In the ensuing discussions, we assume only for simplicity of explanation the usual circumstance where the output face of the backlight is one large planar surface, and where that surface, usually rectangular in form, is subdivided into a two-dimensional array of pixels referenced by indices k and l. However, we do not intend, by so limiting our description, to similarly limit the envisioned applicability of our approach. The methods we describe are easily extended to, for example, multiple non-planar, non-rectangular partially-transmissive faces composed of numerous facets, each so small that no subdivision is required to adequately resolve spatial variations in backlight emission.

Monte-Carlo Decisions

A Monte-Carlo decision is appropriate for any surface for which both reflected and transmitted light can eventually contribute to the backlight emission. A partially-reflective and partially-transmissive plate disposed within a backlight cavity between the light sources and the output face is an example of a surface for which ray interactions are typically handled by Monte-Carlo decisions. A Monte-Carlo decision is effected by four successive, statistically-independent decisions. Each relies upon an initial determination of the sense of incidence (from above or below) and the cell j within which the direction of incidence $\hat{s}_i$ resides. The sense of incidence is from above or below according to whether $\hat{s}_i \cdot n$ is negative or positive, respectively (a ray will not strike the surface if $\hat{s}_i \cdot n=0$), and the azimuth of incidence (which determines the azimuthal component of cell j) is determined relative to the orthogonal pair $\hat{u}$ and $\hat{v}$ contained within the plane of the surface.

The first decision selects between reflection and transmission based upon the total reflectivity and transmissivity of the surface for incidence from within cell j ($R_j^{(a,b)}$ and $T_j^{(a,b)}$, respectively). Reflection is selected if a randomly-selected uniformly-distributed value $r_1$ on the interval 0 to 1 is such that $$r_1 < \frac{R_j^{(a,b)}}{R_j^{(a,b)} + T_j^{(a,b)}}$$

Transmission is selected otherwise. The only possible outcomes are reflection or transmission, irrespective of the possible occurrence of absorption. Independent of the outcome of this first decision, the power in the ray is reduced by the factor $(R_j^{(a,b)} + T_j^{(a,b)}) \leq 1$.

The second decision selects the cell containing the scattered direction. A second random value $r_2$ is selected on the interval 0 to 1, and the scattered cell i is determined such that $$\tilde{R}_{i-1,j}^{(a,b)} < r_2 < \tilde{R}_{ij}^{(a,b)}$$

if the ray is to be reflected, or $$\tilde{T}_{i-1,j}^{(a,b)} < r_2 < \tilde{T}_{ij}^{(a,b)}$$

if it is to be transmitted. (Here we assume $\tilde{R}_{0j}^{(a,b)} = \tilde{T}_{0j}^{(a,b)} = 0$ for all $1 \leq j \leq N$.)

The third and fourth decisions select a precise direction for the reflected or transmitted ray within cell i. The objective is to randomly distribute the direction so as to represent a uniform radiance within the cell. This is accomplished (in our angular basis) by randomly selecting a third value $r_3$ on the interval 0 to 1 and setting $$\sin^2\theta = (1 - r_3)\frac{i' - 1}{N'} + r_3 \frac{i'}{N'},$$

where $\theta$ is the polar angle of the precise ray direction and i' is the polar index of cell i, and randomly selecting a fourth value $r_4$ on the interval 0 to 1 and setting $$\varphi = \left((1 - r_4)\frac{i'' - 1}{N''} + r_4 \frac{i''}{N''}\right)360° - 180°$$

where $\phi$ is the azimuthal angle of the precise direction (relative to $\hat{u}$) and i" is the azimuthal index of cell i. The selected polar angle is relative to $+\hat{n}$ for reflection from above and transmission from below, and relative to $-\hat{n}$ for reflection from below and transmission from above. Monte-Carlo decisions generally require as input both $\tilde{\underline{\underline{R}}}^{(a)}$ and $\underline{R}^{(a)}$, and $\tilde{\underline{\underline{T}}}^{(a)}$ and $\underline{T}^{(a)}$, for incidence from above, and $\tilde{\underline{\underline{R}}}^{(b)}$ and $\underline{R}^{(b)}$, and $\tilde{\underline{\underline{T}}}^{(b)}$ and $\underline{T}^{(b)}$, for incidence from below.

Purely-Reflective Decisions

A purely-reflective decision is appropriate for any surface for which only reflected light can eventually contribute to the backlight emission. The 'walls' of a backlight cavity, which light cannot penetrate or for which transmitted light is lost to emission through the face, are examples of surfaces for which ray interactions are typically handled by purely-reflective decisions. A purely-reflective decision is effected by three successive, statistically-independent random decisions. Again, each relies upon an initial determination of the sense of incidence and the cell j within which the direction of incidence resides.

A purely-reflective decision always reflects the ray, and always reduces its power by the factor $R_j^{(a,b)} \leq 1$. The three random decisions are made to select a reflected cell i, and subsequently a precise reflected direction within that cell. These selections are made in the same manner as for a Monte-Carlo decision whose first decision selected reflection. That is, given three random values $r_2$, $r_3$ and $r_4$ on the interval 0 to 1, i is selected such that $$\tilde{R}_{i-1,j}^{(a,b)} < r_2 < \tilde{R}_{ij}^{(a,b)},$$

$\sin \theta$ is selected such that $$\sin^2\theta = (1 - r_3)\frac{i' - 1}{N'} + r_3 \frac{i'}{N'},$$

and $\phi$ is selected such that $$\varphi = \left((1 - r_4)\frac{i'' - 1}{N''} + r_4 \frac{i''}{N''}\right)360° - 180°.$$

The polar angle is relative to $+\hat{n}$ for reflection from above, and $-\hat{n}$ for reflection from below.

Purely-reflective decisions require as input both $\tilde{\underline{\underline{R}}}^{(a)}$ and $\underline{R}^{(a)}$, and (but not $\tilde{\underline{\underline{T}}}^{(a)}$ and $\underline{T}^{(a)}$) for incidence from above, and $\tilde{\underline{\underline{R}}}^{(b)}$ and $\underline{R}^{(b)}$ (but not $\tilde{\underline{\underline{T}}}^{(b)}$ and $\underline{T}^{(b)}$) for incidence from below. In the usual circumstance where light contributing to emission is incident on only one side of a surface only $\tilde{\underline{\underline{R}}}^{(a)}$ and $\underline{R}^{(a)}$, or $\tilde{\underline{\underline{R}}}^{(b)}$ and $\underline{R}^{(b)}$ are required.

Bifurcating Decisions

A bifurcating decision is used for any surface for which both reflected and transmitted light can eventually contribute to the backlight emission. Bifurcating decisions split every incident ray into one that is reflected and one that is transmitted. In general, the number of rays whose paths are simultaneously followed grows exponentially with the average number of bifurcating decisions experienced by each ray exiting the output face. This can increase the complexity of simulation software, and in many cases dramatically increases the required memory. However, the output face of a backlight is a special case of a potentially bifurcating surface whose treatment as such engenders no increase in the number of rays whose paths are simultaneously followed, since transmitted rays constitute backlight emission, and so need not be followed further.

A bifurcating decision is effected by three successive, statistically-independent random decisions. Each relies upon an initial determination of the sense of incidence and the cell j within which the direction of incidence resides. Completion of the ray handling also relies upon identification of the element k, l in the two-dimensional array of pixels used to resolve the spatial dependence of emission within which the point of intersection with the partially-transmissive face resides.

The power in the reflected ray is reduced by the factor $R_j^{(a,b)} \leq 1$ relative to that incident, and the three random decisions are made to select a reflected cell i, and subsequently a precise reflected direction within that cell. This is in the same manner as for a purely-reflective decision. A bifurcating decision made on any surface other than the output face, or even one made on the output face in a simulation conducted by a more traditional approach (in which rays are traced beyond the output plane to an image plane), would then require selection of a direction for the transmitted ray. But in a preferred approach, the transmitted ray is not explicitly calculated. Instead, the transmitted power, equal to $T_j^{(a,b)} \leq 1$ times that incident, is accumulated in an N-component vector which we designate as the 'vector of accumulated incidence'. One such vector is maintained for each element of the array of pixels used to resolve the spatial dependence of emission. We denote these as $\underline{t}(k, l)$. The transmitted power is accumulated in the j component of the k, lth vector of accumulated incidence. We designate each event in which transmitted power is accumulated in any component of any vector $\underline{t}(k, l)$ as an 'exit ray'. The number of exit rays accumulated in a simulation, relative to the total number of pixels, provides our principle measure of the expected statistical significance of the predicted radiance within each pixel.

Bifurcating decisions require as input $\underline{\tilde{R}}^{(a)}$, $\underline{\underline{R}}^{(a)}$, and $\underline{T}^{(a)}$, for incidence from above, and $\underline{\tilde{R}}^{(b)}$, $\underline{\underline{R}}^{(b)}$, and $\underline{T}^{(b)}$ for incidence from below. But since light contributing to emission is exclusively incident on one side only of the output face, only $\underline{\tilde{R}}^{(a)}$, $\underline{\underline{R}}^{(a)}$, and $\underline{T}^{(a)}$, or $\underline{\tilde{R}}^{(b)}$, $\underline{\underline{R}}^{(b)}$, and $\underline{T}^{(b)}$, are required. Subsequent calculation of the transmitted radiance from the vectors of accumulated incidence, described below, will require also $\underline{\hat{\tilde{T}}}^{(a)}$ for incidence from above, or $\underline{\hat{\tilde{T}}}^{(b)}$ for incidence from below.

Ray Termination

We discuss two techniques for terminating rays. The first occurs exclusively on surfaces designated as perfectly absorbing. Any ray striking a perfectly-absorbing surface is immediately removed from further scrutiny without the creation of "offspring". Note, neither cumulative BSDFs nor total reflectivities or transmissivities need be specified for perfectly-absorbing surfaces. Only the designation of the surface as perfectly absorbing is required.

The second technique deals specifically with ray intersections with the output face, and is accomplished by the introduction of a threshold power $P_t$, defined as a fraction of the power launched within each source ray. Bifurcating decisions on the output face, as described above, are made only as long as the power in the incident ray exceeds $P_t$. When, due to the accumulated attrition experienced in previous interactions, the incident power is less than $P_t$, a modified Monte-Carlo decision is made in place of the bifurcating decision. The modified Monte-Carlo decision is identical to that described above in the circumstance where the first of the four decisions selects reflection. If the first decision instead selects transmission, the power assigned to the transmitted ray ($R_j^{(a,b)} + T_j^{(a,b)}$ times the incident power) is accumulated in the vector of accumulated incidence according to the cell j within which the direction of incidence resides, and the pixel k, l within which the point of intersection resides. Since no ray is transmitted or reflected, the incident ray is effectively terminated.

By this approach, all rays terminate on either a perfectly-absorbing surface or the output face of the backlight. No amount of power which might eventually contribute to emission, however small, is discarded. Accordingly, no threshold power for discarding rays, the value of which might affect the results of the simulation, need be specified. The threshold value which is required determines only the number of exit rays generated by each source ray launched. Its value may affect, in some small manner, the efficiency with which statistically-significant results are developed, but has no impact upon any result in the limit of an infinite number of source rays.

Backlight Emission

Upon completion of a simulation, the vectors of accumulated incidence contain, for each pixel on the output face, an estimate of the total transmitted power, resolved according to the direction of incidence from within the backlight cavity from which that power originates. In terms of the total transmissivity of the output face $\underline{\underline{T}}^{(a,b)}$, and the vector representing the radiance incident from within the cavity $\underline{I}^{(i)}$, these quantities are $$A_{pixel} \frac{\pi}{N} T_j^{(a,b)} I_j^{(i)}$$

for each $1 \leq j \leq N$. Here $A_{pixel}$ denotes the area of the subject pixel. Multiplying by $(T_{ij}^{(a,b)}/T_j^{(a,b)})$ for each of $1 \leq i \leq N$ in turn, and summing over all j yields $$A_{pixel} \frac{\pi}{N} \sum_{j=1}^{N} T_{ij}^{(a,b)} I_j^{(i)}$$

which is $A_{pixel}(\pi/N)$ times the transmitted radiance within cell i. Dividing by $A_{pixel}(\pi/N)$, and by the total power launched from all of the sources, yields an estimate of the radiance transmitted into any direction i due to a unit-power array of sources.

Note that the N-by-N matrix $(T_{ij}^{(a,b)}/T_j^{(a,b)})$ can be determined from the corresponding cumulative transmissivity matrix $\underline{\hat{\tilde{T}}}^{(a,b)}$ by simple discrete differentiation:

$$(T_{ij}^{(a,b)}/T_j^{(a,b)}) = \hat{\tilde{T}}_{ij}^{(a,b)} - \hat{\tilde{T}}_{i-1,j}^{(a,b)}$$

where again we assume $\hat{\tilde{T}}_{0j}^{(a,b)} = 0$ for all $1 \leq j \leq N$.

Thus, the simulation system 60 can calculate the radiance transmitted by the output face of a backlight that is lit by a unit-power array of sources by:

(1) determining the sense of incidence upon the partially-transmissive face as either above or below, depending upon the sign of $\hat{n}$—above if $\hat{n}$ points into the cavity, and below if $\hat{n}$ points out;

(2) differentiating $\underline{\hat{\tilde{T}}}^{(a)}$ or $\underline{\hat{\tilde{T}}}^{(b)}$ to obtain $\hat{T}_{ij}^{(a,b)} = \hat{\tilde{T}}_{ij}^{(a,b)} - \hat{\tilde{T}}_{i-1,j}^{(a,b)}$ for all $1 \leq i \leq N$ and $1 \leq j \leq N$;

(3) scaling each vector of accumulated incidence by dividing every component of each vector by the product of the area of the subject pixel (usually the same for all pixels), the area within the unit circle of each cell of the angular basis ($\pi/N$ for our standard basis), and the total power launched from all of the sources; and (4) left-multiplying the resulting scaled vector of accumulated incidence by $\hat{\underline{\underline{T}}}$ to obtain the vector of transmitted radiance $\hat{\imath}(k, l)$ within the k, lth pixel:

$$\hat{\imath}(k, l) = \underline{\hat{\tilde{T}}}^{(a,b)} \left( \underline{t}(k, l) \bigg/ \left( A_{pixel} \frac{\pi}{N} P_{tot} \right) \right).$$

Steps (2) through (4) are accelerated by application of basic linear algebra subprogram ("BLAS") routines to perform the required linear-algebraic operations.

Virtual Display

An observation of the partially-transmissive face of a backlight, made from any point exterior to the cavity by a sensor whose spatial resolution on the face is less than or equal to the area of a pixel, will 'measure' the local radiance transmitted through the face along the direction of the observation point relative to the point of emission. The representation used herein of the transmitted radiance is provided by the vectors $\hat{t}(k, l)$. In terms of these, the radiance sensed at observation point $\vec{r}_0$ emanating from the k, lth pixel centered at $\vec{r}_{kl}$ is $\hat{t}_i(k, l)$, where $$\hat{s} = \frac{\vec{r}_o - \vec{r}_{kl}}{|\vec{r}_o - \vec{r}_{kl}|}$$

$$s_h = \hat{s} - (\hat{s} \cdot \hat{n})\hat{n}$$

$$i' = \frac{|s_h|^2}{N'} + 1$$

$$i'' = \frac{\frac{180}{\pi}\text{Imln}(s_h \cdot \hat{u} + is_h \cdot \hat{v}) + 180}{360/N''} + 1$$

$$i = (i' - 1)N'' + i''$$

for our standard angular basis and our standard ordering of basis-function indices. Here $\hat{n}$ denotes a unit normal to the output face. If these values are displayed (represented by, for example, false color) within each pixel on a grid depicting the boundary of each pixel as viewed from $\vec{r}_0$, a rendering of the 'appearance' of the partially-transmissive face viewed from $\vec{r}_0$ is obtained. Since this display technique relies only upon the retrieval or 'lookup' of already-calculated values of $\hat{t}^i(k, l)$, it can be repeated almost instantaneously for changing values of $\vec{r}_0$. By considering a user-supplied series of contiguous $\vec{r}_0$ values in turn, the (changing) appearance of the output face as the observer moves about the backlight (or as the backlight is moved with the observer fixed) can be displayed in rapid succession with no significant time delay between adjacent positions, i.e., essentially in real time. We denote such a series of images as a 'virtual display'.

Such a virtual display can form the basis of a method of selling or promoting optical films, light sources, or any other component of a backlight including an entire backlight system. In one approach, a user interface is provided, for example on a website accessible through a network such as the internet, for access to potential customers or users of optical films or other products. The user interface may include a menu of available optical films (e.g., brightness enhancing prismatic films, reflective polarizing films, turning films, diffusing films, and the like) from which the customer can select. The user interface may also include software to permit the customer to specify a backlight construction, e.g., light source(s), cavity dimensions, and so forth. Preferably, the software employs the BSDF simulation methodology disclosed herein to rapidly calculate and simulate the output of the customer-specified backlight. The user interface can also include a tool to permit the customer to specify and change the viewing geometry of the backlight, providing a graphic representation virtually in real time of the appearance of the backlight. We also contemplate using the BSDF simulation methodology within an optimization tool, where the user may specify a parameter to be minimized or maximized (such as backlight gain, uniformity, color, deviation from uniformity, at specified viewing geometries) and then cycle through different backlight system configurations to arrive at an optimized backlight design.

Our simulated representation of the transmitted radiance is discretized, both by pixelizing the output face (one vector $\hat{t}$ for each pixel), and by partitioning the unit hemisphere (one component of $\hat{t}$ for each angular-basis cell). In most circumstances, the pixelization and the angular partitioning will be more coarse than those of a real sensor, such as a human eye or a digital camera. The impact upon a virtual display is to create a spatially-discretized image, which is blurred within pixels relative to that sensed, and which exhibits artificial discontinuities between pixels. Similarly, a series of images for continuously-varying $\vec{r}_0$ may be blurred image-to-image within discrete domains, and exhibit discontinuities between domains. These artifacts, although sometimes visually annoying, pose a serious limitation only when the actual backlight being simulated possesses critical features of spatial or directional non-uniformity on scales smaller than a pixel or an angular-basis cell, respectively. In these circumstances, remedies may include finer pixelization (which may require more exit rays) and/or finer angular resolution (which demands re-calculation of BSDFs, and may require software modification). The 1200 cell angular basis described above, and an output surface pixelization of approximately 10,000 pixels, are believed to produce acceptable results for most practical backlight designs. Since the evolution of backlight designs generally moves away from spatial and directional non-uniformities and towards more uniform behavior, we can reasonably anticipate that such discretization in position and direction will continue to be acceptable.

SIMULATION EXAMPLES

We begin with a discussion of gain, or gain enhancement. The 'gain' of a film or film stack is an empirical characteristic defined herein as the ratio of the brightness observed along a direction $\hat{s}$ with and without the subject film or stack applied upon a standard uniform and approximately Lambertian-emitting and reflecting surface. This ratio, and its dependence upon $\hat{s}$, is the 'angular distribution of gain' of the film or stack.

One possible standard emitting surface is the top surface of a device referred to herein as a 'gain cube'. The gain cube is a cube whose side dimension is about 5 inches, constructed of 16-mm thick side panels and 6.7-mm thick top and bottom panels composed of diffuse white Teflon™ material. It is illuminated by a 6-mm diameter fiber bundle that protrudes into the cube through the bottom panel, terminating about 4 inches below, and directed toward, the top panel. The fiber bundle is illuminated by a standard halogen light source. The angular-dependent emission through the top panel of the gain cube is measured in a darkened room by a conoscope manufactured by Autronic-Melchers GmbH. The conoscope measures the brightness along directions on a partial hemisphere extending from normal to within 10 degrees of grazing, and responds to the average brightness emitted from the surface within an approximately 2-mm footprint. The angular distribution is measured without, and then with, the film or stack present, and the ratio is formed to determine the gain.

The gain cube is constructed so that the measured gain of a film or stack indicates, in many circumstances, the brightness enhancement (or degradation) experienced when the film or stack is applied to the partially-transmissive face of a typical backlight.

If $\underline{I}$ denotes an N-component column vector whose components are the brightness emitted by the gain cube, averaged over each of the N cells of our angular basis, and $\underline{R}^{(a)}$ denotes the matrix representation in our angular basis of the BRDF of the gain cube for incidence from above, then:

$$\underline{I}_1 = \underline{T}^{(b)}(1-\underline{R}^{(a)}\underline{R}^{(b)})^{-1}\underline{I}_0.$$

Here $\underline{I}_0$ denotes $\underline{I}$ without the film or stack present, $\underline{I}_1$ denotes $\underline{I}$ with the film or stack present, and $\underline{R}^{(b)}$ and $\underline{T}^{(b)}$ are the matrix representations of the BSDF of the film or stack for incidence from below. The vector describing the angular distribution of gain is that whose components are the ratio of the components of $\underline{I}_1$ and $\underline{I}_0$. Thus, given $\underline{I}_0$ and $\underline{R}^{(a)}$ (characteristics of the gain cube), the angular distribution of gain can be deduced from $\underline{R}^{(b)}$ and $\underline{T}^{(b)}$ (characteristics of the film or stack).

$\underline{I}_0$ may be measured directly in the course of nearly any experimental gain determination. $\underline{R}^{(a)}$ can be estimated, using the known composition of the gain cube plate, measurements of its reflectivity, $\underline{I}_0$ itself, and ultimately the correspondence between predicted and measured gains to guide our assumptions. We model the top plate of the gain cube as a g=0.950, ω=1, τ=400 scattering layer within a n=1.20 host, and calculate its BSDF utilizing the same methods as applied earlier to the Sharp diffuser. $\underline{R}^{(a)}$ is the reflective component of this BSDF for incidence from above.

Our model results in (1) a predicted transmitted radiance for Lambertian incidence that closely matches the observed angular distribution of $\underline{I}_0$, (2) predicted total reflectivities for both normal and Lambertian incidence that exceed measured values by several percent, and (3) generally good correspondence between predicted and measured gains. Here, item (1) is expected because we can anticipate near-Lambertian incidence everywhere within the highly-recycling gain cube cavity. Item (2) can be explained by the same experimental bias observed for the 2-mm Sharp diffuser. Item (3) provides a test of the fidelity of our estimate.

Although unusually low relative to other polymers, the refractive index of Teflon™ material is significantly larger than the value n=1.20 assumed for the host. The preference for a diminished index might represent compensation for an unmodelled effect (such as random roughness of the host-air interface), or, compensation for inaccuracies in other parameter values. As for the Sharp diffuser, the determination of the BSDF of the gain cube panel will benefit from more accurate and exhaustive material and optical characterizations.

FIG. 11A depicts the angular distribution of gain predicted for a simulated film stack having the Sharp diffuser underlying and separated by an air gap from a single sheet of points-up Vikuiti™ brand BEF-II 90/50. This result was determined by combining the BSDFs of the individual components, these having been calculated as described earlier, so as to determine $\underline{R}^{(b)}$ and $\underline{T}^{(b)}$ of the stack, and then calculating $\underline{I}_1$ and the vector of gains according to the method described above. False color in the form of a grey-scale is used to indicate the value of the gain, as a function of the horizontal projection of directions on the upwards unit hemisphere into the horizontal plane. Distinct values are indicated within each of the 1200 cells of our angular basis. A horizontal (dark grey) and vertical (light grey) reference axis is superimposed on the plot. These axes have a scale that is linear in sin(θ), ranging from zero in the center to one at the ends. The BEF is oriented such that the grooves run parallel to directions whose horizontal projections lie along the horizontal reference axis. FIG. 11B depicts the gain values of FIG. 11A along the horizontal and vertical reference axes, with the darker grey data in FIG. 11B corresponding to the gain along the horizontal reference axis, and the lighter grey data corresponding to the gain along the vertical reference axis. In cases where a dark grey datapoint has the same value as a light grey datapoint (e.g. for θ=0, where the horizontal reference axis intersects the vertical reference axis in FIG. 11A), only one bar is shown. The x-axis in FIG. 11B is linear in θ, rather than in sin(θ) as in FIG. 11A, and the labels along the x-axis of FIG. 11B should be interpreted as follows: the absolute value of the label is the polar angle θ, and negative numbers correspond to a shift in azimuthal angle φ of 180 degrees relative to the positive numbers.

FIG. 11C depicts the measured angular distribution of gain for the same film stack. Values are shown downsampled from the higher angular resolution of the conoscope onto our angular basis, and extrapolated from the edge of the measurement domain at 80 degrees out to grazing. The extrapolated values occupy a very thin annulus near the perimeter of the plot, and so do not significantly affect the perceived correspondence between the predicted and measured values. Reference axes are provided as in FIG. 11A, and the grey-scale shading used for FIG. 11C is identical to that used for FIG. 11A. Analogous to FIG. 11B, FIG. 11D depicts the gain values of FIG. 11C along the horizontal (dark grey) and vertical (light grey) reference axes through the unit-circle plot. The correspondence between the measured (FIG. 11D) and predicted (FIG. 11B) values is good.

FIGS. 12A-D depict the analogous comparison for the film stack obtained by adding a second sheet of points-up Vikuiti™ brand BEF-II 90/50 overlying and separated by an air gap from the first, oriented with its grooves parallel to directions whose horizontal projections lie along the vertical axis in the plot (and therefore perpendicular to the grooves in the lower BEF sheet). Note that the grey-scale is modified relative to that of FIGS. 11A and C, reflecting the established higher on-axis gain of this 'crossed-BEF' construction. Again, the correspondence between measured and predicted values is good.

Single LED Test Fixture

As a first example of a backlight simulation, we consider a simple test fixture constructed in order to validate the predictions of the simulation of a backlight system.

The interior of this test fixture is a 7-inch wide, 5-inch high, 0.83-inch deep hollow cavity. The cavity is illuminated by a single Luxeon-I red side-emitting LED protruding through a 8.3-mm diameter hole at the center of the bottom surface. The protrusion is such that the base of the LED encapsulant is coplanar with the bottom cavity surface, and the rotational symmetry axis of the encapsulant is normal to this surface. The bottom and four side walls of the cavity are completely covered with Vikuiti™ Enhanced Specular Reflector (ESR) visible-mirror multi-layer optical film, laminated to the interior surface of a diffuse white plastic that forms the cavity housing. The top of the cavity corresponds to the partially-transmissive output face of the backlight. In a first modeled configuration ("I"), a 1.5-mm thick plate of optical-quality glass atop the Sharp diffuser is disposed at the output face. In a second configuration ("II") a sheet of BEF-II 90/50 oriented with its grooves parallel to the long axis of the face is embedded between (but not in optical contact with) the diffuser and the glass, and in a third configuration ("III") a second sheet of BEF oriented with its grooves parallel to the short axis is also included, overlying the first sheet of BEF. Thus, the fixture allows testing of at least three output faces possessing varying degrees of gain. The glass plate is included to hold the sheets of BEF flat; it is retained even without these sheets for consistency.

Figure 13A:
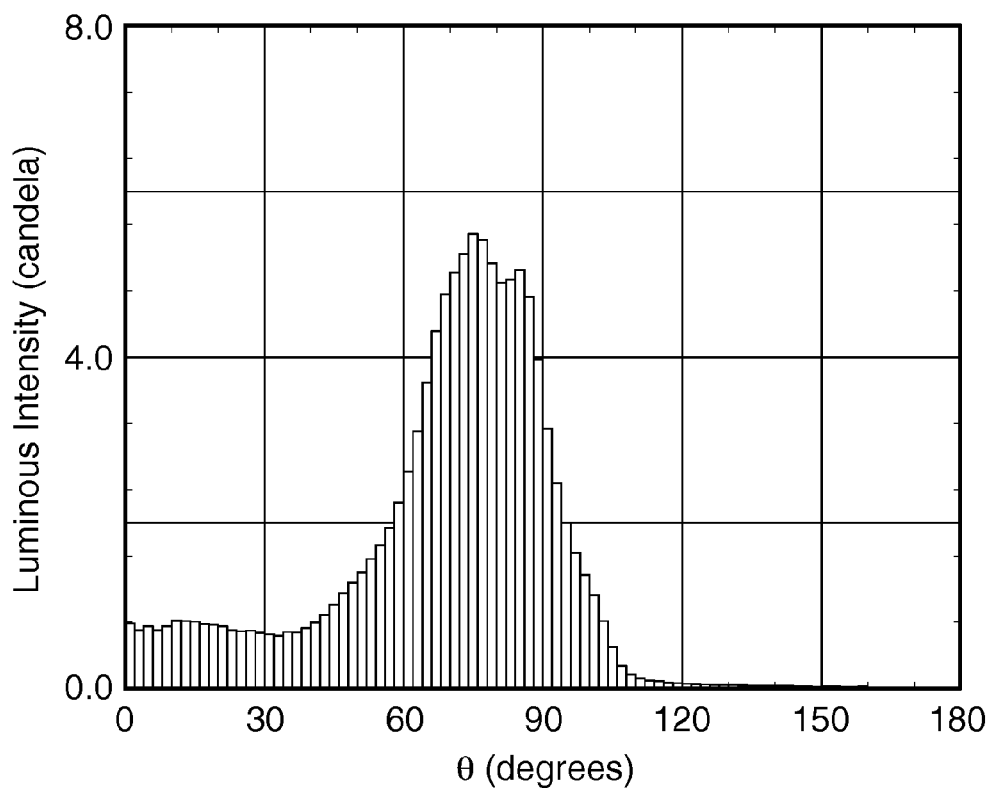
FIG. 13A is a plot of a measured emission pattern of aside-emitting LED.
Figure 13B:
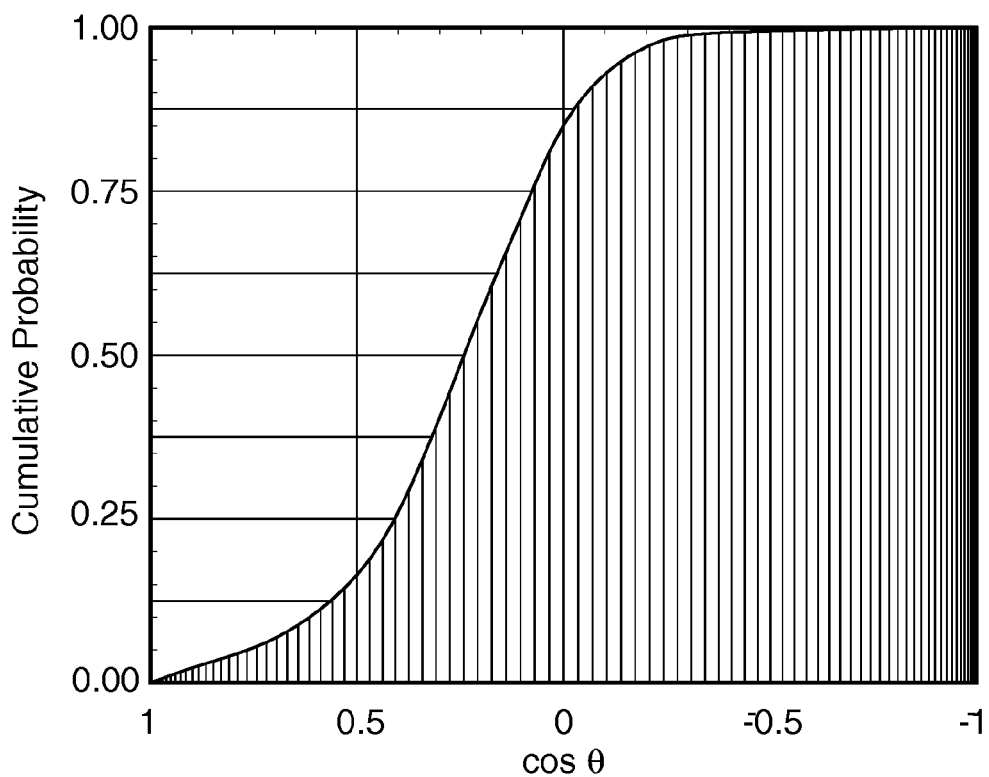
FIG. 13B is the cumulative distribution of emission for the emission pattern of FIG. 13A.
Figure 16A:
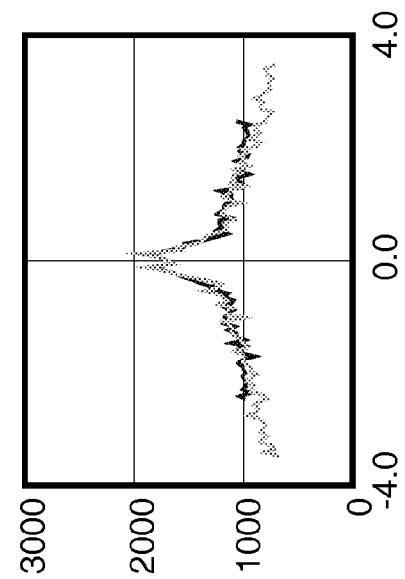
FIGS. 16A and C are grayscale plots of predicted (16A) and measured (16C) images for a backlight containing the diffuser plate in combination with one sheet of BEF prismatic film, at normal viewing.
Figure 16B:
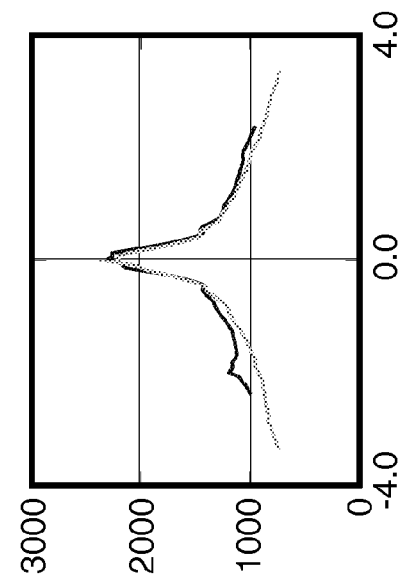
FIGS. 16B and 16D are analogous to FIGS. 14B and 14D.
Figure 16C:
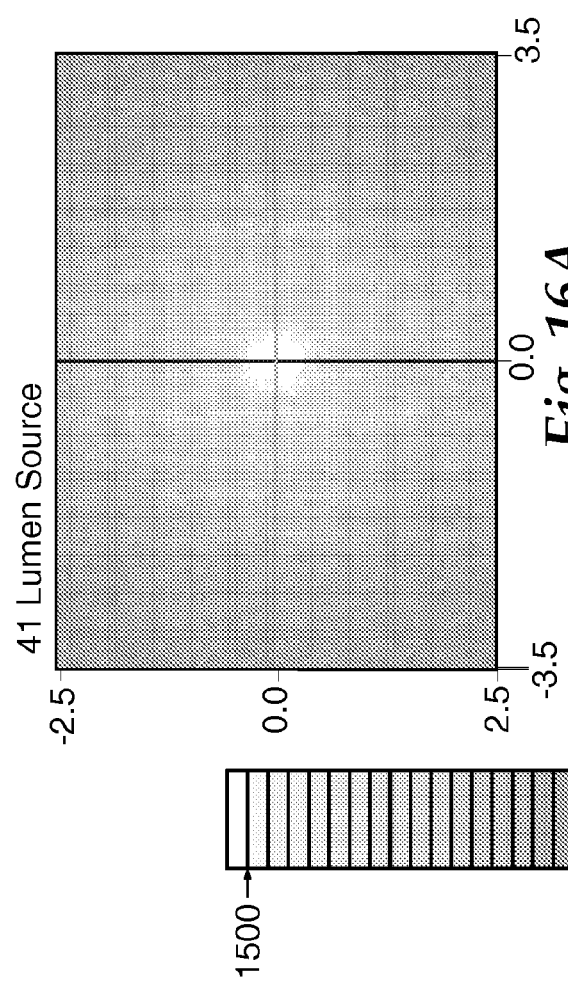
Figure 16D:
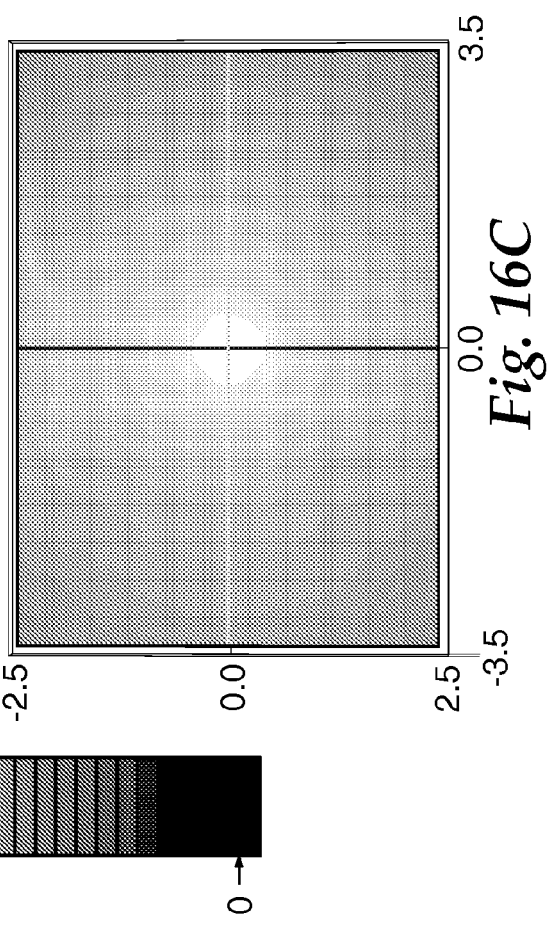

The emission pattern of the Luxeon-I red side emitter was measured. The results indicate a luminous intensity (lumens per unit solid angle) in a direction s at positions far removed from the device that is nearly independent of the azimuthal orientation of s relative to z coincident with the rotational symmetry axis of the encapsulant (and upward normal to the plane of the epilayers), but which varies substantially with the polar angle $\theta=\cos^{-1}(\hat{s}\cdot\hat{z})$, attaining its maximum value near $\theta=75°$. Averaging measured values within 2-degree bins of $\theta$ results in the histogram representation of the polar-angle dependence depicted in FIG. 13A. The cumulative probability distribution of this histogram, depicted with cos $\theta$ as the ordinate, is shown in FIG. 13B. We simulate the emission of the Luxeon-I device by an ensemble of unit-power rays launched from a common point. The cosine of the polar angle of each ray is selected by numerically inverting the piecewise-linear cumulative distribution for a uniform random value of the cumulative probability between 0 and 1. The azimuth is selected as a statistically-independent uniform random value between 0 and $2\pi$. Rays are launched from a point centered within the encapsulant, approximately 1.6 mm above the bottom surface of the cavity.

The BSDFs of the four side walls and that of most of the bottom surface are that of ESR laminated to diffuse white plastic. ESR is composed of many, order 100-nm thick, alternating layers of uniaxial birefringent PEN and isotropic PMMA sandwiched between approximately 5-μm thick PEN skins. The precise layer thicknesses provide a high reflectivity substantially independent of incidence angle and wavelength throughout the visible spectrum. Given the layer thicknesses and the material indices and absorptivities, we calculate the reflectivity and transmissivity for arbitrary angles of incidence and wavelength, and for incidence from within and transmission into any isotropic media, using a method as disclosed in Berreman, D.W., Optics in Stratified and Anisotropic Media; 4×4-Matrix Formulation, J. Opt. Soc. Am. 62, 502-510 (1972). Reflectivities so determined using target design thicknesses usually mildly exceed those measured for manufactured product. We may compensate for this by adhering a non-scattering attenuating layer of optical thickness $\tau=0.005$, embedded within and index matched to the incident and transmitted media. One may alternatively explicitly model the impact of random variations in layer thickness and material index associated with actual product variability.

The matrix BSDF of ESR embedded between upper and lower media of indices $n_a$ and $n_b$, respectively, is identical in form to that of a Fresnel interface between media of the same indices. Only the values of the non-zero elements are changed, by replacing Fresnel reflectivities and transmissivities with those of the stack. For monochromatic light, the integrals in the prescribed averages over incidence angle undulate due to alternating constructive and destructive interference within the thick skins. These are artifacts for any real system of either finite bandwidth or variable skin thickness. We remove them by averaging over a 10-nm bandwidth before integrating over incidence angle to calculate the matrix elements.

Designating the interior of the cavity as 'below' and the exterior as 'above', the wall and bottom surface constructions have (1) a non-scattering attenuating layer of optical thickness $\tau=0.005$ within a medium of index n=1.00, underlying (2) an ESR stack between media of indices $n_b=1.00$ and $n_a=1.50$, underlying (3) a non-scattering attenuating layer of optical thickness $\tau=0.005$ within a medium of index n=1.50, underlying (4) a scattering layer of g=0.900, ω=0.9999, and $\tau=4000$ within a host of index n=1.50, underlying (5) a Fresnel interface between media of indices $n_b=1.50$ and $n_a=1.00$. We model the diffuse white plastic as a g=0.900, ω=0.9999, and $\tau=4000$ scattering layer within an index n=1.50 host. This specification is largely arbitrary, but also largely immaterial to the reflective characteristics of the overall wall construction, since the transmissivity of ESR is typically one percent or less. The matrix BSDFs of the five optical-path components are combined to determine the BSDF of the wall construction. Of the four components of the resultant BSDF, only the reflectivity from below $\underline{R}^{(b)}$ is relevant to and needed for the backlight simulation. Within the context of our point-source LED model, we assume a bottom surface that is perfectly absorbing within the diameter of the hole through which the LED protrudes. (For better accuracy, one may account in detail for the structure and reflective and transmissive properties of the actual device.) Thus, all rays that strike the bottom surface within the hole are terminated in the simulation. The BSDFs of the three candidate output face constructions have been described above, except that here each incorporates a 1.5-mm glass plate as the outermost component, not in optical contact with the underlying components. Thus, the BSDFs of the constructions described previously are combined with those of an optical path having (1) a Fresnel interface between media of indices $n_b=1.00$ and $n_a=1.50$, underlying (2) a non-scattering attenuating layer of optical thickness $\tau=0.018$, underlying (3) a Fresnel interface between media of indices $n_b=1.50$ and $n_a=1.00$. Including the glass plate only mildly affects the transmitted radiance except very near grazing viewing, where it substantially reduces the observed radiance due to a low transmissivity of the air-glass interface near grazing incidence. Of the four components of the output face BSDF, only $\underline{R}^{(b)}$ is needed to complete the ray trace within the cavity to determine the vector of accumulated incidence within each pixel. The transmissivity from below $\underline{T}^{(b)}$ is additionally needed to calculate the vectors of transmitted radiance from those of accumulated incidence. The pixelation of the face is selected to yield as close as possible to, without exceeding, 10,000 approximately-square pixels. For the 5-by-7 inch output face this is accomplished by an 85-by-117 array.

The ray-trace simulations are conducted using a threshold power equal to one-hundredth of the initial power in each ray. Source rays are launched until the accumulated number of exit rays exceeds 10 million. Exit rays are developed at a rate of approximately 1.25 million per minute on a commercially available Silicon Graphics Octane workstation. Thus, each simulation is completed in less than 10 minutes. On average, there is but one exit ray for each component of the approximately 10,000 1200-component vectors of accumulated incidence, so that these vectors exhibit a high degree of statistical noise. However, for each of the output face constructions considered, the rows of $\underline{T}^{(b)}$ possess many non-zero components, so that the components of the vectors of transmitted radiance, being equal to weighted averages of those of accumulated incidence, exhibit far less statistical noise. Our predicted images will show that the residual noise in the transmitted radiance associated with 10 million exit rays does not obscure any critical feature of the brightness and uniformity of the face.

Diffuser Plate

FIG. 14A depicts the predicted brightness of the test fixture at normal viewing for configuration I. FIG. 14C depicts the brightness measured for this configuration by a ProMetric CCD camera. The predicted or simulated (FIG. 14A) and measured (FIG. 14C) images are depicted on a common grey scale, shown on the left of the figures. We allow saturation of our grey scale within and about the 'hot spot' at the center of the image to preserve sufficient dynamic range to discern variations in brightness throughout the remainder of the image. The physical scales (−3.5 to +3.5 inches in width, −2.5 to +2.5 inches in height) of FIGS. 14A and 14C are also the same, but the measured image does not extend all the way to the edges due to measurement limitations. FIG. 14B plots the brightness values along centrally disposed horizontal (light grey) and vertical (dark grey) reference axes superimposed on FIG. 14A, with the dark/light curve in FIG. 14B corresponding to the dark/light grey reference axis respectively in FIG. 14A, and FIG. 14D does likewise for FIG. 14C. The units of the brightness values indicated are nits (lumens/m$^2$/sr).

The measured image was acquired with the LED drive current maintained at 350 mA, which produces an actual luminous flux, as measured by an Optronics OL-770 integrating sphere, of 40 lumens. The predicted image corresponds to an LED luminous flux (total lumens emitted) equal to 46 lumens. (An initial predicted image was simulated assuming a 1-lumen source, and the result was scaled by 46 to obtain that depicted in FIG. 14A.) The value 46 is selected so that the average brightness of the predicted and measured images is the same. The modest discrepancy between the actual flux and that required to match mean brightnesses is discussed below. The scale factor 46, rather than 40, minimizes distractions to the comparison of predicted and measured spatial variations in brightness.

Other than the central "hot spot", the primary feature is a gradual darkening with increasing distance from the center. Although difficult to discern quantitatively in grey scale, this feature is reproduced remarkably well in the predicted image. (False-color rendering in full color better elucidates minor variations in brightness, and predicted and measured false-color images are remarkably similar.) The close correspondence is more easily seen by comparing the brightness values depicted along the horizontal and vertical reference axes. Except near zero, the predicted and measured values are very similar.

Within the hot spot, the measured brightness exhibits a slightly-narrower peak and a significantly-higher peak value than the predicted brightness. This is an artifact of the finite resolution of the angular basis used to resolve the BSDF of the output face. The matrix BSDF responds to the average radiance within each cell, and so errs if the incident radiance varies substantially within a cell. While once or multiply-reflected and/or scattered 'diffuse' light usually does not vary so, 'direct-path' incidence, which arrives without any intermediate reflection or scattering events, can. Diffuse incidence exceeds direct-path over most of the face except within the hot spot, where the direct-path incidence is strongest. Thus, within the hot spot, the BSDF 'sees' a blurred 'image' of the source. Hence, there is a broader shallower peak. Despite the model's failure to predict the exact extent and peak brightness of the hot spot, it does correctly indicate the existence of a hot spot. For this construction, both measurement and simulation correctly identify a uniformity that is clearly inadequate for any commercial backlight. Further, features in a backlight that favor a more uniform brightness are also those that yield better agreement between modeling and observation. Thus, our discretized simulation can correctly identify severe non-uniformity in unacceptable designs, and can more accurately quantify brightness and residual non-uniformity in acceptable ones.

A significant advantage is the ability to rapidly calculate the brightness and uniformity of the face when viewed from any perspective using a single set of vectors of accumulated incidence. FIG. 15A depicts the predicted brightness of the configuration I test fixture when viewed 65 degrees off normal in a plane parallel to the long axis of the output face. FIG. 15C depicts the brightness measured by the ProMetric camera from nominally the same perspective, as explained further below. (Note the relative rotation of FIGS. 15A and C relative to FIGS. 14A and C, whereby the dark grey reference axis, for example, is parallel to the long axis of the output face in the former figures, but parallel to the short axis of the same output face in the latter figures.) The luminous flux of the source required to match the mean brightness of the measured image with that of the predicted image within the aperture of the measurement is 38 lumens. Analogous to the relationship between FIGS. 14A and B, FIG. 15B depicts the brightness values of FIG. 15A along the superimposed vertical (dark grey) and horizontal (light grey) reference axes. Likewise, FIG. 15D depicts the brightness values of FIG. 15C along the reference axes.

The view angle used for the measured brightness of FIG. 15C was roughly 60 degrees, but the precision of that angle was unknown within several degrees of arc. Given that uncertainty, we assumed the actual angle was 65 degrees because that angle produced a simulated image having slightly better correspondence with the measured image. For subsequent cases, the predicted brightness varies rapidly with view angle, and the adjustment of the experimental angle by just a few degrees substantially improves the correspondence.

The images exhibit an overall reduction in brightness relative to those for normal viewing, as seen in the compressed grey-scale and brightness axes. The primary feature besides the central hot spot is a general brightening between the center and the edge of the output face proximate the observer, producing an asymmetric brightness about the center along the vertical (dark grey) axis. A shift of the peak brightness toward the observer accompanies this asymmetry. The brightness along the horizontal (light grey) axis is symmetric and comparable to that along the vertical axis 'behind' the center. Each of these features of the measurement is reasonably well reproduced in the predicted image. The primary discrepancy again concerns the peak brightness within the hot spot, and in this circumstance also its precise location relative to the center. Both are artifacts of the angular basis. As one moves from the center toward the observer along the vertical reference axis, the direct-path contribution to the vector of accumulated incidence migrates in discrete steps from cells near normal to cells near grazing, generally decreasing (due to a monotonically-decreasing direct-path irradiance), but occasionally locally increasing (due to a decreasing angular subtense of the cell over which the radiance is averaged). Meanwhile, the coupling between the illuminated cell and the transmitted cell probed by the experiment increases until the illuminated and transmitted cells coincide, and subsequently decreases. Without the effect of changing cell subtense, the transmitted radiance would monotonically increase and then decrease, albeit over a broader domain and attaining a smaller peak value than reality because of the finite subtense of each cell. With the effects of changing subtense, the transmitted radiance may undulate about this form, potentially shifting the location of the peak. One such undulation can be seen in the dark grey curve of FIG. 15B.

Diffuser Plate With BEF

FIGS. 16A-D (normal angle viewing) and 17A-D (65 degree off-normal viewing) are analogous to FIGS. 14A-D and 15A-D respectively, but for the test fixture in configuration II.

Comparison of FIGS. 14 and 16 illustrates the approximately 50-percent brightness enhancement afforded by a single sheet of BEF for on-axis viewing. Note that this enhancement is not realized within the hot spot—the peak brightness seen in FIGS. 16B and D is comparable to that of FIGS. 14B and D. The enhanced brightness close to the hot spot however effectively broadens the hot spot, reducing its sharpness. Such sharpness reductions again reduce the effect in the predicted image, relative to measurement, of any artificial reduction in peakedness engendered by the finite resolution of the angular basis used in the simulation. Overall, the predicted and measured images are in better agreement for configuration II than for configuration I.

This behavior is well understood. Brightness enhancement by the configuration I construction relies upon near-Lambertian incidence within the cavity. The transmission toward normal for alternate distributions of incidence may be greater or less than that for Lambertian incidence, resulting in an other-than 50-percent gain. In particular, the transmission for near-normal incidence is low due to two-dimensional cube-corner reflections from the BEF prisms. Away from the hot spot the incidence is dominated by diffuse contributions, which are approximately Lambertian. Within the hot spot it is dominated by direct-path incidence, which is strongly peaked near normal.

The image brightness is dramatically reduced when viewed 65 degrees off normal (FIG. 17). The near six-fold reduction in the Sharp diffuser-plus-BEF gain (at 65 degrees normal to the grooves, relative to normal—see FIG. 11) is responsible. The measured image now exhibits hot spots other than that expected near the center along the vertical axis. These are not present in the predicted image, and violate fundamental symmetry rules dictated by the construction of the test fixture. We attribute them to experimental 'clutter' (e.g., background light reflected from the output face), and discount them from further consideration. The main features of the predicted and measured images are similar to those for the configuration I of FIG. 15, and agreement between predicted and measured is about the same. FIG. 11 demonstrate how the gain of the Sharp diffuser-plus-BEF construction along directions whose horizontal projections are parallel to the grooves in the BEF is approximately constant between 90 and 60 degrees, but rises precipitously for angles less than or equal to 60. In the experiments, the test fixture and the camera are separated by approximately 8 feet, so that the local view angle varies by as much as 2 degrees over the output face. At a nominal 60° angle, about half of the pixels are within the domain of precipitous rise in gain, and the modeled luminous flux of the source required to match the measured mean brightness is just 24 lumens. At a nominal 65° angle, all of the pixels are viewed within the domain of low and constant gain, and the required flux is 37 lumens, in much closer agreement with measurement. This is the basis for our decision to select 65, rather than 60, degrees as the correct view angle.

Diffuser Plate With Crossed BEF

FIGS. 18A-D (normal angle viewing) and 19A-D (60 degree viewing) are analogous to FIGS. 14A-D and 15A-D respectively, but for the test fixture in configuration III.

Comparison of FIGS. 14 and 18 illustrates the more than two-fold on-axis brightness enhancement afforded by crossed sheets of BEF. As before, this enhancement is not realized within the hot spot, but further broadens the hot spot even relative to a single sheet of BEF, bringing the predicted and measured images into closer agreement than the other backlight examples considered so far.

Figure 17B:
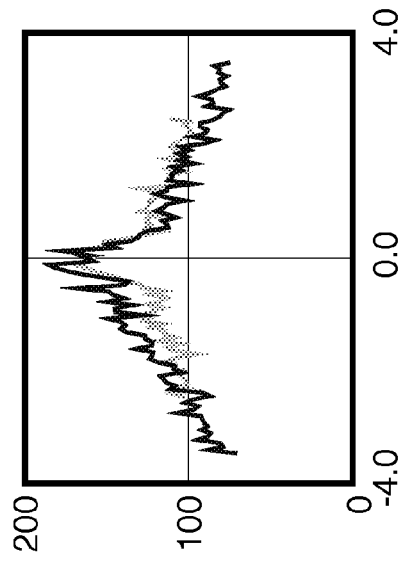
FIGS. 17A-D are analogous to FIGS. 16A-D, but for a viewing angle 65-degrees away from normal.
Figure 17D:
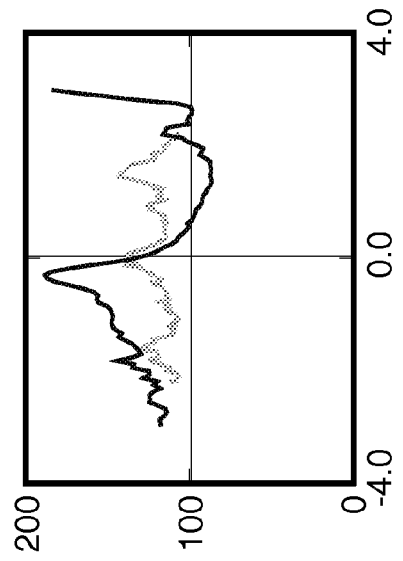
Figure 17A:
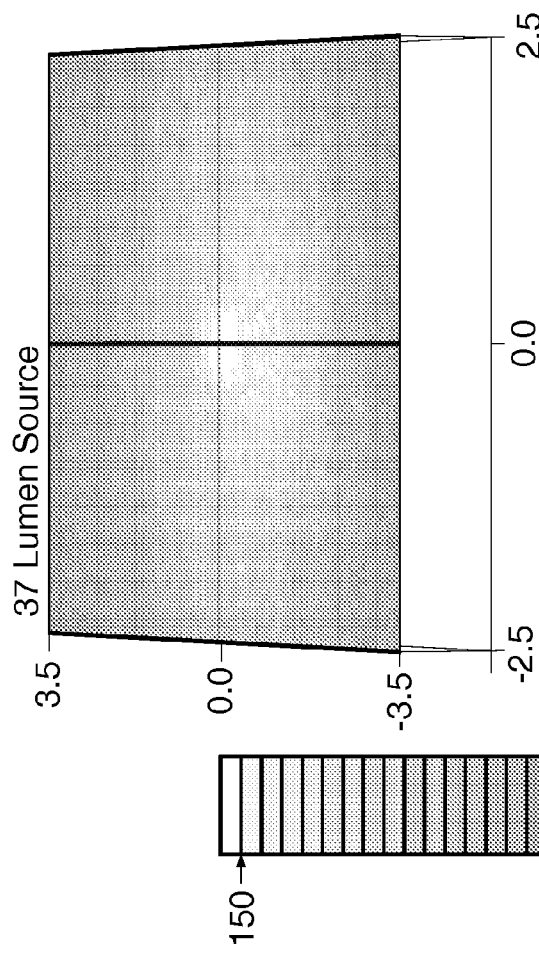
Figure 17C:
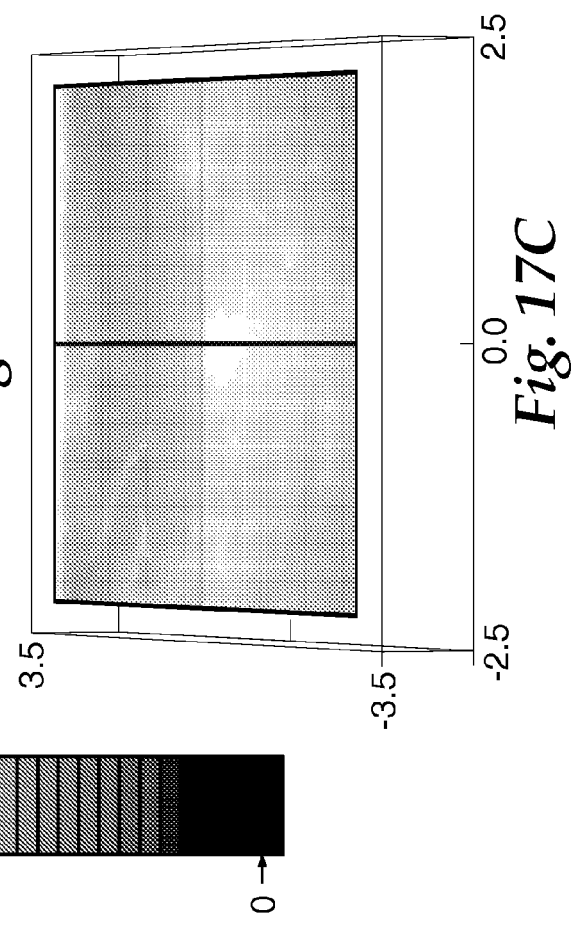
Figure 18B:
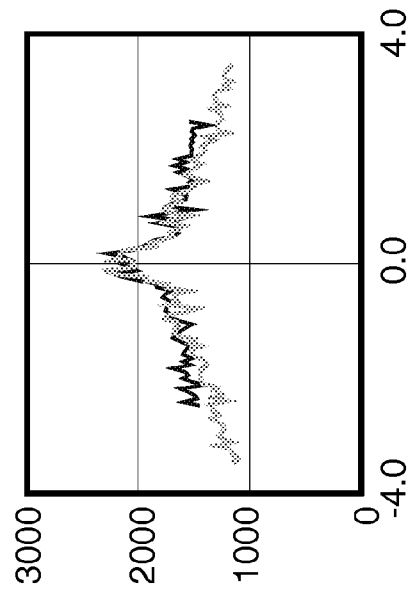
FIGS. 18A-D are analogous to FIGS. 16A-D, but where an additional sheet of BEF prismatic film has been added to the backlight in a crossed orientation to the first sheet of BEF prismatic film.
Figure 18D:
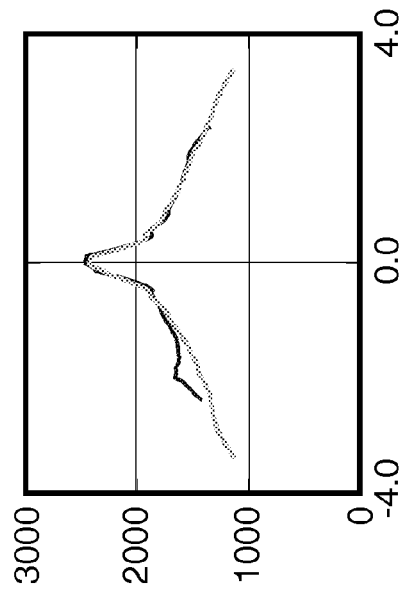
Figure 18A:
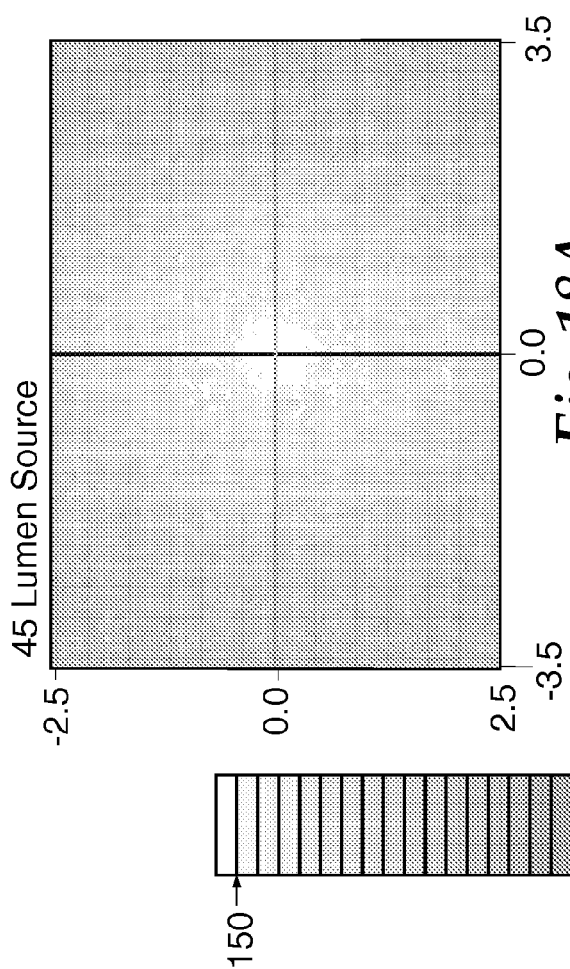
Figure 18C:
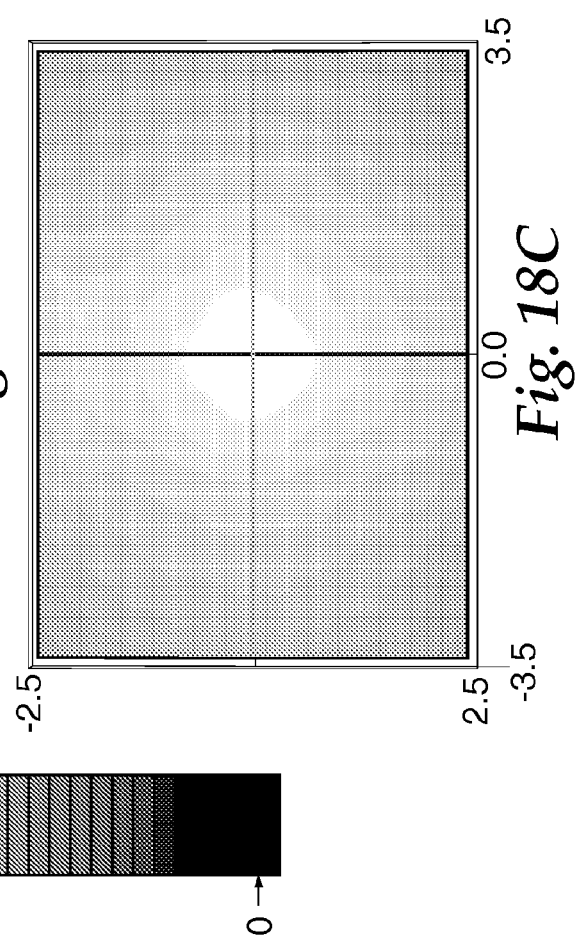
Figure 21A:
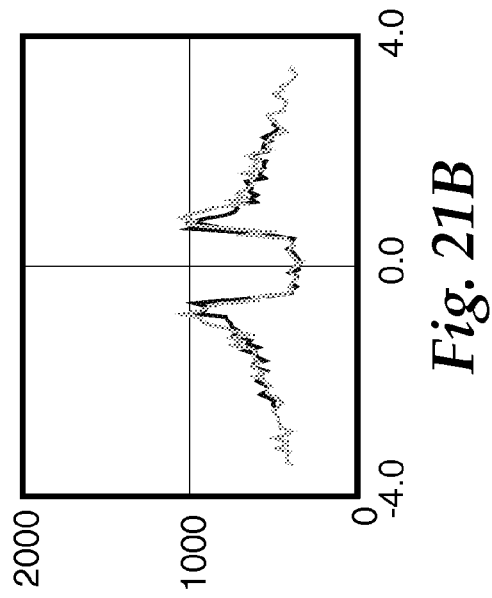
FIGS. 21A and C are grayscale plots of predicted (21A) and measured (21C) images of the test fixture at normal viewing for a backlight using the diffuser plate underlying glass with an internal ESR dot plate, when the dot plate is modelled as a perfectly specular surface.
Figure 21B:
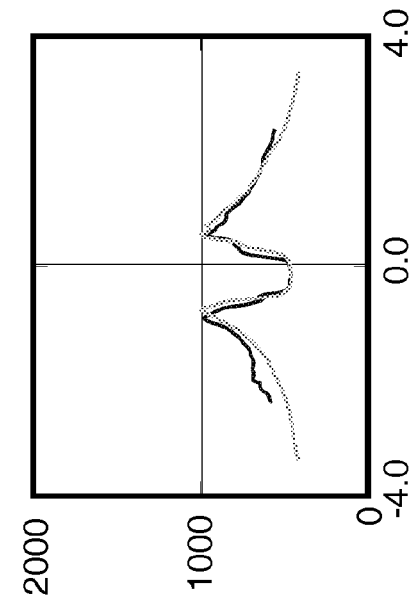
FIGS. 21B and D are analogous to FIGS. 14B and 14D.
Figure 21C:
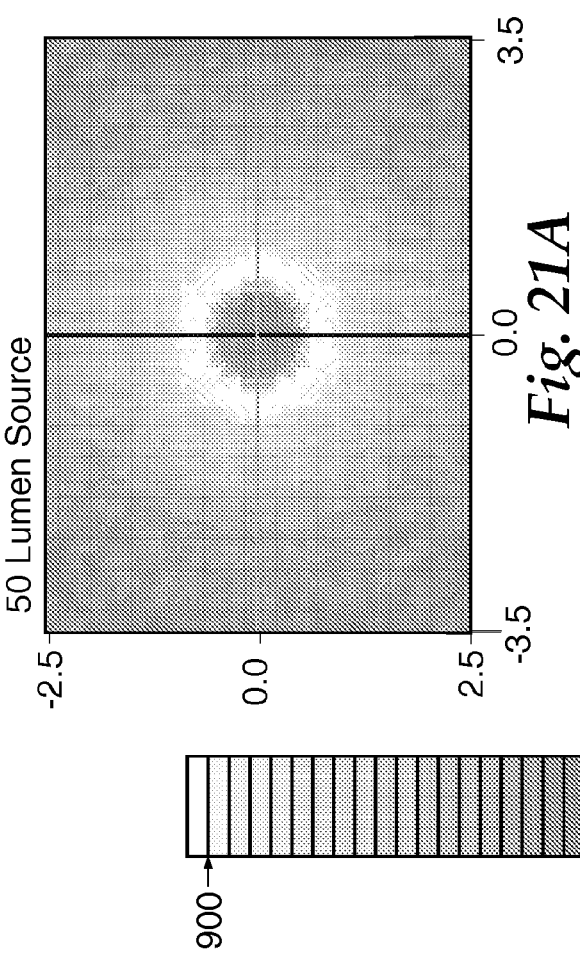
Figure 21D:
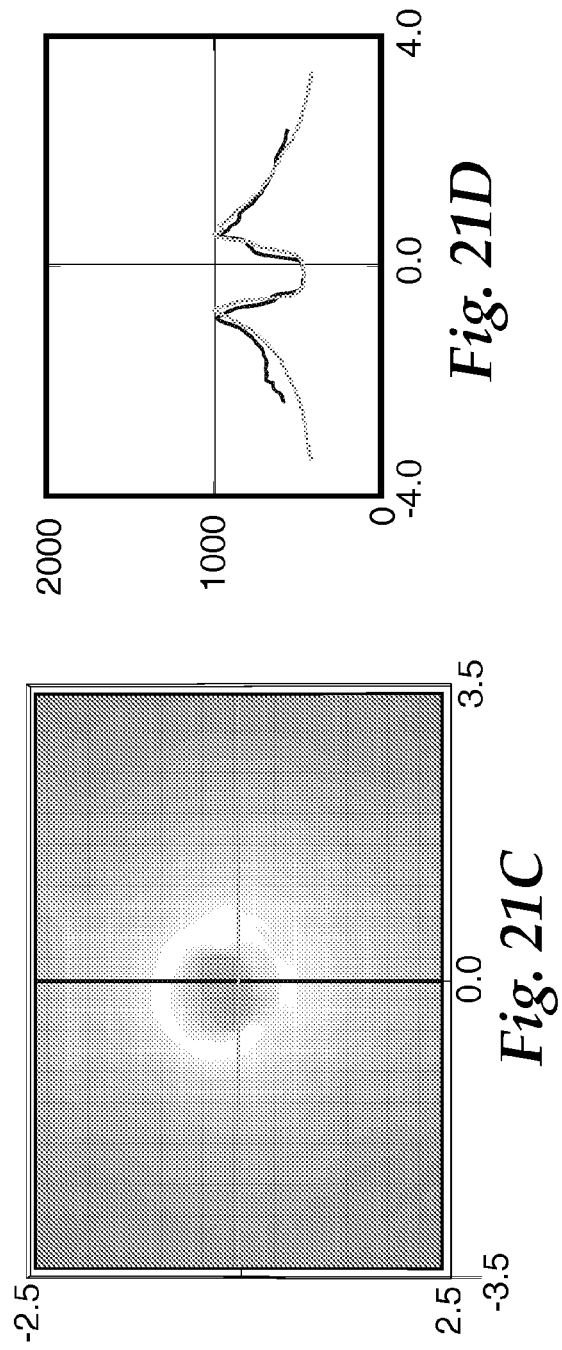

The brightness of the output face is dramatically reduced when viewed 60 degrees off axis (FIG. 19), but not to levels as low as those for a single sheet of BEF. The normal brightness is substantially higher for crossed BEF, and the reduction in gain at 60 degrees relative to normal is not quite so severe (compare the horizontal traces in FIGS. 11B and 12B). The clutter appearing in FIGS. 17C-D is absent in FIGS. 19C-D, possibly because the image brightness is sufficient to overcome any spurious background light.

The correspondence of the predicted and measured images at 60 degrees off axis is comparable to, for example, that for the Sharp diffuser in isolation. The peak brightness of the hot spot is slightly underpredicted, the width of the hot spot is overpredicted, and the location of the peak is imprecise in the predicted image. But the overall brightness levels are correct along both the horizontal and vertical reference axes, as is the asymmetry along the vertical axis which corresponds to darkening in the foreground of the image. The darkening in the predicted image occurs discontinuously across a horizontal line through the image. This is yet another artifact of the finite resolution of the angular basis—the local view angle along this line occurs at the boundary between contiguous cells in the angular basis. As with a single sheet of BEF, the gain of crossed BEF varies substantially with view angle near 60 degrees, but in a different manner, locally increasing at an increasing rate with increasing angle (see FIG. 12B). Assuming a 60° viewing angle, the luminous flux of the source required to match the actual mean image brightnesses is 48 lumens. This is significantly larger than the measured source brightness, but consistent with many of the values reported above for other images. The required source flux increases with decreasing nominal angle (53 lumens at 58°), and decreases with increasing angle (45 lumens at 62°).

Sharp Diffuser With Dot Plate

As a further modification of the test fixture, beyond those of simply altering the stack of components at the output face, we now return to the configuration I arrangement but then insert a horizontal plate within the cavity, oriented parallel to the output face and back wall and situated at an intermediate depth between these surfaces. The plate effectively divides the cavity into two subcavities separated by a surface whose reflective, transmissive, and scattering properties can be controlled by the incorporation of one or more films as components of the 'plate' construction. A single construction, uniform over the full extent of the plate might be considered, or more generally several different constructions, each extending over one of several different subdomains of the plate, the union of which define the plate in its entirety. The latter approach permits the creation of spatially-varying controlled reflection, transmission, and scattering which occurs in registration with the light source(s) in the cavity. Registered control provides a powerful design tool for affecting spatial variations in the brightness of the face in a desirable manner, such as enhancing brightness uniformity.

We consider specifically a 7-by-5 inch, 2-mm thick clear Plexiglass plate, onto whose bottom surface at the center is adhered with an adhesive a 6.4-mm diameter circular 'dot' of ESR film. The plate is situated so that its bottom surface is 5.5 mm above the back wall of the cavity, and thus 3.9 mm above the point at the center of the LED encapsulant from which source rays emanate. The perimeter of the ESR dot subtends a 39-degree angle at the source point, so that the dot casts a 32-mm diameter shadow on the face. Direct-path incidence is excluded within this shadow, so that we can expect no hot spot within 16 mm of the center of the output face. Of course, the mere elimination of direct-path incidence within a localized area does not ensure uniformity of the transmitted brightness over the entirety of the face, and we will show that the incorporation of this particular dot plate can create other non-uniformities, characterized by a dark shadow where the bright hot spot formerly resided.

Designating the lower subcavity as 'below', and the upper subcavity as 'above', the construction of the dot plate at distances greater than 3.2 mm from the center has (1) a Fresnel interface between media of indices $n_b=1.00$ and $n_a=1.50$, underlying (2) a non-scattering attenuating layer of optical thickness $\tau=0.006$, underlying (3) a Fresnel interface between media of indices $n_b=1.50$ and $n_a=1.00$. The assumed optical thickness of the 2-mm Plexiglass is derived from measured normal-incidence absorptivities of thicker Plexiglass sheets commonly used in the electric-sign industry. At distances less than 3.2 mm from the center, the plate has (1) a non-scattering attenuating layer of optical thickness $\tau=0.005$ within a medium of index n=1.00, underlying (2) an ESR stack between media of indices $n_b=1.00$ and $n_a=1.50$, underlying (3) a non-scattering attenuating layer of optical thickness $\tau=0.011$ within a medium of index n=1.50, underlying (4) a Fresnel interface between media of indices $n_b=1.50$ and $n_a=1.00$. The combined absorption within the phenomenological attenuating layer adhered to the upper surface of the ESR stack and the 2-mm layer of Plexiglass is represented by the $\tau=0.011$ attenuating layer. The matrix BSDFs of these optical-path components are combined to determine separate BSDFs for each of the two unique domains on the dot plate. Unlike the walls, rays may either reflect from or transmit through the dot plate. And unlike the output face, rays may be incident from either below or above. Thus, unlike the walls or the output face, all four components of these BSDFs $\underline{R}^{(b)}$, $\underline{T}^{(b)}$, $\underline{R}^{(a)}$, and $\underline{T}^{(a)}$) are required for the backlight simulation.

The ray-trace simulation for this backlight, "configuration IV", is again conducted using a threshold power equal to one-hundredth of the initial power in each ray, and source rays are again launched until the accumulated number of exit rays exceeds 10 million. But in this simulation, exit rays are developed at the slower rate of 0.50 million per minute, so that each simulation requires 20 minutes. The diminished rate is due to the increased average number of surface interactions between each encounter with the output face. In the absence of the dot plate, this is slightly greater than one—a single interaction with the back wall plus occasional multiple interactions involving the back and side walls. In the presence of the dot plate, this number is closer to three, usually two interactions with the dot plate and one with the back wall, plus occasional multiple interactions with these surfaces.

FIGS. 20A-D (normal angle viewing) are analogous to FIGS. 14A-D respectively, but for the configuration IV test fixture. Comparison of the measured image with that in FIGS. 14 demonstrates that the dot has the expected effect of eliminating the hot spot, but undesirably creates a dark spot in its place.

The simulated or predicted image exhibits two types of spatial brightness variations not present in the measured image. The first is a periodic azimuthal variation consisting of alternating bright and dark wedges each of 3-degrees subtense. The second is a non-periodic radial variation consisting of non-uniformly spaced bright and dark rings. Both are confined to the region exterior to the shadow of the ESR dot. These are artifacts of the finite resolution of the angular basis.

There is, in fact, no direct-path radiance incident upon the output face in the presence of the dot plate—all radiance reaching the face must pass through the plate. Nevertheless, radiance passing from the source to the face with only one interaction with the plate retains substantial direct-path character. It is exceptionally bright, exclusively radially directed, and independent of azimuthal position. But when, as in our simulation, interactions with the plate are described in a finite angular basis, this 'direct-path' radiance is no longer exclusively radial nor independent of azimuth. It is instead merely peaked in the radial direction, and invariant under a 360/N" (=6 degree) rotation. 'Dithering' of exit-ray directions within the selected exit cell is responsible. It follows that, at positions circularly disposed about the center of the face, the normally-transmitted radiance will be bright where an incident cell is azimuthally aligned with the peak in the direct-path radiance, and dark where the boundary between adjacent cells is so aligned, thus yielding the observed azimuthal variation. The spurious radial variations have similar origins, but a quantitative explanation is more difficult.

If such variations are unacceptable to the user, one remedy is to treat interactions with the dot plate in a manner different than that prescribed for general surfaces characterized solely by their BSDFs. Specifically, ray interactions with the dot plate are known to exactly preserve the horizontal components of the incidence direction. They also preserve the normal component upon transmission, and merely reverse its sign upon reflection. The simulation system 60 may therefore treat this surface as one that preserves incidence direction (with only a possible reversal of the normal component), without dithering. The result is depicted in FIGS. 21A-D, which are otherwise completely analogous to FIGS. 20A-D. Both the azimuthal and radial artifacts are gone, and the correspondence between simulation and measurement is now remarkably good.

Thus, it may be useful to preserve, in a general software implementation of the simulation system, the ability to treat selected surfaces by the traditional, rather than the BSDF, approach. Surfaces so selected may require a detailed description of their structure and composition, but in exchange will be handled in a manner unaffected by the resolution of the BSDF angular basis. In some cases, only surfaces that affect, yet substantially preserve, the direct-path component of the radiance may benefit from such traditional treatment. Such surfaces are likely to possess relatively simple, largely non-scattering constructions, such as the dot plate. The user may desire traditional treatment of surfaces in the simulation software only occasionally, and then only for a fraction of the internal surface area of the subject backlight. If so, the computational accelerations afforded by the BSDF approach will not be severely compromised.

Simulation Example

Source Fluxes

Table 1: Summary of source fluxes required to match predicted and measured mean image brightness.

| Construction | Normal | Off-Axis |
| --- | --- | --- |
| Sharp Diffuser (config. I) | 46 | 38 |
| Sharp Diffuser plus BEF (config. II) | 41 | 37 |
| Sharp Diffuser plus crossed BEF (config. III) | 45 | 48 |
| Sharp Diffuser plus Dot Plate (config. IV) | 48–50 | — |

Table 1 summarizes the source luminous-flux values required to match the mean brightness of the predicted image to that observed for each of the seven theoretical/experimental comparisons discussed above. Ideally, all of these values would be the same, and equal to the actual flux emitted by the source, which we estimate is 40 lumens. The actual values exhibit considerable scatter relative to this ideal. We have already noted the extreme sensitivity of the off-axis values to view angle, so that we can rationalize restricting our assessment of scatter to normal values only. These exhibit ±10-percent variations about their mean value of 45 lumens. Our measurement of the Luxeon-I flux was performed with the device approximately flush with the port of the integrating sphere. Emission into the outward-directed hemisphere may have been lost to the measurement, so that the actual flux might be as much as 15 percent greater than 40 lumens (c.f. FIG. 13B). Thus, a mean value of 45 is reasonable. The origins of the residual ±10-percent scatter are unknown. It may reflect experimental variability. For example, the output of an LED is known to depend critically upon both the instantaneous drive current and its history, the latter insofar as it affects the temperature of the device. While instantaneous values were carefully controlled during imaging, we have no detailed accounting of histories. Alternatively, it may reflect imprecise theoretical descriptions. While best efforts were extended to develop accurate characterizations of all components, imprecisions undoubtedly remain. The net effect of these must be expected to vary with backlight construction.

Any of the systems and methods described herein can be carried out on conventional computer systems using any desired computer language, which systems may include central processing units (CPUs), storage devices, networks, drivers, input devices, and output devices (such as an LCD display or similar display device). The systems and methods can also be embodied in a code or set of instructions stored on a machine-readable medium, such as a magnetic disk, optical disk, hard drive, flash drive, or any currently known or future developed machine-readable medium.

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention. All patents and patent applications referred to herein are incorporated by reference in their entireties, except to the extent they may be contradictory to the present specification.

The invention claimed is:

1. A computer-implemented method of simulating a backlight, comprising:

tracing rays to an output plane of the backlight, wherein the backlight has a film stack at the output plane and a light source;

collecting information from the traced rays to produce a first database containing spatial and directional information of the rays incident on the output plane;

associating a probability function with the output plane;

calculating a second database containing spatial and directional information for rays exiting the output plane as a function of the probability function and the first database;

identifying a plurality of components of an optical path in the film stack that are suitable for representation by respective bi-directional scattering distribution functions (BSDFs);

acquiring the BSDFs of the components;

calculating a BSDF of the film stack from the component BSDFs, the film stack BSDF being the probability function associated with the output plane; and acquiring a mathematical description of the light source;

wherein the tracing step traces rays from the light source according to the mathematical description thereof to the output plane; and wherein the second database represents radiance as a function of location on the output plane.

2. The method of claim 1, wherein the BSDF acquiring step comprises selecting the BSDFs of at least one component from a library of BSDFs.

3. The method of claim 2, wherein the light source mathematical description acquiring step comprises selecting the light source mathematical description from a light source description library.

4. The method of claim 1, wherein:

the film stack BSDF calculating step comprises calculating the film stack BSDF from matrix representations of the component BSDFs, the calculating step also exploiting physical and/or electromagnetic reciprocal symmetries in at least some of the matrix representations being enforced and exploited.

5. The method of claim 1, wherein the BSDFs of the components and the BSDF of the film stack are each represented mathematically by a first matrix representing a reflection from above, a second matrix representing a transmission from above, a third matrix representing a reflection from below, and a fourth matrix representing a transmission from below.

6. The method of claim 5, wherein:

the first, second, third and fourth matrices have a first dimension representing an incident direction, and a second dimension perpendicular to the first dimension representing an exiting direction; and each entry in the four matrices represents a probability density that a ray incident with the incident direction will exit with the exiting direction.

7. The method of claim 1, wherein the BSDFs of the components and the BSDF of the film stack are location dependent.

* * * * *

UNITED STATES PATENT AND TRADEMARK OFFICE
CERTIFICATE OF CORRECTION

PATENT NO. : 7,898,520 B2
APPLICATION NO. : 11/565421
DATED : March 1, 2011
INVENTOR(S) : David G Freier It is certified that error appears in the above-identified patent and that said Letters Patent is hereby corrected as shown below:

First Page, item (56):
Column 2, Other Publications, Line 1, Delete "Ansiotropic" and insert -- Anisotropic --, therefor.

Column 1,
Line 48, Delete "bidirectional" and insert -- bi-directional --, therefor.

Column 12,
Line 38, Delete "axis.Advantageously," and insert -- axis. Advantageously, --, therefor.

Column 13,
Line 30, Delete " $|\vec{s} \cdot \hat{z}| d\hat{s}$ " and insert -- $|\hat{s} \cdot \hat{z}| d\hat{s}$ --, therefor.

Column 16,
Line 42, Delete " $T_{k',1,\ell',1}^{(b)} \cdot$ " and insert -- $T_{k',1,\ell',1}^{(b)} \cdot$ --, therefor.

Column 17,
Line 12, Delete "$n_{b=1.50.}$" and insert -- $n_b = 1.50.$ --, therefor.

Line 56, Delete " $(k'', \ell'') \dfrac{N}{\pi}$ " and insert -- $\delta(k'', \ell'') \dfrac{N}{\pi}$ --, therefor.

Column 20,
Line 34, Delete "paritioning" and insert -- partitioning --, therefor.

Signed and Sealed this
Fourteenth Day of February, 2012

David J. Kappos
*Director of the United States Patent and Trademark Office*

CERTIFICATE OF CORRECTION (continued)
U.S. Pat. No. 7,898,520 B2

Line 42, Delete "fth" and insert -- lth --, therefor.

Column 22,
Line 3, Delete "nb" and insert -- $n_b$ --, therefor.

Column 25,
Line 49, Delete " $\tau=0.676$ " and insert -- $T = 0.676$ --, therefor.

Column 26,
Line 15, Delete "examplary" and insert -- exemplary --, therefor.

Column 29,
Line 16, Delete "heterogeneties" and insert -- heterogeneities --, therefor.

Line 35, Delete "heterogeneties" and insert -- heterogeneities --, therefor.

Column 31,
Line 50, Delete " $\text{Let}\underline{\underline{A}}$ " and insert -- $\text{Let }\underline{\underline{A}}$ --, therefor.

Line 63, Delete " $\hat{C}_n^{\,0} \equiv \hat{E}, \hat{C}n,$ " and insert -- $\hat{C}_n^{\,0} \equiv \hat{E}, \hat{C}_{n},$ --, therefor.

Column 32,
Line 66, Delete " $\underline{\underline{U}}^{\backslash}$ " and insert -- $\underline{\underline{U}}^{\dagger}$ --, therefor.

Column 34,
Line 62, Delete " $n-1 n_{u \times nu}$ " and insert -- $n-1 n_u \times n_u$ --, therefor.

Column 35,
Line 7, Delete " $A^{(ij)}$ " and insert -- $\underline{\underline{A}}^{(ij)}$ --, therefor.

Line 37, Delete "15N''" and insert -- 15N' --, therefor.

CERTIFICATE OF CORRECTION (continued)
U.S. Pat. No. 7,898,520 B2

Column 36,

Line 60, Delete "$\hat{A}$" and insert -- $\underline{\underline{A}}$, -- therefor.

Column 46,

Line 59, Delete "$\hat{s}_i \cdot n$" and insert -- $\hat{s}_i \cdot \hat{n}$ -- therefor.

Line 60, Delete "$\hat{s}_i \cdot =0)$," and insert -- $\hat{s}_i \cdot \hat{n} = 0)$, -- therefor.

Column 47,

Line 15, Delete "$(R_j^{(a,b)}$" and insert -- $R_j^{(a,b)}$ -- therefor.

Line 49, Delete "ф" and insert -- $\varphi$-- therefor.

Column 48,

Line 22, Delete "ф" and insert -- $\varphi$ -- therefor.

Column 55,

Line 3, Delete "S" and insert -- $\hat{S}$ -- therefor.

Line 3, Delete "S" and insert -- $\hat{S}$ -- therefor.

Line 5, Delete "Z" and insert -- $\hat{Z}$ -- therefor.

Column 64,
Line 34, In Claim 4, delete "claim 1," and insert -- claim 2, -- therefor.